(12) United States Patent
Suffling

(10) Patent No.: US 9,473,474 B2
(45) Date of Patent: Oct. 18, 2016

(54) COMMUNICATING AN IDENTITY OF A GROUP SHARED SECRET TO A SERVER

(71) Applicant: BlackBerry Limited, Waterloo (CA)

(72) Inventor: David Robert Suffling, Kitchener (CA)

(73) Assignee: BlackBerry Limited, Waterloo (CA)

( * ) Notice: Subject to any disclaimer, the term of this patent is extended or adjusted under 35 U.S.C. 154(b) by 275 days.

(21) Appl. No.: 14/332,617

(22) Filed: Jul. 16, 2014

(65) Prior Publication Data
US 2014/0331052 A1 Nov. 6, 2014

Related U.S. Application Data

(62) Division of application No. 13/709,417, filed on Dec. 10, 2012, now Pat. No. 8,832,444.

(60) Provisional application No. 61/605,121, filed on Feb. 29, 2012.

(51) Int. Cl.
  *H04L 29/06* (2006.01)
  *H04L 9/32* (2006.01)
  *H04L 9/08* (2006.01)

(52) U.S. Cl.
  CPC .............. *H04L 63/061* (2013.01); *H04L 9/085* (2013.01); *H04L 9/3218* (2013.01); *H04L 9/3226* (2013.01); *H04L 9/3236* (2013.01); *H04L 63/1458* (2013.01)

(58) Field of Classification Search
None
See application file for complete search history.

(56) References Cited

U.S. PATENT DOCUMENTS

| | | | |
|---|---|---|---|
| 7,234,063 B1 | 6/2007 | Baugher et al. | |
| 7,627,901 B1 | 12/2009 | Elliott | |
| 8,316,237 B1 | 11/2012 | Felsher et al. | |
| 2004/0158708 A1 | 8/2004 | Peyravian et al. | |
| 2006/0205388 A1 | 9/2006 | Semple et al. | |
| 2008/0216160 A1 | 9/2008 | Rollet | |
| 2010/0215172 A1 | 8/2010 | Schneider | |
| 2010/0257365 A1 | 10/2010 | Anchan et al. | |
| 2011/0314286 A1* | 12/2011 | Tie | H04L 63/1466 713/171 |
| 2012/0011360 A1 | 1/2012 | Engels et al. | |
| 2012/0260329 A1 | 10/2012 | Suffling | |

(Continued)

FOREIGN PATENT DOCUMENTS

| | | |
|---|---|---|
| CH | 671663 | 9/1989 |
| EP | 2224716 | 9/2010 |
| EP | 2320348 | 5/2011 |
| WO | 2009155002 | 12/2009 |

OTHER PUBLICATIONS

Bui, Notice of Allowance for U.S. Appl. No. 13/709,363, mailed Aug. 31, 2015.

(Continued)

*Primary Examiner* — Jeffery Williams
(74) *Attorney, Agent, or Firm* — Integral IP; Miriam Paton; Amy Scouten

(57) ABSTRACT

An identity is communicated by a client device to a server without requiring the identity to be disclosed to eavesdroppers and without requiring the use of symmetric or asymmetric cryptography. In one example, the identity is an identity of the client device, where the identity has been assigned to the client device by the server through the provisioning of a unique subset of client-identifying keys. In another example, the identity is an identity of a group shared secret that has been provisioned by the server to the client device.

16 Claims, 20 Drawing Sheets

(56) References Cited

U.S. PATENT DOCUMENTS

2012/0290830 A1* 11/2012 Resch .................. H04L 9/3093 713/150
2013/0007453 A1 1/2013 Benantar
2013/0232344 A1 9/2013 Johnson et al.
2014/0006792 A1 1/2014 Fielder

OTHER PUBLICATIONS

Nakra, Second Office Action for CA2,805,529, mailed Oct. 19, 2015.
Bul, Jonathan. Restriction Requirement for U.S. Appl. No. 13/709,363, Nov. 21, 2014.
Nakra, Suchita. First Office Action for CA2805529, Nov. 3, 2014.
Bui, Second Office Action for U.S. Appl. No. 13/709,363, mailed Mar. 20, 2015.
Williams, Jeffery L., Notice of Allowance for U.S. Appl. No. 13/709,417, May 9, 2014.
Williams, Jeffery L., Restriction Requirement for U.S. Appl. No. 13/709,417, Jan. 14, 2014.
Wolters, Robert, Extended European Search Report for EP 12196295.5, Jul. 15, 2014.
Wolters, Robert, Extended European Search Report for EP 12196296.3, Jul. 17, 2014.

* cited by examiner

COMMUNICATING AN IDENTITY OF A GROUP SHARED SECRET TO A SERVER

TECHNICAL FIELD

The technology described herein relates generally to identity protection.

BACKGROUND

A client device may seek to communicate an identity to a server. For example, prior to permitting a client device to gain access to one or more services in a network, a server of the network may require authentication of the client device as proof that the client device is a legitimate client of the network server. In order to authenticate itself to the server, the client device may be required to communicate an identity to the server.

BRIEF DESCRIPTION OF THE DRAWINGS

FIGS. 5-1 and 5-2 are flowcharts illustrating an example method to be performed by a receiving server for determining whether a received message could have been communicated by a client device that was provisioned with one or more client-identifying keys;

FIGS. 9-1 and 9-2 are flowcharts illustrating a first example method to be performed by a receiving server for determining whether a received message from a client device identifies a group shared secret and whether the client device possesses the identified group shared secret;

FIGS. 13-1 and 13-2 are flowcharts illustrating a second example method to be performed by a receiving server for determining whether a received message from a client device identifies a group shared secret and whether the client device possesses the identified group shared secret;

DETAILED DESCRIPTION

Figure 1:
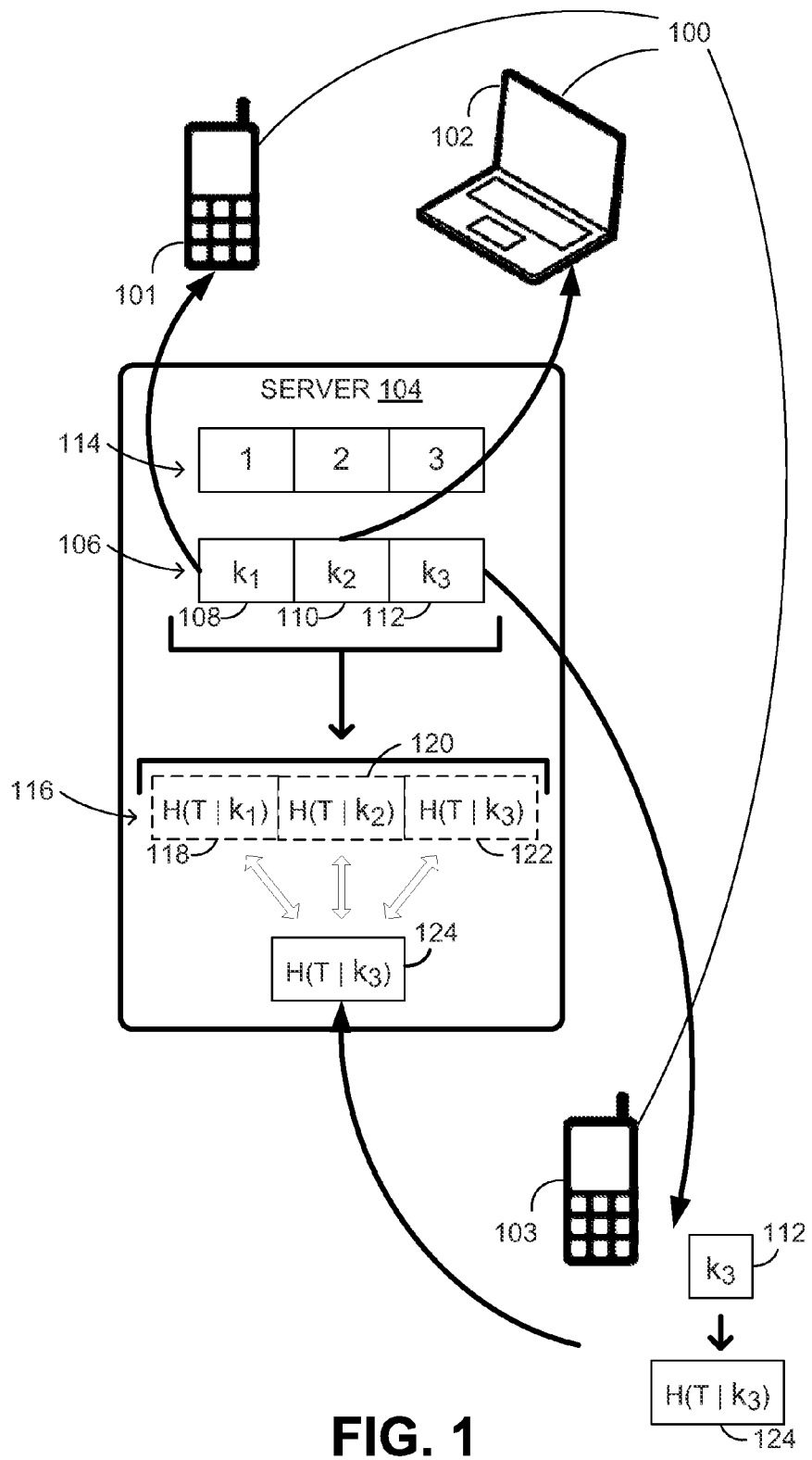
FIG. 1 is a schematic diagram illustrating a first technique for the provisioning of client-identifying keys by a server to a plurality of client devices, and the communication of one client device's provisioned client-identifying key to the server.

The examples described herein are illustrated primarily in relation to one or more servers and one or more client devices. Each server may comprise one or more servers, databases, computing devices, communication devices, or other computing equipment adapted to communicate over a network (either fixed or wireless) with client devices. Client devices may comprise servers, personal computers, or other data processing or communication devices, such as wireless communication devices, communicating over fixed and wireless networks and public networks.

It will be appreciated by those skilled in the art, however, that this description is not intended to limit the scope of the described examples to implementation on these particular systems or devices. For example, the methods and systems described herein may be applied to any appropriate communication device or data processing device adapted to communicate with another communication or data processing device over a fixed or wireless connection, whether portable or wirelessly enabled or not, whether provided with voice communication capabilities or not, and additionally or alternatively adapted to process data and carry out operations on data in response to user commands for any number of purposes, including productivity and entertainment.

Thus, the examples described herein may be implemented on computing devices adapted for communication or messaging, including without limitation cellular phones, smartphones, wireless organizers, personal digital assistants, desktop computers, terminals, laptops, tablets, handheld wireless communication devices, notebook computers, entertainment devices such as MP3 or video players, and the like. Unless expressly stated, a client, computing or communication device may include any such device, and a server may include similar types of devices, configured to provide some or all of the processes described herein. The configuration and operation of all such devices generally will be known to those skilled in the art. The devices described herein may be configured to manage cryptographic keys. For example, any of the devices described herein may comprise or be configured to operate in conjunction with one or more key management components, including, for example, a Subscriber Identity Module (SIM)

card, a smart card, a trusted platform module (TPM), or a hardware security module (HSM).

A client device may seek to provide an identity, and optionally some proof of the identity to a network server. This may happen, for example, as part of the process of the client device authenticating itself to the network server. As another example, in the case that the client device is a satellite telephone with limited coverage, it may provide the identity to a server as part of a check-in process to determine if it has any pending text messages for download. In yet another example, in the case that the client device is a cellular telephone, it may provide the identity to a server when periodically announcing its presence in an area. The identity being provided by the client device may be, for example, an identity of the client device, an identity of a SIM card, an identity of a group to which the client device belongs, or an identity of a group shared secret held by the client device. It may be of interest to ensure that the identity is communicated by the client device to the server in such a way that the identity cannot be understood by an eavesdropper. It may also be of interest to ensure that the client device cannot be tracked by an eavesdropper as a result of communicating the identity. It may be possible for a client device to obscure the identity it is communicating to the server by using traditional cryptographic techniques, such as asymmetric cryptography, or by using database lookups, such that each time the client device and the server communicate in secret, they agree on a new random identifier to be used during the next communication. However, these techniques may be computationally expensive when a Denial of Service (DoS) attack or a similar increase in computational load is being experienced. From the point of view of the server, part of the DoS risk is related to the fact that the server is not privy to an identity of the purported client device with which the server is communicating. Without being privy to this identity, the server may be unable to screen out a purported client device which is behaving maliciously.

A technique is herein proposed whereby a client device that has previously been provisioned with one or more cryptographic keys by a provisioning server is able to communicate an identity to a server, herein described as a "receiving" server. The provisioned keys have been selected from a plurality of cryptographic keys and embedded in the client device at the time of manufacture, or provisioned at a later date, for example, via a storage module like a SIM or over a secure channel. The receiving server may have access to the set of cryptographic keys or to data dependent on the cryptographic keys, as well as access to information from which it is determinable which of the cryptographic keys were provisioned to the client device. The client device is able to use one or more of its provisioned keys to communicate an identity to the receiving server. Examples of possible identities that may be communicated by the client device include an identity of the client device itself, an identity of a SIM card associated with the client device, an identity of a group to which the client device belongs, an identity of a group shared secret held by the client device, or any other identity.

The basic principles of an example technique for communicating an identity from a client device to a server are described with respect to FIG. 1, which illustrates a server 104 and a plurality of client devices 100, including a client device 101, a client device 102 and a client device 103. The client devices 100 are illustrated as wireless communication devices, however, any of the client devices 100 may alternatively or additionally communicate via one or more fixed connections. Properties of the client devices 100 and the server 104 will be discussed later, with respect to FIGS. 15-17. In this simple example, the server 104 may store or have access to a plurality of cryptographic keys 106, which will herein be referred to as client-identifying keys 106 for reasons that will become apparent later. The client-identifying keys 106, which include key $k_1$ 108, key $k_2$ 110 and key $k_3$ 112, may be identified by indices 114, namely, index 1, index 2, and index 3, as shown in FIG. 1. In another example (not shown), the client-identifying keys 106 may be identified by arbitrary identifiers. In yet another example (not shown), the client identifying keys may effectively identify themselves.

Each one of the client-identifying keys 106 is a distinct value. In one example, each of the client-identifying keys 106 is an effectively random value, such that it cannot be generated again on another occasion, except by chance. In this case, the client-identifying keys 106 would be stored by the server 104 for future reference, for example, in a lookup table. In another example, each of the client-identifying keys 106 is a quasi-random or pseudo-random value generated using any suitable generation algorithm, such that the same client-identifying key 106 can be reliably generated on another occasion in a repeatable manner. For example, a particular client-identifying key $k_i$ could be calculated as a hash of a concatenation of a random seed value s and an index i, that is $k_i = h(s|i)$, where h is any suitable hash algorithm, such as SHA-1, SHA-2, or MD5. In this case, the client-identifying keys 106 may not be stored by the server 104, provided that the server 104 maintains a record of the conditions under which the client-identifying keys 106 were generated, including, for example, the hash algorithm h and the random seed value s. Each one of the client-identifying keys 106 may be of a sufficient length and complexity that it cannot be easily predicted or guessed by an attacker.

The server 104 assigns and provisions the client-identifying keys $k_1$ 108, $k_2$ 110 and $k_3$ 112 to the client devices 101, 102 and 103, respectively. The client-identifying keys $k_1$ 108, $k_2$ 110 and $k_3$ 112 may be embedded in the client devices 101, 102 and 103, respectively, at the time of manufacture, or provisioned at a later date, for example, via a storage module such as a SIM, or via a transmission over a secure channel.

The assignment of the client-identifying keys 106 to client devices may be carried out in a random, pseudo-random or quasi-random fashion or may be carried out in an arbitrary fashion, and the server 104 may maintain a record (not shown) of which of the client-identifying keys 106 was assigned to which client device, for example, in the form of a mapping function or a lookup table. Alternatively, the assignment of the client-identifying keys 106 to client devices may be carried out according to an algorithm. In either case, the server 104 may store information (not shown) from which it is determinable which of the client-identifying keys 106 was provisioned to which client device. Thus, the information may comprise the relevant mapping function, lookup table, algorithm or inverse thereof, or any other information by which the server 104 can determine which of the client-identifying keys 106 was provisioned to which client device, or can determine to which client device the subset of client-identifying keys 106 were assigned.

Alternatively, even if, at the time of assigning the client-identifying keys 106 to the client devices, the server 104 does not maintain any information from which it is determinable which of the client-identifying keys 106 was provisioned to which client device, it may still be possible for the server 104 to subsequently obtain such information. For example, after being provisioned with their respective client-identifying keys, the client devices could subsequently inform a central infrastructure of which of the client-identifying keys they possess, thereby permitting the server 104 to reconstruct a mapping function. For example, client devices that were provisioned client-identifying keys during manufacture could subsequently register themselves with a central infrastructure when first activated, and simultaneously provide indications of the client-identifying keys with which they were provisioned. In this case, it will be apparent to those of ordinary skill in the art that it may be of interest to communicate such indications over a secure channel.

Returning to FIG. 1, the server 104 may possess a modulating value T that changes from time to time and is agreed on by the server 104 and any provisioned client devices. For example, the modulating value T may be a time interval value T and may be defined as the whole number of fixed-length intervals (or variable-length intervals) since some arbitrary point in time. For ease of understanding, the modulating value T is described herein as the time interval value T. However, it will be appreciated that the value T may refer to any modulating value that changes from time to time.

The time interval value T may be updated by the server 104 and any provisioned client devices according to one or more clocks, which may be synchronized. Alternatively or additionally, the server 104 may broadcast a current time interval value T to any provisioned client devices. The provisioned client devices may check that a current time interval value T has not been previously used.

It is possible that the time interval value T may be based on a spatial location. For example, in the case of wireless hotspots in coffee shops, each coffee shop may have its own server, and each server might have its own time interval value T.

It is also possible that the time interval value T may be determined according to a combination of a time on a clock and a spatial location. For example, the time interval value T may determined by "output concatenation/Cartesian product".

At any given moment in time, a legitimate client device may possess a current time interval value T that differs from a current time interval value T possessed by the server 104. The current time interval value T of the legitimate client device may differ from that of the server 104, for example, due to clock disagreement or latency associated with broadcasting or synchronization.

For each new time interval value T and for each of the client-identifying keys 106, the server 104 may apply a function H to a combination of the time interval value T and the client-identifying key. Such a combination of two or more values, for example value X and value Y, is denoted herein as (X|Y) and refers to a concatenation or to any other combination of the values. The function H may be a function that is difficult to reverse, such as a hash algorithm. For example, the function H may be any of SHA-1, SHA-2, or MD5. In one example, the function H is a SHA-2 algorithm no smaller than SHA-256. It will be appreciated, however, that the function H may represent other operations. For example, the function H may correspond to a block cipher. It will also be appreciated that the definition of the function H may change from time to time, provided that the definition is agreed on by the entities involved, in this case, the server 104 and the client devices 101, 102 and 103. For example, the definition of the function H may change in accordance with a change in the current time interval value T. The server 104 may broadcast an indication of the function H that is currently in use. For simplicity, in the following discussion, the function H is referred to as a hash algorithm H, and any expression of the form H(X) is described as a hash.

It is noted that the length of time over which a particular time interval value T remains unchanged should generally be sufficient to allow the server 104 to calculate and store any required hashes for any time interval value T that is likely to be considered current by a provisioned client device, as will be discussed further below. For example, the shorter the length of the time interval, the more intervals the server 104 may need to consider active at any given time, depending on a maximum acceptable clock differential between the client devices and the server 104. However, as will be discussed later, it is still of interest to keep the length of the time interval short enough to limit the window of opportunity for replay attacks, and to reduce the risk of being tracked by an eavesdropper. In one example, the length of any time interval is between five minutes and twenty minutes.

In the example of FIG. 1, the server 104 uses the hash algorithm H to compute hashes $H(T|k_1)$ 118, $H(T|k_2)$ 120 and $H(T|k_3)$ 122. The server 104 may store each of the hashes $H(T|k_1)$ 118, $H(T|k_2)$ 120 and $H(T|k_3)$ 122 in a table 116. Alternatively, the server 104 may store only a portion of each of the hashes $H(T|k_1)$ 118, $H(T|k_2)$ 120 and $H(T|k_3)$ 122 in the table 116. In one example, the server 104 may only store enough of each one of the hashes $H(T|k_1)$ 118, $H(T|k_2)$ 120, and $H(T|k_3)$ 122 to distinguish the stored value from the rest of the values stored in the table 116. For example, for a hash that is 256 bits in length, it may be sufficient to store only the first 128 bits or the last 128 bits or any predetermined 128 bits of the hash in order for the stored value to be distinguished from rest of the values stored in the table 116. In another example, a prefix tree, also known as a trie, could be used to preserve some number of bits at the beginning of each hash, where the number of bits preserved is the smallest number which distinguishes that value from all other values in the trie. For example, if there are one million hashes, but only one of the hashes has a zero as its first bit, only a single bit of that hash would be preserved in the trie. In this case, the number of bits stored for each hash may vary from hash to hash. In another example, a variation of trie could be used in which a specific bit is compared at each step, such that different bits are preserved for different values. In yet another example, for each of the hashes $H(T|k_1)$ 118, $H(T|k_2)$ 120 and $H(T|k_3)$ 122, the server 104 may compute some other value dependent thereon, and store the hash-dependent values in the table 116. For example, each hash-dependent value may be computed by applying a hash algorithm F to a combination of one of the hashes $H(T|k_i)$ and a small random seed value s, that is $F(H(T|k_i)|s)$, where the hash algorithm F may be the same or different from the hash algorithm H, where the seed value s is determined by trial and error such that the first N bits of each hash-dependent value $F(H(T|k_i)|s)$ are unique amongst all the hash-dependent values, and where N may be close to the theoretical limit on size (i.e., the minimum number of bits for which the new hashes can still be distinguished from each other).

Thus, while table 116 is illustrated as comprising each of the hashes $H(T|k_1)$ 118, $H(T|k_2)$ 120 and $H(T|k_3)$ 122 in its entirety, the table 116 should be understood as alternatively comprising only a portion of each of the hashes $H(T|k_1)$ 118, $H(T|k_2)$ 120 and $H(T|k_3)$ 122, or, alternatively, values dependent thereon.

In addition, the combination of elements to which the hash algorithm H is applied may comprise additional elements (not shown) beyond a time interval value T and a particular client-identifying key $k_i$. For example, the combination may comprise the index i of the client-identifying key $k_i$, such that the hash corresponding to the particular client-identifying key $k_i$ is expressed as $H(T|i|k_i)$. Including an index as salt in a hash calculation may make the hash value harder to attack.

In any case, since each of the values stored in the table 116 may be computed as a result of applying a hash algorithm H to a combination that includes at least the time interval value T and a particular client-identifying key $k_i$, for simplicity, these values will herein be referred to as hash-dependent values, and any table in which these values are stored will herein be referred to as a table of hash-dependent values. However, it will be appreciated that a table is only one way in which the hash-dependent values may be stored, and that other data structures are possible for storage of the hash-dependent values.

In order to account for client devices that possess adjacent time interval values T due, for example, to clock disagreement or latency as discussed previously, the server 104 may maintain one or more additional tables of hash-dependent values (not shown) determined from previous time interval values T or future time interval values T or both. Alternatively, the server 104 may maintain a single table that includes hash-dependent values determined from the present time interval value T and from previous time interval values T or future time interval values T or both. For example, if the time interval value T changes once per hour, the server 104 may store the hash-dependent values corresponding to the time interval value T for the current hour and either the previous hour or the next hour, or both.

For each table of hash-dependent values, the server 104 may associate each one of the hash-dependent values in the table with the respective one of the client-identifying key 106 from which the hash-dependent value was determined (or with the respective one of the indices 114 of the client-identifying key 106 from which the hash-dependent value was determined). The association may comprise, for example, a reverse map, a hash table, an index tree, an exhaustive linear search, or an ad-hoc function f.

In the case that the association comprises a hash table, some of the information about a hash-dependent value may be probabilistically preserved. For example, the position of a record in the hash table may depend on the hash-dependent value itself, but the position of the record may not be completely deterministic in isolation. For example, the location of other records in the hash table may force a particular record to be relocated. It is possible that one portion of a hash-dependent value could be used to determine storage location, while another portion could be used for comparison with a hash-dependent value received from a client device, as will be discussed later.

In the case that the association comprises an ad-hoc function f that associates a particular hash $H(T|k_i)$ to a particular client-identifying key $k_i$, the function might be defined as f: $H(T|k_i) \rightarrow k_i$ for valid time interval values T and valid client-identifying keys $k_i$. It will be appreciated that, for invalid time interval values T and/or invalid client-identifying keys $k_i$, the function f need not satisfy any particular requirements. In the example of FIG. 1, the association (not shown) for the table 116 of hash-dependent values would associate the hashes $H(T|k_1)$ 118, $H(T|k_2)$ 120, and $H(T|k_3)$ 122 to the client-identifying keys $k_1$ 108, $k_2$ 110 and $k_3$ 112, respectively (or to index 1, index 2, and index 3, respectively).

At any time after being provisioned with its respective client-identifying key, any of the client devices 101, 102 or 103 may seek to communicate an identity to the server 104. For example, a client device may be required to provide an identity as a prerequisite to authentication with the server 104, or as part of a check-in process with the server 104. In another example, the client device may seek to provide an identity when periodically announcing its presence to the server 104.

In the example illustrated in FIG. 1, the client device 103 seeks to communicate an identity to the server 104. For simplicity, it may be assumed that the identity is an identity of the client device 103, however, the identity could be some other identity, such as an identity of a SIM card of the client device 103.

In the simplified example of FIG. 1, the identity of the client device 103 may be communicated to the server 104 using the client-identifying key $k_3$ 112 that the client device 103 received from the server 104. Rather than sending the client-identifying key $k_3$ 112 directly to the server 104, the client device 103 may apply the hash algorithm H to a combination of at least the current time interval value T and the client-identifying key $k_3$ 112, thereby obtaining a hash $H(T|k_3)$ 124. The nature of the combination and the definition of the hash algorithm H are the same as that used by the server 104 to calculate the hashes $H(T|k_1)$ 118, $H(T|k_2)$ 120 and $H(T|k_3)$ 122 as described previously. The client device 103 may communicate the hash $H(T|k_3)$ 124 to the server 104, and the server 104 may proceed to compare the hash $H(T|k_3)$ 124 or a portion thereof or a value dependent thereon to the hash-dependent values in the table 116. In addition, the server 104 may optionally compare the hash $H(T|k_3)$ 124 or a portion thereof or a value dependent thereon to hash-dependent values stored in one or more additional tables (not shown) corresponding to one or more adjacent time interval values T. This may be done until the server 104 locates a hash-dependent value that is consistent with the hash $H(T|k_3)$ 124 or a corresponding portion thereof or a value dependent thereon. For example, upon comparing the hash $H(T|k_3)$ 124 to the hash $H(T|k_1)$ 118, the server 104 will determine that the hashes are not consistent. The server 104 may proceed to compare the hash $H(T|k_3)$ 124 to the hash $H(T|k_2)$ 120. Upon determining that the hash $H(T|k_3)$ 124 is not consistent with the hash $H(T|k_2)$ 120, the server 104 may then compare the hash $H(T|k_3)$ 124 to the hash $H(T|k_3)$ 122. Upon determining that the hash $H(T|k_3)$ 124 is consistent with the hash $H(T|k_3)$ 122, the server 104 may cease to do any more comparisons.

In another example, in the case that the table 116 stores hash-dependent values, such as $F(H(T|k_i)|s)$, as described previously, where s is a seed value determined by trial and error and F is a hash algorithm that is the same as or different than the hash algorithm H, upon receipt of the hash $H(T|k_3)$ 124 from the client device 103, the server 104 may compute a corresponding hash-dependent value $F(H(T|k_3)|s)$ for comparison with the hash-dependent values $F(H(T|k_i)|s)$ stored in the table 116. It will be appreciated that, in this case, there will be no direct comparison between any portion of the hashes $H(T|k_1)$ 118, $H(T|k_2)$ 120, and $H(T|k_3)$ 122 and any portion of the hash $H(T|k_3)$ 124.

In the case that only a portion of the hash $H(T|k_3)$ 124 or a value dependent thereon is used by the server 104 for comparison to portions of hashes or hash-dependent values stored tables of hash-dependent values, the client device 103 may only communicate the relevant portion of the hash $H(T|k_3)$ 124 or the relevant hash-dependent value to the server 104. In this case, the portion of a particular hash $H(T|k_i)$ that is needed for comparison or the manner by which the hash-dependent value is to be determined may be broadcasted or otherwise communicated to the client device 103 by the server 104. However, given that bandwidth may be inexpensive, it may be unnecessary to strictly limit the size of the portion of a particular hash $H(T|k_i)$ that is communicated to the server 104. It is noted that, unlike the client devices 100, the server 104 may store the hash-dependent values for all provisioned client devices, and may therefore be in a position to check for collisions and resolve them using a secondary strategy, such as a modestly-sized secondary table to distinguish between hash-dependent values.

Returning to FIG. 1, once the server 104 locates one of the stored hash-dependent values that is consistent with the received hash $H(T|k_3)$ 124 or portion thereof or value dependent thereon, the server 104 may use the association to determine which one of the client-identifying keys 106 (or the indices 114) is associated with the consistent hash-dependent value. In this case, since the stored hash $H(T|k_3)$ 122 is consistent with the received hash $H(T|k_3)$ 124, the server 104 may proceed to use the association to determine that the hash $H(T|k_3)$ 122 is associated with the client-identifying key $k_3$ 112 (or with the index 3). Now the server 104 may use the stored information (not shown) from which it is determinable which of the client-identifying keys 106 was assigned to which client device in order to determine which client device, if any, was provisioned with the client-identifying key $k_3$ 112 (or with the key having the index 3). In this case, the server 104 determines that it was the client device 103 that was provisioned with the client-identifying key $k_3$ 112.

In this example, no two client devices were provisioned with the same one of the client-identifying keys 106, and thus the client-identifying key $k_3$ 112 is unique to the client device 103. It follows that the client device 103 may use the client-identifying key $k_3$ 112 to uniquely identify itself to the server, and it may do so in a way that cannot be understood by an eavesdropper. Furthermore, since the client device 103 is communicating a value that changes with each new time interval value T, it is not possible for the client device 103 to be tracked by an eavesdropper from one time interval value T to the next. The eavesdropper cannot predict which hash-dependent value will be communicated by the client device 103 during a future time interval value T.

As mentioned previously, the client device 103 may be susceptible to tracking by an eavesdropper during the period when the time interval value T remains unchanged. For this reason, it may be of interest to use short-length time interval values or to provision each client device with multiple sets of client-identifying keys, or both.

As also mentioned previously, the proposed technique is not resistant to replay attacks during the period when the time interval value T remains unchanged. For example, an eavesdropper could overhear the hash $H(T|k_3)$ 124 that the client device 103 communicates to the server 104. Even though the eavesdropper does not know the client-identifying key $k_3$ 112 from which the hash $H(T|k_3)$ 124 was calculated, if the eavesdropper repeats the hash $H(T|k_3)$ 124 to the server 104 before the time interval value T has changed, the eavesdropper will effectively be communicating the identity of the client device 103 to the server 104, even though it is not the client device 103. The eavesdropper may not even be aware of which client device it is purporting to be. Thus, the server 104 can only use a received hash to determine if the hash could have been communicated by a client device that was provisioned with one of the client-identifying keys 106. For example, if the server 104 receives a message comprising a value that is not consistent with any of the hash-dependent values in the table 116 or in any other table of hash-dependent values (not shown), the server 104 can determine with certainty that the message does not identify a client device that was provisioned with one of the client-identifying keys 106. Similarly, even if the value is consistent with one of the hash-dependent values in the table 116 or in any other table of hash-dependent values (not shown), but the consistent hash-dependent value is associated with a client-identifying key that was not provisioned to any client device, the server 104 can also determine with certainty that the message does not identify a client device that was provisioned with one of the client-identifying keys 106. However, if the server 104 receives a message comprising a value that is consistent with one of the hash-dependent values in the table 116 or in any other table of hash-dependent values (not shown), and the consistent hash-dependent value does correspond to one of the client-identifying keys 106 that was provisioned to a particular client device, the server 104 can only determine that the message identifies that particular client device, and therefore could have been communicated by that particular client device. In other words, for a received message that includes a hash or portion thereof or value dependent thereon, the server 104 can either determine an identity of a single client device which could have legitimately sent the message, or determine that no legitimate client device could have sent the message. It is noted that, while it is theoretically possible for a hash of one value to be the same as the hash of another different value, it is astronomically unlikely.

It is also noted that, in the case that an attacker repeatedly prompts a client device to disclose an identity, it is possible that the attacker could measure the exact moment that the time interval value T of the client device changes, thereby permitting the attacker to track the client device in the future based on any discrepancy in the client device's clock. For example, the attacker might be able to track a particular client device based on that client device's clock being 12.6 seconds fast. This risk may be mitigated by having the client devices obtain the current time interval value T from the server 104, by having the client devices regularly synchronize their clocks with a central authority, or by introducing a small random element into the timing of each client device, such that clock discrepancies between client devices cannot be accurately measured by an attacker.

For a server with a very large number of client devices, the simplified technique illustrated in FIG. 1 may impose a large computational burden. For example, if the server had to communicate with one hundred million client devices, the server would have to store at least one hundred million client-identifying keys in order for each client device to be provisioned with a unique client-identifying key. The server would also have to compute one-hundred million hashes at every new time interval value T, which might be unfeasible. It might also be unfeasible for the server to compare a received hash or portion thereof with one hundred million hashes or portions thereof. Although a high-end server might be able to handle such a load given a modestly-optimized implementation, power usage, key security and latency would suffer significantly. Furthermore, with a minimum of 3200 MB of key material (based on 128-bit keys), key management would pose a significant challenge.

The computational burden on the server could be reduced by provisioning more than one client-identifying key to each client device. For example, if the server were to store N client-identifying keys, and to provision each client device with a unique subset of Y of the N client-identifying keys, according to the equation for the binomial coefficient C(N, Y) with the number N of client-identifying keys being much larger than the number Y of client-identifying keys in the subset, the server would be able to uniquely provision approximately $N^Y/Y!$ client devices, where "Y!" denotes the factorial of the number Y. In one example, if the server stores N=1,000,000 client-identifying keys, and each client device is provisioned with a unique subset of Y=4 of the 1,000,000 client-identifying keys, the server would be able to uniquely provision approximately $4.17 \times 10^{22}$ client devices. Thus, by provisioning each client device with more than one client-identifying key, the technique described with respect to FIG. 1 may be scaled for use with a much larger number of client devices. The size of the subset of client-identifying keys provisioned may vary from one client device to another.

Figure 2:
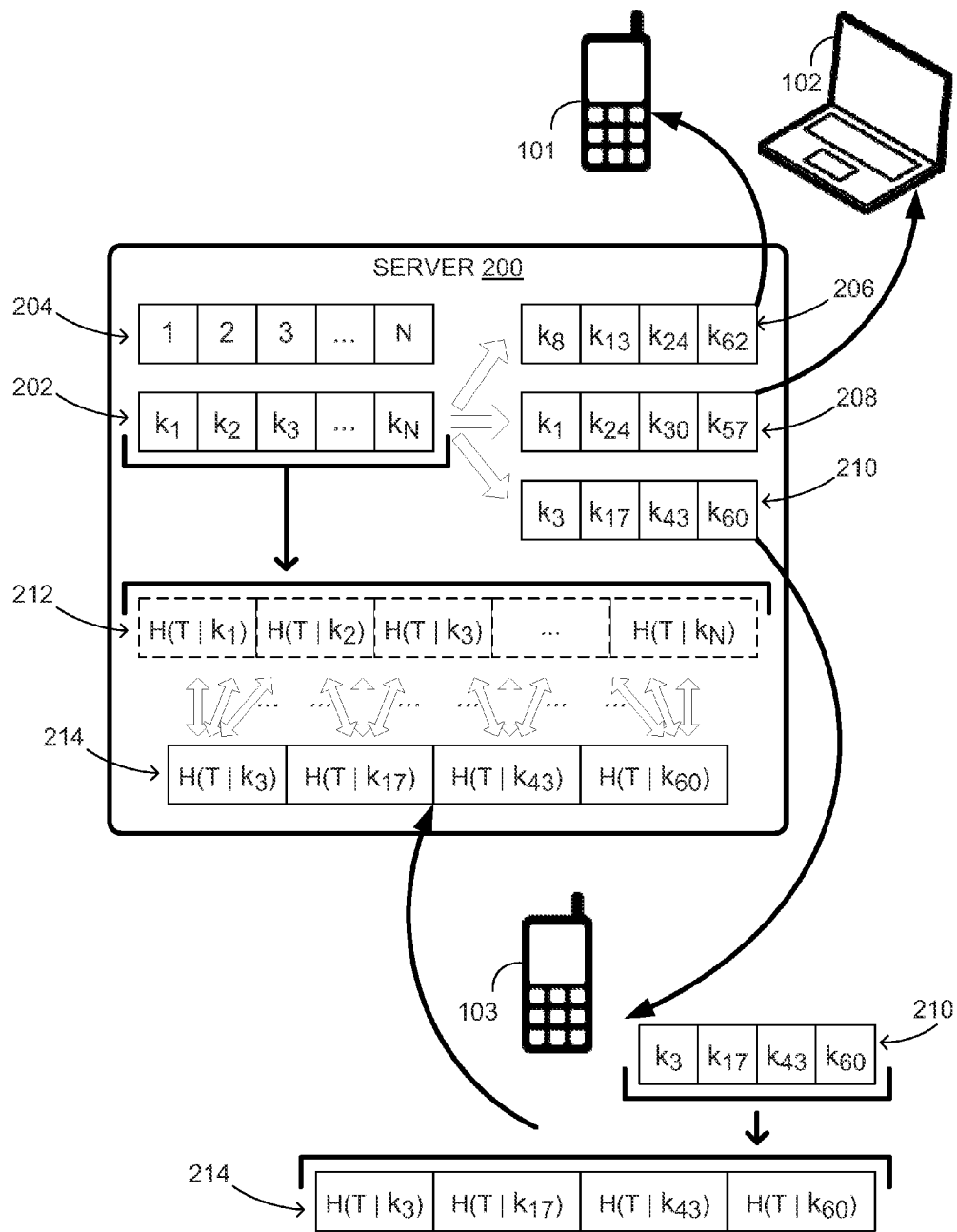
FIG. 2 is a schematic diagram illustrating a second technique for the provisioning of client-identifying keys by a server to a plurality of client devices, and the communication of one client device's provisioned client-identifying keys to the server.

Accordingly, FIG. 2 is a schematic diagram illustrating a second example technique for the provisioning of client-identifying keys by a server 200 to a plurality of client devices 101, 102 and 103, and the communication of the client device 103's provisioned client-identifying keys to the server 200. In contrast to the example technique illustrated in FIG. 1, the example technique illustrated in FIG. 2 involves the provisioning of a plurality of client-identifying keys to each one of the client devices 101, 102 and 103.

The server 200 may store or have access to N client-identifying keys ($k_1$, $k_2$, $k_3$, . . . , $k_N$) 202. The N client-identifying keys 202 may be identified by N corresponding indices (1, 2, 3, . . . , N) 204, where N may take on any positive integer value. In another example (not shown), each of the N client-identifying keys 202 may be identified by an arbitrary identifier. In yet another example (not shown), each of the N client-identifying keys 202 may effectively identify itself. Typically, the number N of client-identifying keys 202 will be less than the number of client devices that may communicate with the server 200. In one example, the number N of client-identifying keys 202 is N=1,000,000.

Each one of the client-identifying keys 202 is a distinct value. In one example, each of the client-identifying keys 202 is an effectively random value, such that it cannot be generated again on another occasion, except by chance. In this case, the client-identifying keys 202 would be stored by the server 200 for future reference, for example, in a lookup table. In another example, each of the client-identifying keys 202 is a quasi-random or pseudo-random value generated using any suitable generation algorithm, such that the same client-identifying key 202 can be reliably generated on another occasion in a repeatable manner. For example, a particular client-identifying key $k_i$ could be calculated as a hash of a concatenation of a random seed value s and an index i, that is $k_i=h(s|i)$, where h is any suitable hash algorithm, such as SHA-1, SHA-2, or MD5. In this case, the client-identifying keys 202 may not be stored by the server 200, provided that the server 200 maintains a record of the conditions under which the client-identifying keys 202 were generated, including, for example, the hash algorithm h and the random seed value s. Each one of the client-identifying keys 202 may be of a sufficient length and complexity that it cannot be easily predicted or guessed by an attacker.

In the example illustrated in FIG. 2, the server 200 assigns and provisions a subset of four of the N client-identifying keys 202 to each of the client devices 101, 102 and 103. In particular, the server 200 assigns a subset 206 of client-identifying keys ($k_8$, $k_{13}$, $k_{24}$, $k_{62}$) to the client device 101, a subset 208 of client-identifying keys ($k_1$, $k_{24}$, $k_{30}$, $k_{57}$) to the client device 102, and a subset 210 of client-identifying keys ($k_3$, $k_{17}$, $k_{43}$, $k_{60}$) to the client device 103.

The subsets 206, 208 and 210 of client-identifying keys may be embedded in the client devices 101, 102 and 103, respectively, at the time of manufacture, or provisioned at a later date, for example, via a storage module such as a SIM, or via transmission over a secure channel.

The assignment of a subset of the client-identifying keys 202 to each client device may be carried out in a random, pseudo-random or quasi-random fashion or may be carried out in an arbitrary fashion, and the server 200 may maintain a record (not shown) of which of the client-identifying keys 202 were provisioned to which client device, for example, in the form of a mapping function or a lookup table. Alternatively, the assignment of a subset of the client-identifying keys 202 to each client device may be carried out according to an algorithm. In either case, the server 200 may store information (not shown) from which it is determinable which of the client-identifying keys 202 were provisioned to which client device. Thus, the information may comprise the relevant mapping function, lookup table, algorithm or inverse thereof, or any other information by which the server 200 can determine which of the client-identifying keys 202 were provisioned to which client device, or can determine to which client device the subset of client-identifying keys 202 were assigned.

Alternatively, even if, at the time of assigning the client-identifying keys 202 to the client devices, the server 200 does not maintain any information from which it is determinable which of the client-identifying keys 202 were provisioned to which client device, it may still be possible for the server 200 to subsequently obtain such information, for example during registration of the provisioned client devices with a central infrastructure, as described previously with respect to FIG. 1.

Since there are likely more client devices than client-identifying keys 202, some client devices may share one or more of the same client-identifying keys. For example, in FIG. 2, the client devices 101 and 102 have each been provisioned with the client-identifying key $k_{24}$. It is also possible that some of the client-identifying keys 202 may not yet be provisioned to any client device at all, or else that they may be provisioned to client devices that are not illustrated in FIG. 2. In this example, it is assumed that no two client devices are provisioned with exactly the same subset of client-identifying keys 202.

As described with respect to FIG. 1, the server 200 may possess a time interval value T that changes from time to time and is agreed on by the server 200 and any provisioned client devices. For example, the server 200 might broadcast the current time interval value T. For each new time interval value T and for each of the client-identifying keys 202, the server 200 may calculate a hash of a combination of at least the time interval value T and the client-identifying key using a hash algorithm H, as described with respect to FIG. 1. In the example illustrated in FIG. 2, the server 200 uses the hash algorithm H to compute hashes $H(T|k_1)$, $H(T|k_2)$, $H(T|k_3)$, . . . , $H(T|k_N)$. As described with respect to FIG. 1, the server 200 may store each of the hashes $H(T|k_1)$, $H(T|k_2)$, $H(T|k_3)$, . . . , $H(T|k_N)$ in a table 212 or some other suitable data structure (not shown). Alternatively, the server 200 may store only portions of the hashes, or some other values dependent thereon.

As described with respect to FIG. 1, in order to account for client devices that possess adjacent time interval values T, the server 200 may maintain one or more additional tables of hash-dependent values (not shown) determined from previous time interval values T or future time interval values T or both. Alternatively, the server 200 may maintain a single table that includes hash-dependent values determined from the present time interval value T and from previous time interval values T or future time interval values T or both.

For each table of hash-dependent values, the server 200 may associate each one of the hash-dependent values in the table with the respective one of the client-identifying keys 202 from which the hash-dependent value was determined (or with the respective one of the indices 204 of the client-identifying key 202 from which the hash-dependent value was determined). The association may be implemented as described previously with respect to FIG. 1. In the example of FIG. 2, the association (not shown) for the table 212 of hash-dependent values would associate each one of the hash-dependent values in the table 212 with a corresponding one of the client-identifying keys 202 (or with a corresponding one of the indices 204).

The client device 103 may seek to communicate an identity to the server 200, where the identity is an identity of the client device 103 or some other identity, such as an identity of a SIM card of the client device 103. In the example of FIG. 2, this may be done using the client-identifying keys ($k_3$, $k_{17}$, $k_{43}$, $k_{60}$) 210 with which the client device 103 was provisioned by the server 200. For each of client-identifying keys ($k_3$, $k_{17}$, $k_{43}$, $k_{60}$) 210, the client device 103 may calculate a hash by applying the hash algorithm H to a combination of at least the current time interval value T and the client-identifying key. The nature of the combination and the definition of the hash algorithm H are the same as that used by the server 200 to calculate the hashes $H(T|k_1)$, $H(T|k_2)$, $H(T|k_3)$, ..., $H(T|k_N)$ as described previously. From these hash calculations, the client device 103 may obtain four hashes 214: $H(T|k_3)$, $H(T|k_{17})$, $H(T|k_{43})$, and $H(T|k_{60})$. The client device 103 may communicate the hashes 214 to the server 200, and, for each one of the hashes 214, the server 200 may proceed to compare the hash or a portion thereof or a value dependent thereon to the hash-dependent values $H(T|k_1)$, $H(T|k_2)$, $H(T|k_3)$, ..., $H(T|k_N)$ stored in the table 212. In addition, for each one of the hashes 214, the server 200 may optionally compare the hash or a portion thereof or a value dependent thereon to hash-dependent values stored in one or more additional tables (not shown) corresponding to one or more adjacent time interval values T. This may be done until the server 200 locates hash-dependent values that are consistent with each of the received hashes 214 or corresponding portions thereof or values dependent thereon.

In the case that the table 212 stores hash-dependent values, such as $F(H(T|k_i)|s)$, as described previously with respect to FIG. 1, upon receipt of the hashes 214 $H(T|k_3)$, $H(T|k_{17})$, $H(T|k_{43})$, and $H(T|k_{60})$ from the client device 103, the server 200 may compute corresponding hash-dependent values $F(H(T|k_3)|s)$, $F(H(T|k_{17})|s)$, $F(H(T|k_{43})|s)$, and $F(H(T|k_{60})|s)$ for comparison with the hash-dependent values $F(H(T|k_i)|s)$ stored in the table 212.

In the case that only a portion of each of the hashes 214 $H(T|k_3)$, $H(T|k_{17})$, $H(T|k_{43})$, and $H(T|k_{60})$ or values dependent thereon are used by the server 200 for comparison to portions of hashes or hash-dependent values stored tables of hash-dependent values, the client device 103 may only communicate the relevant portions of the hashes 214 or the relevant hash-dependent values to the server 200. In this case, the portion of each hash that is needed for comparison or the manner by which each hash-dependent value is to be determined may be broadcasted or otherwise communicated to the client device 103 by the server 200.

Returning to FIG. 2, once the server 200 locates stored hash-dependent values that are consistent with the received hashes 214 or portions thereof or values dependent thereon, the server 200 may use the association to determine which of the client-identifying keys 202 (or the indices 204) are associated with the consistent hash-dependent values. In this case, the server 200 may use the association to determine that the hash-dependent values that are consistent with the received hashes 214 or portions thereof or values dependent thereon are associated with the client-identifying keys $k_3$, $k_{17}$, $k_{43}$, $k_{60}$ (or with the indices 3, 17, 43 and 60). Now the server 200 may use the stored information (not shown) from which it is determinable which of the client-identifying keys 202 were provisioned to which client device in order to determine which client device, if any, was provisioned with the client-identifying keys $k_3$, $k_{17}$, $k_{43}$, $k_{60}$ (or with the keys having the indices 3, 17, 43 and 60). In this case, the server 200 determines that it was the client device 103 that was provisioned with the subset 210 of client-identifying keys ($k_3$, $k_{17}$, $k_{43}$, $k_{60}$).

In this example, no two client devices were provisioned with exactly the same subset of the client-identifying keys 202, and thus the subset 210 of client-identifying keys ($k_3$, $k_{17}$, $k_{43}$, $k_{60}$) is unique to the client device 103. It follows that the client device 103 may use the client-identifying keys ($k_3$, $k_{17}$, $k_{43}$, $k_{60}$) to uniquely identify itself to the server 200, and it may do so in a way that cannot be understood or tracked by an eavesdropper from one time interval value to the next. It will be apparent to those of ordinary skill in the art that, if care is taken in provisioning, it may be possible for a client device to uniquely identify itself using only some of the client-identifying keys with which the client device was provisioned. For example, in this simple case, it will be apparent that the client device 103 could uniquely identify itself to the server 200 using any one of its subset 210 of client-identifying keys because none of the four client-identifying keys in the subset 210 was provisioned to any of the other client devices (i.e., client devices 101 and 102).

Similarly to the technique described with respect to FIG. 1, this technique is not resistant to replay attacks during the period when the time interval value T remains unchanged. For example, an eavesdropper could overhear the hashes 214 that the client device 103 communicates to the server 200. Even though the eavesdropper does not know the client-identifying keys 210 to which the hashes 214 correspond, or the current time interval value T, if the eavesdropper repeats the hashes 214 to the server 200 before the time interval value T has changed, the eavesdropper will effectively be communicating the identity of the client device 103 to the server 200, even though it is not the client device 103. The eavesdropper may not even be aware of which client device it is purporting to be. Thus, the server 200 can only use received hash-dependent values to determine if the hash-dependent values could have been communicated by a client device that was provisioned with the subset 210 of client-identifying keys 202. For example, if the server 200 receives a message comprising values that are not consistent with any subset of the stored hash-dependent values in the table 212 or in any other table of hash-dependent values (not shown), the server 200 can determine with certainty that the message does not identify a client device that was provisioned with a subset of the client-identifying keys 202. Similarly, even if the server 200 receives a message comprising values that are consistent with a subset of the stored hash-dependent values stored in the table 212 or in another other table of hash-dependent values (not shown), but the consistent hash-dependent values are not associated with any subset of the client-identifying keys 202 that was provisioned to a client device, the server 200 can determine with certainty that the message does not identify a client device that was provisioned with a subset of the client-identifying keys 202. However, if the server 200 receives a message comprising values that are consistent with a subset of the hash-dependent values stored in the table 212 or in any other table of hash-dependent values (not shown), and the consistent hash-dependent values correspond to a subset of the client-identifying keys 202 that was provisioned to a particular client device, the server 200 can only determine that the message identifies that particular client device, and therefore could have been communicated by that particular client device. In other words, for a received message that includes a subset of hashes or portions thereof or values dependent thereon, the server 200 can either determine an identity of a single client device which could have legitimately sent the message, or determine that no legitimate client device could have sent the message.

It will be apparent that, in the case that a particular client device can be uniquely identified using only some of the client-identifying keys with which it was provisioned, as discussed above, the server 200 could make this determination when the hash-dependent values received in the message are consistent with stored hash-dependent values that are associated with only some of the client-identifying keys of the subset provisioned to the particular client device.

While the servers 104 and 200 are each illustrated as a single device, it is contemplated that each of the servers 104 and 200 may comprise multiple devices. For example, each of the servers 104 and 200 may comprise one or more provisioning servers, each of which is configured to provision one or more client-identifying keys to one or more client devices. Each of the servers 104 and 200 may also comprise one or more receiving servers, each of which is able to receive a message purporting to be from a provisioned client device and determine whether the message could have been communicated by a provisioned client device. The calculation of the hashes and the determination of the hash-dependent values to be stored for a particular time interval value T may be performed by the one or more provisioning servers or by the one or more receiving servers or by some combination thereof. For example, the one or more provisioning servers may share information with the one or more receiving servers, such as any of the client-identifying keys and the information from which it is determinable which client-identifying keys were provisioned to which client device. In one example, the shared information is stored on one or more databases accessible by the one or more provisioning servers and the one or more receiving servers. In another example, in the case of more than one receiving server, each receiving server may only be able to identify a subset of the client devices that were provisioned by a provisioning server. For example, the receiving server may not have access to all of the client-identifying keys or to the information from which it is determinable which client-identifying keys were provisioned to which client device.

In a variation on this system, a given receiving server may not be permitted or able to identify all client devices that were provisioned by a provisioning server. For example, the receiving server may not have access to all of the client-identifying keys or hashes.

Figure 3:
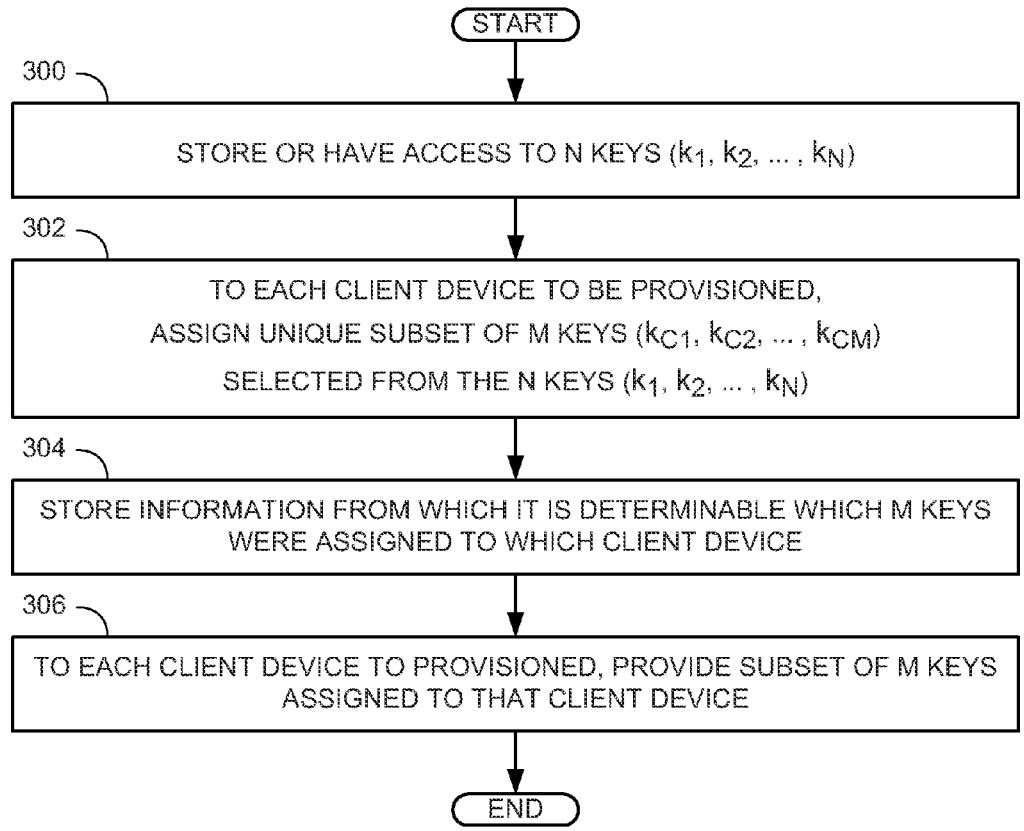
FIG. 3 is a flowchart illustrating an example method to be performed by a provisioning server for provisioning client-identifying keys to client devices.

FIG. 3 is a flowchart illustrating an example method to be performed by a provisioning server for provisioning client-identifying keys to client devices.

The method begins at 300 by having the provisioning server store or have access to a plurality of N client-identifying keys ($k_1, k_2, \ldots, k_N$). The N client-identifying keys may be identified by indices (1, 2, . . . , N), where N may take on any positive integer value. Alternatively, each of the client-identifying keys ($k_1, k_2, \ldots, k_N$) may be identified by an arbitrary identifier or may effectively identify itself. As described with respect to FIG. 2, each one of the client-identifying keys ($k_1, k_2, \ldots, k_N$) is a distinct value, such as an effectively random value, a quasi-random or a pseudo-random value, or a value that can be reliably generated on another occasion in a repeatable manner. In the latter case, it will be appreciated that the server may not explicitly store the client-identifying keys ($k_1, k_2, \ldots, k_N$), provided that the server maintains a record of the conditions under which the client-identifying keys were generated. Each one of the client-identifying keys ($k_1, k_2, \ldots, k_N$) may be of a sufficient length and complexity that it cannot be easily predicted or guessed by an attacker.

At 302, the provisioning server assigns to each client device j to be provisioned a unique subset of $M_j$ client-identifying keys ($k_{C1}, k_{C2}, \ldots, k_{CMj}$) selected from the N client-identifying keys ($k_1, k_2, \ldots, k_N$), where $M_j$ is a positive integer less than N. In the example illustrated in FIG. 1, the number $M_j$ of client-identifying keys in the subset for all client devices {j} is $M_j=1$, whereas, in the example illustrated in FIG. 2, the number $M_j$ of client-identifying keys in the subset for all client devices {j} is $M_j=4$. In other examples, some of the client devices {j} may have more client-identifying keys provisioned thereto than others of the client devices {j}. In the present example, all client devices {j} are provisioned with a subset of $M_j=M$ client-identifying keys. The assignment of the subsets of client-identifying keys to the client devices {j} may be carried out in a random, pseudo-random or quasi-random fashion or may be carried out in an arbitrary fashion, and the server may maintain a record of which of the N client-identifying keys ($k_1, k_2, \ldots, k_N$) were assigned to which client device j, for example, in the form of a mapping function or a lookup table. Alternatively, the assignment of the subsets of client-identifying keys to the client devices {j} may be carried out according to an algorithm. As noted previously, two or more client devices may be assigned one or more of the same client-identifying keys, provided that no two client devices are assigned the exact same subset of client-identifying keys ($k_{C1}, k_{C2}, \ldots, k_{CM}$). It is also possible that some of the client-identifying keys ($k_1, k_2, \ldots, k_N$) may not yet be assigned to any client device at all.

At 304, the provisioning server may store information from which it is determinable which M client-identifying keys were assigned to which client device. The information may comprise the relevant mapping function, lookup table, algorithm or inverse thereof, or any other information by which the server can determine which of the client-identifying keys were provisioned to which client device. The provisioning server may store the information in a memory of the provisioning server or in one or more databases that are accessible by both the provisioning server and a receiving server. Alternatively, as described previously, the provisioning server may reconstruct a mapping function based on information subsequently obtained from provisioned client devices.

At 306, the provisioning server provides to each client device to be provisioned the subset of M client-identifying keys ($k_{C1}, k_{C2}, \ldots, k_{CM}$) assigned to that client device. Each subset of M assigned keys ($k_{C1}, k_{C2}, \ldots, k_{CM}$) may be embedded in a client device at the time of manufacture, or provisioned at a later date, for example, via a storage module such as a SIM, or via a transmission over a secure channel.

In the case that the provisioning server reconstructs a mapping function based on information subsequently obtained from provisioned client devices, it will be appreciated that the provisioning of the client devices at 306 may precede the storing of the information at 304.

Figure 4:
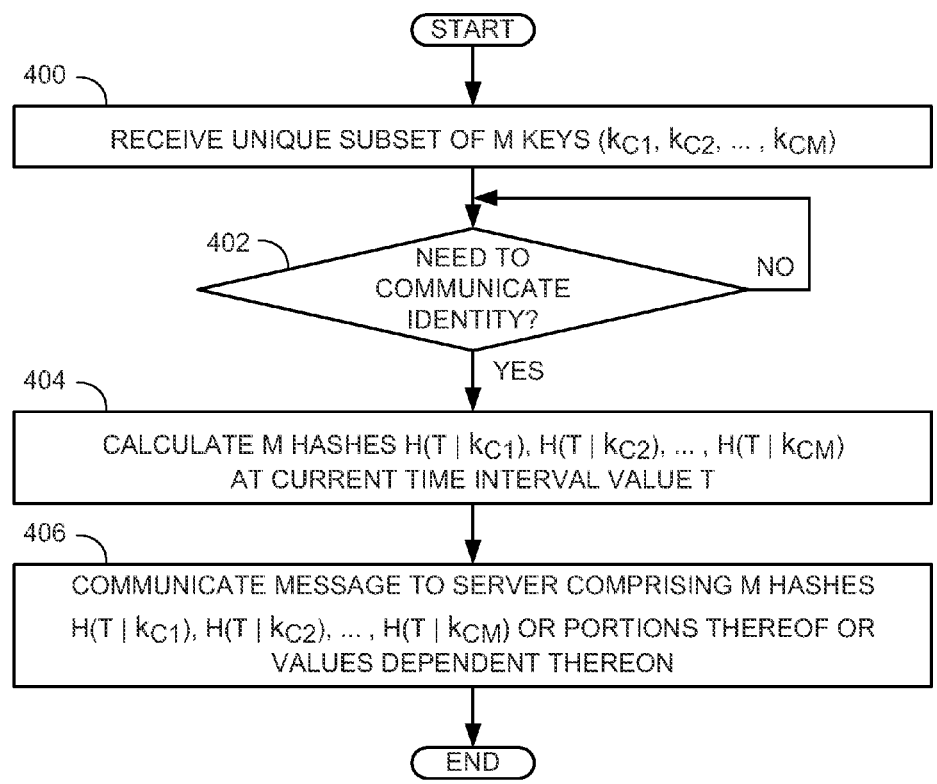
FIG. 4 is a flowchart illustrating an example method to be performed by a provisioned client device for communicating its provisioned client-identifying keys to a receiving server.

FIG. 4 is a flowchart illustrating an example method to be performed by a provisioned client device for communicating its provisioned client-identifying keys to a receiving server.

At 400, the client device receives a unique subset of M client-identifying keys ($k_{C1}, k_{C2}, \ldots, k_{CM}$) from a provisioning server. As described above, the subset of M client-identifying keys may be embedded in the client device at the time of manufacture, or may be received at a later date.

At some point after being provisioned with its unique subset of M client-identifying keys ($k_{C1}, k_{C2}, \ldots, k_{CM}$), the client device may determine at 402 that it has a need to communicate an identity to a server. For example, it may seek to request services from a web server which requires identification of the client device as a prerequisite to authentication of the client device.

Once the client device determines at 402 that it has a need to communicate an identity to the server, for each of the M client-identifying keys received at 400, the client device may proceed at 404 to calculate a hash by applying a hash algorithm H to a combination of at least the current time interval value T and the client-identifying key, thereby obtaining M hashes: $H(T|k_{C1}), H(T|k_{C2}), \ldots, H(T|k_{CM})$. Although not explicitly shown, the client device may receive one or more of the current time interval value T, an indication of the hash algorithm H, and an indication of the nature of the combination via a broadcast from the provisioning server or a receiving server.

At 406, the client device communicates a message to the server comprising each of the M hashes $H(T|k_{C1}), H(T|k_{C2}), \ldots, H(T|k_{CM})$ calculated at 404. Alternatively, for each of the M hashes $H(T|k_{C1}), H(T|k_{C2}), \ldots, H(T|k_{CM})$ calculated at 404, the client device may communicate a message to the server comprising a portion of each hash or a value dependent thereon.

The methods described herein are based on the assumption that each client device is provisioned with the same number M of client-identifying keys. However, it will be apparent to a person of ordinary skill in the art that different client devices may be provisioned with different numbers of client-identifying keys, provided that no client device is provisioned with a subset of another client device's client-identifying keys. In one example, a client device may indicate in the message communicated at 406 the number of client-identifying keys to which the message pertains.

Figures 1, 5:
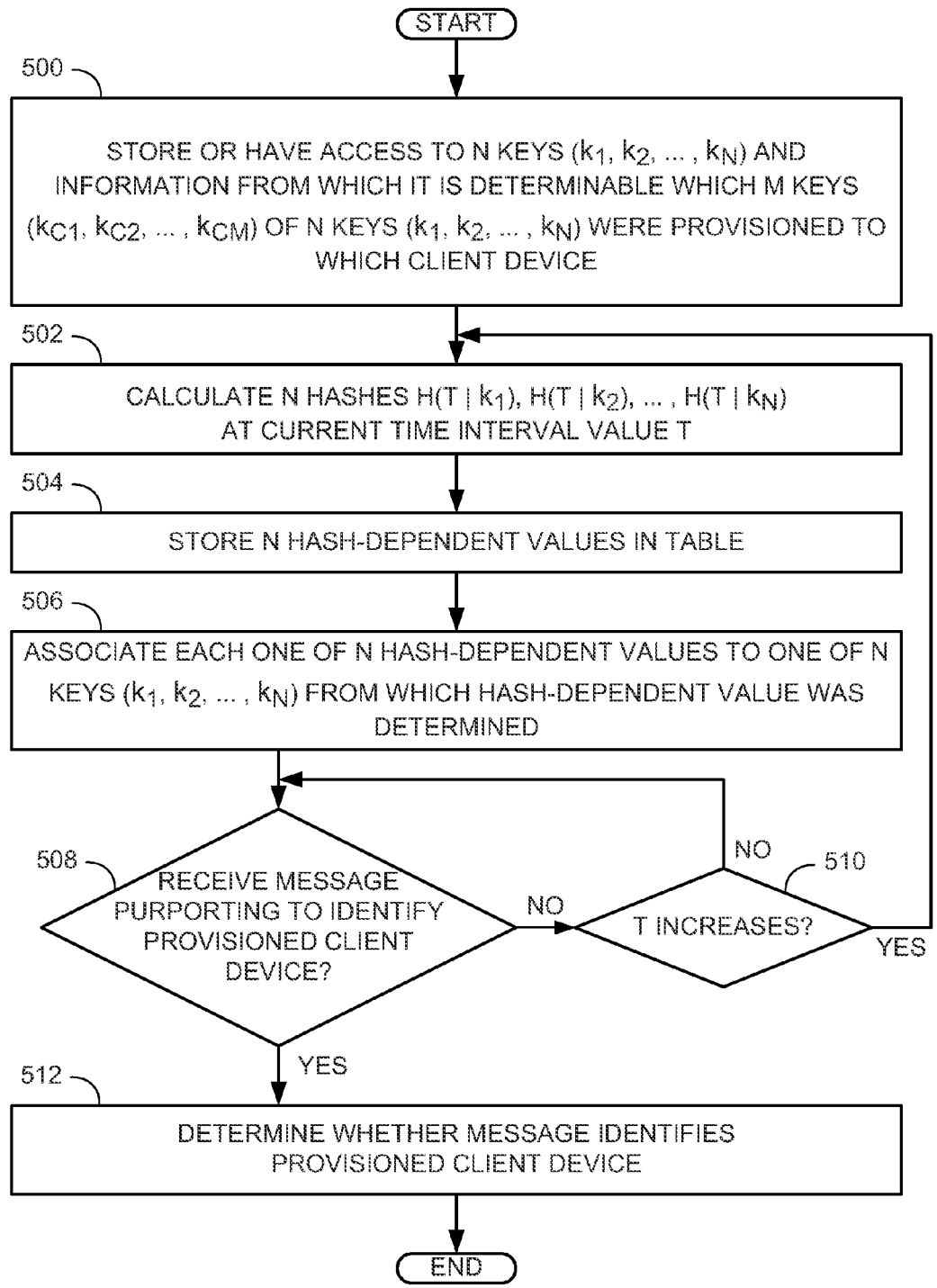
Figures 2, 5:
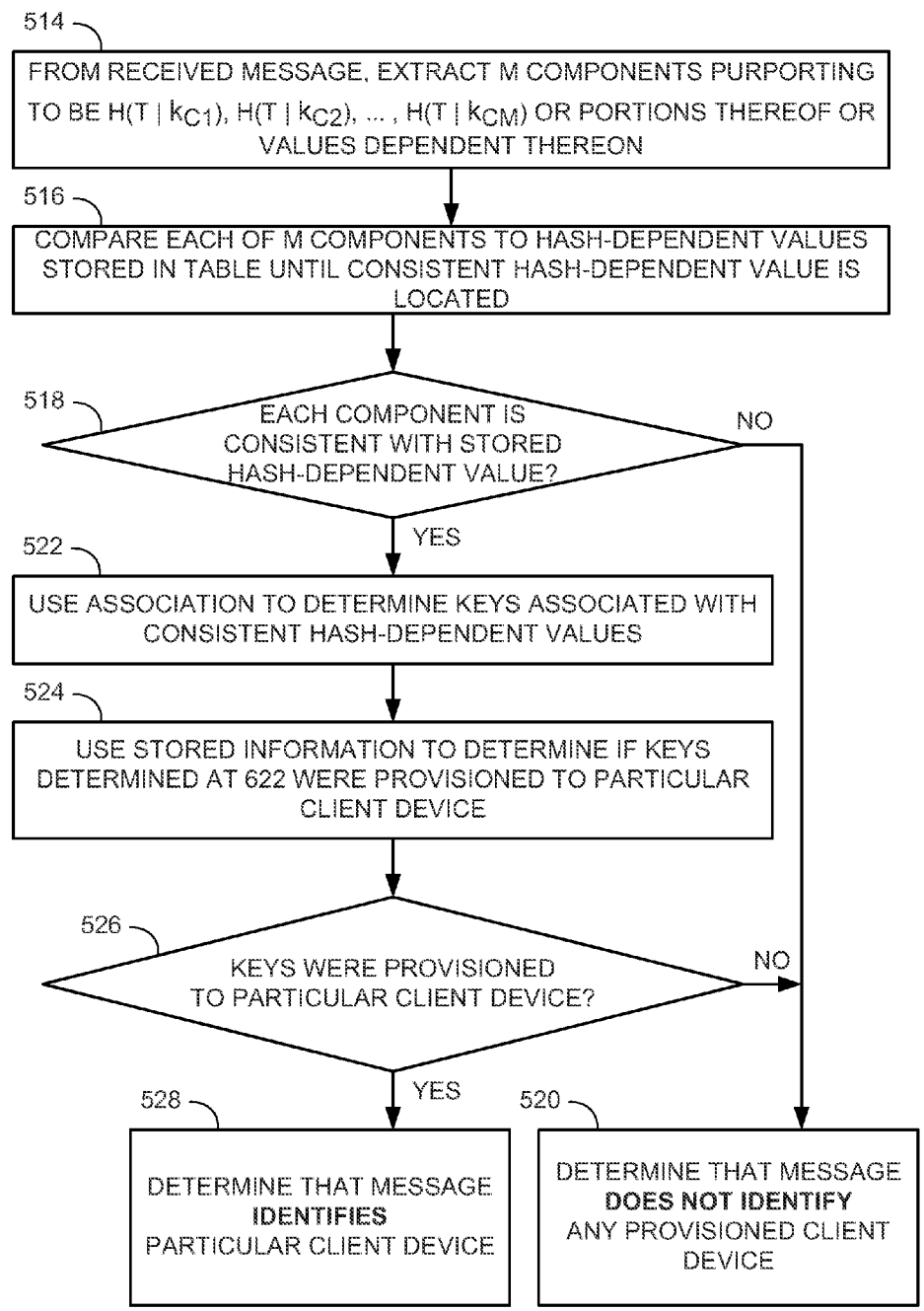

FIGS. 5-1 and 5-2 are flowcharts illustrating an example method to be performed by a receiving server for determining whether a received message identifies a provisioned client device and therefore could have been communicated by a client device that was provisioned with one or more client-identifying keys. The receiving server may be the same server as the provisioning server that is configured to perform the method illustrated in FIG. 3. Alternatively, the receiving server may be a separate server from the provisioning server, but may share information with the provisioning server, including, for example, the plurality of client-identifying keys ($k_1, k_2, \ldots, k_N$) and the information from which it is determinable which $M_j$ client-identifying keys were assigned to which client device j. In one example, the shared information is stored on one or more databases accessible by both the provisioning server and the receiving server.

The example method illustrated in FIG. 5-1 begins at 500 by having the server store or have access to the N client-identifying keys ($k_1, k_2, \ldots, k_N$). The server also stores or has access to the information from which it is determinable which $M_j$ client-identifying keys ($k_{C1}, k_{C2}, \ldots, k_{CMj}$) were assigned to which provisioned client device j. In this example, all client devices {j} have been provisioned with a subset of $M_j=M$ client-identifying keys.

At 502, the server calculates for each of the N client-identifying keys a hash of a combination of at least the current time interval value T and the client-identifying key, thereby obtaining N hashes: $H(T|k_1), H(T|k_2), \ldots, H(T|k_N)$. The nature of the combination and hash algorithm H are the same as that used by the client device to calculate hashes at 404.

At 504, the server may store each of the N calculated hashes or portions thereof or values dependent thereon as hash-dependent values in a table or some other suitable data structure. Although not shown, the server may store one or more additional tables of hash-dependent values determined from previous time interval values T or future time interval values T or both. Alternatively, the server may maintain a single table that includes hash-dependent values determined from the present time interval value T and from previous time interval values T or future time interval values T or both.

At 506, for each table of hash-dependent values, the server associates each one of the N hash-dependent values in the table with the respective one of the client-identifying keys from which the hash-dependent value was determined (or with the respective index of the one of the N client-identifying keys ($k_1, k_2, \ldots, k_N$) from which the hash-dependent value was determined).

At 508, the server checks whether it has received a message purporting to identify a provisioned client device. If the server does not receive any such message, and if the server determines at 510 that the time interval value T has increased, the server proceeds to repeat the calculation of the N hashes $H(T|k_1), H(T|k_2), \ldots, H(T|k_N)$ at 502 using the new time interval value T. The server may then store new hash-dependent values at 504, and, at 506, associate each one of the new hash-dependent values with the respective one of the N client-identifying keys from which the new hash-dependent value was determined (or with the respective index of the one of the N client-identifying keys from which the hash-dependent value was determined). As noted above, since the server may store additional hash-dependent values determined from previous time interval values T or future time interval values T or both, the new hash-dependent values may or may not overwrite previously stored hash-dependent values. Several tables of hash-dependent values and associations, such as reverse maps, may be maintained at any one time.

Once the server determines at 508 that it has received a message purporting to identify a provisioned client device, the server may proceed to determine at 512 whether the message identifies a provisioned client device.

The determination made at 512 is described in more detail by the actions illustrated in FIG. 5-2.

Since, in this example, all legitimate client devices were provisioned with a subset of M client-identifying keys, the server expects to receive M components in any message purporting to identify a provisioned client device. Thus, at 514, the server extracts from the received message M components purporting to be the hashes $H(T|k_{C1}), H(T|k_{C2}), \ldots, H(T|k_{CM})$ or portions thereof or values dependent thereon. Although not explicitly shown, the server may extract from the received message the M components purporting to be the hashes $H(T|k_{C1})$, $H(T|k_{C2}), \ldots, H(T|k_{CM})$ or portions thereof, and the server may subsequently calculate values dependent thereon. Extraction of the M components may occur separately for each individual component. Alternatively, in the case that the components have been combined, for example, using a Bloom filter, extraction of the M components may be understood as referring to the extraction of the combination.

At 516, the server compares each extracted component, or relevant portion thereof or value dependent thereon, to each value in the table of hash-dependent values stored at 504, or optionally to hash-dependent values stored in one or more additional tables. This may be done until the server locates hash-dependent values that are consistent with each of the M components extracted at 512.

At 518, the server checks whether there are stored hash-dependent values that are consistent with each of the M extracted components or relevant portions thereof or values dependent thereon. If the server determines at 518 that one or more of the M components or a relevant portion thereof or value dependent thereon is not consistent with any stored hash-dependent value, the server can determine with certainty at 520 that the received message does not identify any provisioned client device.

If the server determines at 518 that each of the M components or relevant portions thereof or values dependent thereon is consistent with a stored hash-dependent value, the server may proceed to use the association at 522 to determine the client-identifying key (or the index of the client-identifying key) that is associated with each consistent hash-dependent value. At 524, the server may then proceed to use the information stored at 500 (i.e., the information from which it is determinable which M client-identifying keys were assigned to which client device) to determine if the client-identifying keys determined at 522 were provisioned to a particular client device.

The server checks at 526 whether the client-identifying keys determined at 522 correspond to a subset that was provisioned to a particular client device. If the server determines at 526 that the subset of client-identifying keys determined at 522 was not provisioned to any particular client device, the server can proceed to determine with certainty at 520 that the message does not identify any provisioned client device. This may occur even if each of the M extracted components corresponds to a client-identifying key that was provisioned to a client device, but there is no single client device that has been provisioned with each of the client-identifying keys corresponding to the M extracted components. For example, with reference to FIG. 2, if an eavesdropping device overhears two of the hashes communicated by the client device 101 to the server 200, such as the hashes $H(T|k_8)$ and $H(T|k_{13})$, and the eavesdropping device also overhears two of the hashes communicated by the client device 102 to the server 200, such as the hashes $H(T|k_{30})$ and $H(T|k_{57})$, the eavesdropping device may attempt to identify itself to the server 200 using a combination of the eavesdropped hashes: $H(T|k_8)$, $H(T|k_{13})$, $H(T|k_{30})$, $H(T|k_{57})$. While the server 200 would determine at 518 that each of the four components is consistent with a stored hash value, after using the association at 522 and the stored information at 524, the server 200 would determine at 526 that the particular subset of client-identifying keys corresponding to the extracted components was not provisioned to any single client device. Thus, the server 200 would determine with certainty at 520 that the message did not identify any provisioned client device. However, it is possible that the combination of the eavesdropped hashes $H(T|k_8)$, $H(T|k_{13})$, $H(T|k_{30})$, $H(T|k_{57})$ could identify another client device not shown in FIG. 2. The larger the number N of client-identifying keys, the less likely it is that that a combination of eavesdropped hashes or hash-dependent values from several client devices would allow an eavesdropper to communicate an identity of another client device.

If the server determines 526 that the subset of client-identifying keys determined at 522 was provisioned to a particular client device, the server may proceed to determine at 528 that the message identifies that particular provisioned client device. The server is only able to determine at 528 that the message could have been communicated by the particular client device that the message purports to identify. The sender of the message is communicating a purported identity to the server, but is not yet proving to the server that it legitimately possesses that identity. A client device may prove that it possess the identity it purports to possess as part of an authentication process. This is described in more detail with respect to FIG. 14.

The proposed technique does not require the use of asymmetric cryptography or the use of symmetric cryptography. The proposed technique permits a client device's identity to be communicated in a way that cannot be understood by eavesdroppers, provided that the hash algorithm used is irreversible. While an eavesdropper may overhear the hash-dependent values communicated by a particular client device, the eavesdropper cannot determine the client-identifying keys from which the hash-dependent values were calculated, and therefore cannot infer the identity of the client device. Furthermore, since the hash-dependent values communicated by each client device change with each new time interval value T, it is not possible for a client device to be tracked by the eavesdropper from one time interval value T to the next. The eavesdropper cannot predict which hash-dependent values will be communicated by the client device during a future time interval value T.

An analysis of the performance of the proposed technique is presented herein using example parameters. In one example, the number N of client-identifying keys is N=1,000,000, and each one of the client-identifying keys is 160 bits in length. The hash algorithm H is SHA-1, which uses 512-bit blocks. This totals 64 MB of material to be hashed. According to the crypto++ 5.6.0 benchmarks page (www.cryptopp.com/benchmarks.html), an Intel® Core 2 at 1.83 GHz running a single core in 32-bit mode can compute a SHA-1 hash at a rate of 153 MB/s. This system should be able to complete the required 1,000,000 hash calculations in about two to three seconds, even with its modest CPU.

The server may build a table of hashes consisting of 2,000,000 32-bit buckets. The server may use the first 21 bits of a hash as an index into the table of hashes, and then store the next 12 bits of the hash and a 20-bit client-identifying key in the first free bucket. Very occasionally, the server will be required to test more than one possible consistent client-identifying key. The required storage space for such a table of hashes is approximately 8 MB. The server may be required to store two such tables of hashes, as the server will have to pre-compute the table of hashes for the next time interval value T before the current time interval ends. Thus, the server will need 16 MB of RAM to store the hash values and corresponding reverse index. Determining a subset of indices from a subset of hash values received in a message may take nearly constant time, and may take less time than that required for a single hash calculation. However, this time does not include the time required to perform a database lookup if random assignment of client-identifying keys were used.

The proposed technique may be used to communicate any identity without disclosing it to eavesdroppers. In one example, the concept may be applied to the communication of an identity of a group shared secret.

A server may authenticate a client device, for example, using a secret shared between the client device and the server, or a certificate signed by the server. In the case of the shared secret, the server has to spend time locating the secret in a database in order to authenticate the client device. In the case of the certificate, the server has to spend time performing computations in order to authenticate the client device.

When a server is bombarded with authentication requests by illegitimate client devices, the server's resources may become exhausted and the server may be unable to authenticate legitimate client devices. This is known as a Denial of Service (DOS) attack. To address this issue, U.S. patent application Ser. No. 13/083,981 to Suffling, herein incorporated by reference in its entirety, discloses a method whereby, prior to authentication, a client device may be pre-authenticated by proving its possession of a group shared secret that was previously provisioned to one or more legitimate client devices of the network server. Only those client devices that are in possession of the group shared secret may be successfully pre-authenticated and permitted to proceed to the more expensive step of authentication.

In one example, a provisioning server stores L group shared secrets. An authenticating server also maintains the set of L group shared secrets. The provisioning server provisions each client device j with a subset of $P_j$ of the L group shared secrets. When one of the client devices seeks to authenticate itself to the authenticating server, it transmits a "pre-authentication" request to the authenticating server based on a selected one of the $P_j$ group shared secrets with which it was provisioned. The pre-authentication request comprises some proof of knowledge of the selected group shared secret, such as a time-dependent hash of the group shared secret, together with an index or identifying number that identifies the selected group shared secret in the store of L group shared secrets. The authenticating server uses the received index value to locate the corresponding one of the L group shared secrets in its memory, and then calculates the hash of this group shared secret to determine if it matches the hashed value received from the client device. If there is a match, then the client device is pre-authenticated.

Because some client devices may share one or more of the same group shared secrets and the client device is only selecting one of its group shared secrets to communicate to the authenticating server, it is not uniquely identifying itself in its identification message. However, by including in the message the index of the group shared secret that it purports to possess, it is still communicating the identity of the selected group shared secret. This information could be used by an eavesdropper to track the client device. For example, an eavesdropper could overhear a particular client device communicating a message purporting to identify the group shared secret having index i. The next time the eavesdropper overhears a message purporting to identify the group shared secret having index i, the eavesdropper may be reasonably confident that the message originated at the particular client device. Using the index of the group shared secret selected by the particular client device, the eavesdropper may track the client device. To avoid this problem, the index of the group shared secret selected by the client device may be communicated to the server without disclosing it to eavesdroppers by applying the proposed technique.

In the examples described with respect to FIGS. 6-13, communication takes place over a public network (such as the Internet or a similar network), adapted to implement the Internet Protocol Suite (TCP/IP) as defined in RFC 1122 as published by the Internet Engineering Task Force, and optionally its predecessor, successor, and accompanying or complementary standards. Reference to a TCP/IP-based communication system is made due to its prevalence; again, however, the person skilled in the art will appreciate that the examples described herein may be applied in environments and on networks implementing different communication protocols. For example, other protocols such as the user datagram protocol (UDP), which may also be provided over IP, can be implemented as well.

Figure 6:
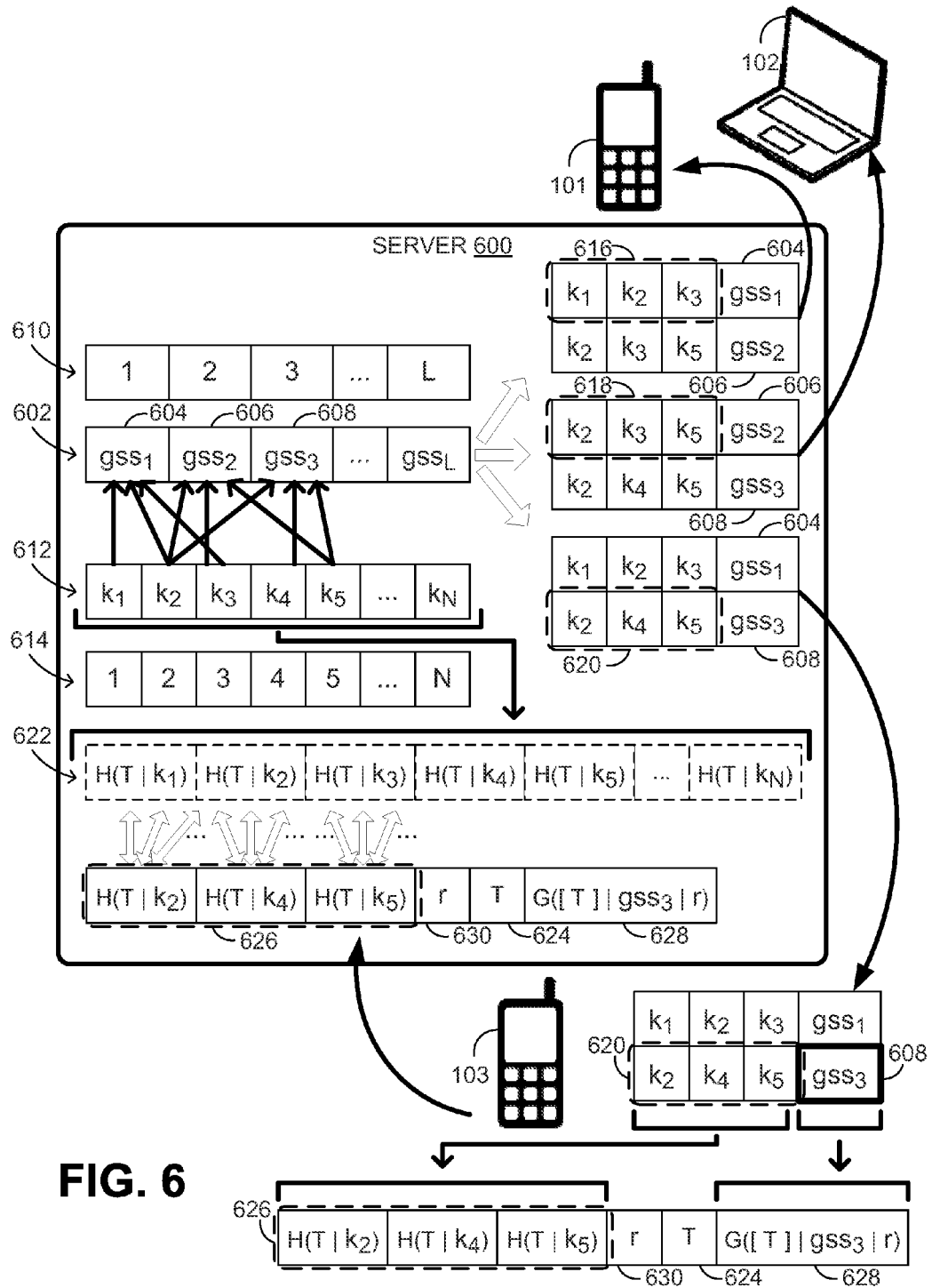
FIG. 6 is a schematic diagram illustrating a first example technique for the provisioning of group shared secrets by a server to a plurality of client devices, and the communicating of one client device's provisioned group shared secret to the server.

FIG. 6 is a schematic diagram illustrating a first example technique for the provisioning of group shared secrets by a server 600 to a plurality of client devices 101, 102 and 103, and the communicating of the identity of the client device 103's provisioned group shared secret to the server 600.

The server 600 may store or have access to L group shared secrets 602, including group shared secrets $gss_1$ 604, $gss_2$ 606 and $gss_3$ 608. The L group shared secrets may be identified by L corresponding indices 610, where L may take on any positive integer value. In another example (not shown), each of the L group shared secrets 602 may be identified by an arbitrary identifier. In yet another example (not shown), each of the L group shared secrets 602 may effectively identify itself Typically, the number L of group shared secrets 602 will be less than the number of client devices that may communicate with the server 600. In one example, the number L of group shared secrets 602 is L=1,000,000. Each one of the group shared secrets 602 is a distinct value. In one example, each of the group shared secrets 602 is an effectively random value, such that it cannot be generated again on another occasion, except by chance. In this case, the group shared secrets 602 would be stored by the server 600 for future reference, for example, in a lookup table. In another example, each of the group shared secrets 602 is a quasi-random or pseudo-random value generated using any suitable generation algorithm, such that the same group shared secret 602 can be reliably generated on another occasion in a repeatable manner. For example, a particular group shared secret $gss_i$ could be calculated as a hash of a concatenation of a random seed value s and an index i, that is $k_i$=h(s|i), where h is any suitable hash algorithm, such as SHA-1, SHA-2, or MD5. In this case, the group shared secrets 602 may not be stored by the server 600, provided that the server 600 maintains a record of the conditions under which the group shared secrets 602 were generated, including, for example, the hash algorithm h and the random seed value s. Each one of the group shared secrets 602 may be of a sufficient length that it cannot be easily predicted or guessed by an attacker.

The server 600 also stores N group shared secret identifying keys $(k_1, k_2, k_3, k_4, k_5, \ldots, k_N)$ 612. The N group shared secret identifying keys may be identified by N corresponding indices (1, 2, 3, 4, 5, ..., N) 614, where N may take on any positive integer value. In another example (not shown), each of the N group shared secret identifying keys 612 may be identified by an arbitrary identifier. In yet another example (not shown), each of the N group shared secret identifying keys 612 may effectively identify itself. Typically, the number N of group shared secret identifying keys 612 will be less than the number of group shared secrets.

Each one of the group shared secret identifying keys 612 is a distinct value. In one example, each of the group shared secret identifying keys 612 is an effectively random value, such that it cannot be generated again on another occasion, except by chance. In this case, the group shared secret identifying keys 612 would be stored by the server 600 for future reference, for example, in a lookup table. In another example, each of the group shared secret identifying keys 612 is a quasi-random or pseudo-random value generated using any suitable generation algorithm, such that the same group shared secret identifying key 612 can be reliably generated on another occasion in a repeatable manner. For example, a particular group shared secret identifying key $k_i$ could be calculated as a hash of a concatenation of a random seed value s and an index i, that is $k_i = h(s|i)$, where h is any suitable hash algorithm, such as SHA-1, SHA-2, or MD5. In this case, the group shared secret identifying keys 612 may not be stored by the server 600, provided that the server 600 maintains a record of the conditions under which the group shared secret identifying keys 612 were generated, including, for example, the hash algorithm h and the random seed value s. Each one of the group shared secret identifying keys 612 may be of a sufficient length and complexity that it cannot be easily predicted or guessed by an attacker.

In the example illustrated in FIG. 6, the server 600 assigns a subset of three of the N group shared secret identifying keys 612 to each one of the group shared secrets 602. In particular, the server 600 assigns a subset 616 of group shared secret identifying keys $(k_1, k_2, k_3)$ to the group shared secret $gss_1$ 604, a subset 618 of group shared secret identifying keys $(k_2, k_3, k_5)$ to the group shared secret $gss_2$ 606, and a subset 620 of group shared secret identifying keys $(k_2, k_4, k_5)$ to the group shared secret $gss_3$ 608. The assignment of a subset of the group shared secret identifying keys 612 to each one of the group shared secrets 602 may be carried out in a random, pseudo-random or quasi-random fashion or may be carried out in an arbitrary fashion, and the server 600 may maintain a record (not shown) of which of the group shared secret identifying keys 612 were provisioned to which group shared secret, for example, in the form of a mapping function or a lookup table. Alternatively, the assignment of a subset of the group shared secret identifying keys 612 to each one of the group shared secrets 602 may be carried out according to an algorithm. In either case, the server 600 may store information (not shown) from which it is determinable which of the group shared secret identifying keys 612 were provisioned to which group shared secret. Thus, the information may comprise the relevant mapping function, lookup table, algorithm or inverse thereof, or any other information by which the server 600 can determine which of the group shared secret identifying keys 612 were provisioned to which group shared secret, or can determine to which group shared secret the subset of group shared secret identifying keys 612 were assigned.

Some of the group shared secrets 602 may share one or more of the same group shared secret identifying keys 612. For example, in FIG. 6, the group shared secrets $gss_1$ 604 and $gss_3$ 608 have each been assigned the group shared secret identifying key $k_2$. It is also possible that some of the group shared secret identifying keys 612 may not yet be assigned to any group shared secret at all, or else that they may be assigned to group shared secrets that are not illustrated in FIG. 6. In this example, it is assumed that no two of the group shared secrets 602 are assigned exactly the same subset of the group shared secret identifying keys 612.

In the example illustrated in FIG. 6, the server 600 assigns and provisions to each of the client devices 101, 102 and 103 a subset of two of the group shared secrets 602. In particular, the server 600 provisions the group shared secrets $gss_1$ 604 and $gss_2$ 606 to the client device 101, the group shared secrets $gss_2$ 606 and $gss_3$ 608 to the client device 102, and the group shared secrets $gss_1$ 604 and $gss_3$ 608 to the client device 103. In addition, for each group shared secret provisioned to a client device, the client device also receives the subset of group shared secret identifying keys assigned to that group shared secret. For example, the client device 103 receives the subset 616 of group shared secret identifying keys $(k_1, k_2, k_3)$ for the group shared secret $gss_1$ 604 and the subset 620 of group shared secret identifying keys $(k_2, k_4, k_5)$ for the group shared secret $gss_3$ 608.

The subset of the group shared secrets 602 assigned to each client device, and the subset of group shared secret identifying keys 612 assigned to each group shared secret, may be embedded in the client device at the time of manufacture, or provisioned at a later date.

The assignment of a subset of the group shared secrets 602 to each client device may be carried out in a random, pseudo-random or quasi-random fashion or may be carried out in an arbitrary fashion. Alternatively, the assignment of a subset of the group shared secrets 602 to each client device may be carried out according to an algorithm.

As described with respect to FIG. 1 and FIG. 2, the server 600 may possess a time interval value T that changes from time to time and is agreed on by the server 600 and any provisioned client devices. For example, the server 600 might broadcast the current time interval value T. For each new time interval value T, the server 600 may calculate for each of the group shared secret identifying keys 612 a hash of a combination of at least the time interval value T and the group shared secret identifying key using a hash algorithm H, as described previously. In the example of FIG. 6, the server 600 uses the hash algorithm H to compute hashes $H(T|k_1), H(T|k_2), H(T|k_3), H(T|k_4), H(T|k_5), \ldots, H(T|k_N)$, which the server 600 may store in a table 622 or some other suitable data structure (not shown). Alternatively, the server 600 may store only portions of the hashes, or some other values dependent thereon. In order to account for client devices that possess adjacent time interval values T, the server 600 may maintain one or more additional tables of hash-dependent values (not shown) determined from previous time interval values T or future time interval values T or both. Alternatively, the server 600 may maintain a single table that includes hash-dependent values determined from the present time interval value T and from previous time interval values T or future time interval values T or both. Although this description indicates that the same hash algorithm H is used to compute the hashes for all group shared secret identifying keys, different hash algorithms could be used to compute the hashes for different ones of the group shared secret identifying keys. That is, a hash algorithm Ha could be used to compute the hash $Ha(T|k_1)$ and a different hash algorithm Hb could be used to compute the hash $Hb(T|k_2)$, provided that the provisioned client device also knows to use the hash algorithm Ha for computing $Ha(T|k_1)$ and the hash algorithm Hb for computing $Hb(T|k_2)$.

For each table of hash-dependent values, the server 600 may associate each one of the hash-dependent values with the respective one of the group shared secret identifying keys 612 from which the hash-dependent value was determined (or with the respective index of the group shared secret identifying key 612 from which the hash-dependent value was calculated). The association be implemented as described previously with respect to FIG. 1. In the example of FIG. 6, the association (not shown) for the table 622 of hash-dependent values would associate each one of the hash-dependent values in the table 622 with a corresponding one of the group shared secret identifying keys 612 (or with a corresponding one of the indices 614).

The client device 103 may seek to communicate a group shared secret to the server 600. In the example of FIG. 6, the client device 103 selects the group shared secret $gss_3$ 608 to communicate to the server 600. Thus, for each of the group shared secret identifying keys 620 corresponding to the group shared secret $gss_3$ 608, the client device 103 may calculate a hash by applying the hash algorithm H to a combination of at least the current time interval value T 624 and the group shared secret identifying key. The nature of the combination and the definition of the hash algorithm H are the same as that used by the server 600 to calculate the hashes $H(T|k_1)$, $H(T|k_2)$, $H(T|k_3)$, $H(T|k_4)$, $H(T|k_5)$, ..., $H(T|k_N)$ as described previously. From these hash calculations, the client device 103 may obtain three hashes 626: $H(T|k_2)$, $H(T|k_4)$, and $H(T|k_5)$. In the same manner that the hashes 214 were used by the server 200 to arrive at the identity of the client device 103, the server 600 may use the hashes 626 to arrive at the identity of the group shared secret $gss_3$ 608 selected by the client device 103.

In addition to communicating an identity of a group shared secret, the client device may seek to prove to the server that it possesses the group shared secret that it has identified. This may be done by communicating an additional hash value to the server. In this example, the client device 103 calculates an additional hash by applying a hash algorithm G to a combination of at least the current time interval value T 624 (optionally), the selected group shared secret $gss_3$ 608, and a value r 630. From this hash calculation, the client device 103 may obtain a hash $G([T]|gss_3|r)$ 628, where square brackets are used to indicate that the current time interval value T is optional. Alternatively, a different time interval value could be used in place of the time interval value T. The hash algorithm G used to obtain the hash 628 may be the same as or different than the hash algorithm H used to obtain the hash 626. In one example, the value r is a pseudo-random value chosen by the client device, and is determined by applying a hash algorithm to a combination of the current time interval value T and a secret constant $C_{CLIENT}$ specific to the client device.

The client device 103 communicates to the server 600 a message comprising the hashes 626, the value r 630, the current time interval value T 624, and the hash 628. The hashes 626 are included so that the client device 103 can communicate the identity of the group shared secret $gss_3$ 608 that it purports to possess. The hash 628 and the value r 630 are included so that the client device 103 may prove to the server 600 that it possesses the group shared secret $gss_3$ 608. The value r may be used to detect replay attacks. For example, if the server 600 receives a message comprising a value r that is the same as the value r that was communicated in a previously received message, the server 600 may determine that the current message is a replay attack. In the case that the value r 630 is related in some way to the time interval value T 624, a client device may be prevented from communicating multiple identification messages is rapid succession. Since the server 600 may be unable to keep a record of every value r ever used, using the time interval value T 624 in the calculation of the value r 630 may assure the server 600 that the value r 630 is not some old value that is being replayed. The current time interval value T 624 may also be included in the message so that the server 600 is privy to which value of the time interval value T was used to calculate the hashes 626, and optionally the hash 628, and so that the server 600 may confirm that client device 103 possesses the correct time interval value T.

To determine the identity of the group shared secret that the client device 103 purports to possess, the server 600 proceeds to compare each one of the hashes 626 to the hashes in the table 622 stored on the server 600. As described previously with respect to FIG. 1 and FIG. 2, it will be appreciated that, in the case that the server 600 stores only portions of hashes or some other values dependent thereon in the table 622, the server 600 may use corresponding portions of the hashes 626 or values dependent thereon for the comparison. Once the server 600 locates stored hash-dependent values that are consistent with the received hashes 626 or portions thereof or values dependent thereon, the server 600 may use the association to determine which of the group shared secret identifying keys 612 (or the indices 614) are associated with the consistent hash-dependent values. In this case, the server 600 may use the association to determine that the hash-dependent values that are consistent with the received hashes 626 or portions thereof or values dependent thereon are associated with the group shared secret identifying keys $k_2$, $k_4$, $k_5$ (or with the indices 2, 4 and 5). Now the server 600 may use the stored information (not shown) from which it is determinable which of the group shared secret identifying keys 612 were assigned to which group shared secret in order to determine which one of the group shared secrets 702, if any, was assigned the group shared secret identifying keys $k_2$, $k_4$, and $k_5$ (or with the keys having the indices 2, 4 and 5). In this case, the server 600 determines that it was the group shared secret $gss_3$ 608 that was assigned the subset 620 of group shared secret identifying keys ($k_2$, $k_4$, $k_5$).

In this example, no two group shared secrets were assigned exactly the same subset of the group shared secret identifying keys 612, and thus the subset 620 of group shared secret identifying keys ($k_2$, $k_4$, $k_5$) is unique to the group shared secret $gss_3$ 608. It follows that the client device 103 may use the group shared secret identifying keys ($k_2$, $k_4$, $k_5$) to uniquely identify its choice of group shared secret to the server 600, and it may do so in a way that cannot be understood or tracked by an eavesdropper from one time interval value T to the next. It will be apparent to those of ordinary skill in the art that, if care is taken in provisioning, it may be possible for a client device to uniquely identify its choice of group shared secret using only some of the group shared secret identifying keys that were assigned to the group shared secret. For example, in this simple case, it will be apparent that the group shared secret $gss_3$ 608 could be uniquely identified to the server 200 using only the group shared secret identifying key $k_4$ because this key was not assigned to either of the other group shared secrets $gss_1$ or $gss_2$).

At this point, the client device 103 has only communicated to the server 600 the identity of the group shared secret that it purports to possess. It has not yet proven that it actually possesses the identified group shared secret. For example, an eavesdropping device overhearing the hashes 626 could repeat them to the server 600 during the same time interval value T 624, and would also be purporting to possess the group shared secret $gss_3$ 608. The eavesdropping device may not even be aware of which group shared secret it is purporting to possess.

In order to verify that the client device 103 actually possesses the group shared secret $gss_3$ 608 that it has identified, the server 600 may calculate an additional hash (not shown) by applying the hash algorithm G to a combination of at least the current time interval value T (optionally), the group shared secret $gss_3$ 608, and the value r 630 that it received from the client device 103. From this hash calculation, the server 600 may obtain a calculated hash $G([T]|gss_3|r)$ (not shown). The nature of the combination and definition of the hash algorithm G are the same as that used by the client device 103 to obtain the hash 628. The server 600 may then compare the calculated hash (not shown) to the hash 628 received from the client device 103. Alternatively, the server 600 may only compare corresponding portions of the calculated hash and the hash 628, or values dependent thereon. If the hash-dependent values are consistent, the server 600 may determine that the client device 103 possesses the group shared secret key $gss_3$ 608 that it has identified.

While the server 600 is illustrated as a single device, it is contemplated that the server 600 may comprise multiple devices. For example, the server 600 may comprise one or more provisioning servers, each of which is configured to provision one or more of the group shared secrets 702 and the group shared secret identifying keys 612 to one or more client devices. The server 600 may also comprise one or more receiving servers, each of which is able to receive a message purporting to identify a group shared secret and prove the sender's possession of the identified group shared secret. The calculation of the hashes $H(T|k_1)$, $H(T|k_2)$, $H(T|k_3)$, $H(T|k_4)$, $H(T|k_5)$, ..., $H(T|k_N)$ and the determination of the hash-dependent values to be stored in the table 622 for a particular time interval value T may be performed by the one or more provisioning servers or by the one or more receiving servers or by some combination thereof. For example, the one or more provisioning servers may share information with the one or more receiving servers, such as any of the group shared secrets 702, any of the group shared secret identifying keys 612 and the information from which it is determinable which group shared secret identifying keys were assigned to which group shared secret. In one example, the shared information is stored on one or more databases accessible by the one or more provisioning servers and the one or more receiving servers. In another example, in the case of more than one receiving server, each receiving server may only be able to identify a subset of the group shared secrets. For example, the receiving server may not have access to all of the group shared secret identifying keys or to the information from which it is determinable which group shared secret identifying keys were provisioned to which group shared secret.

Figure 7:
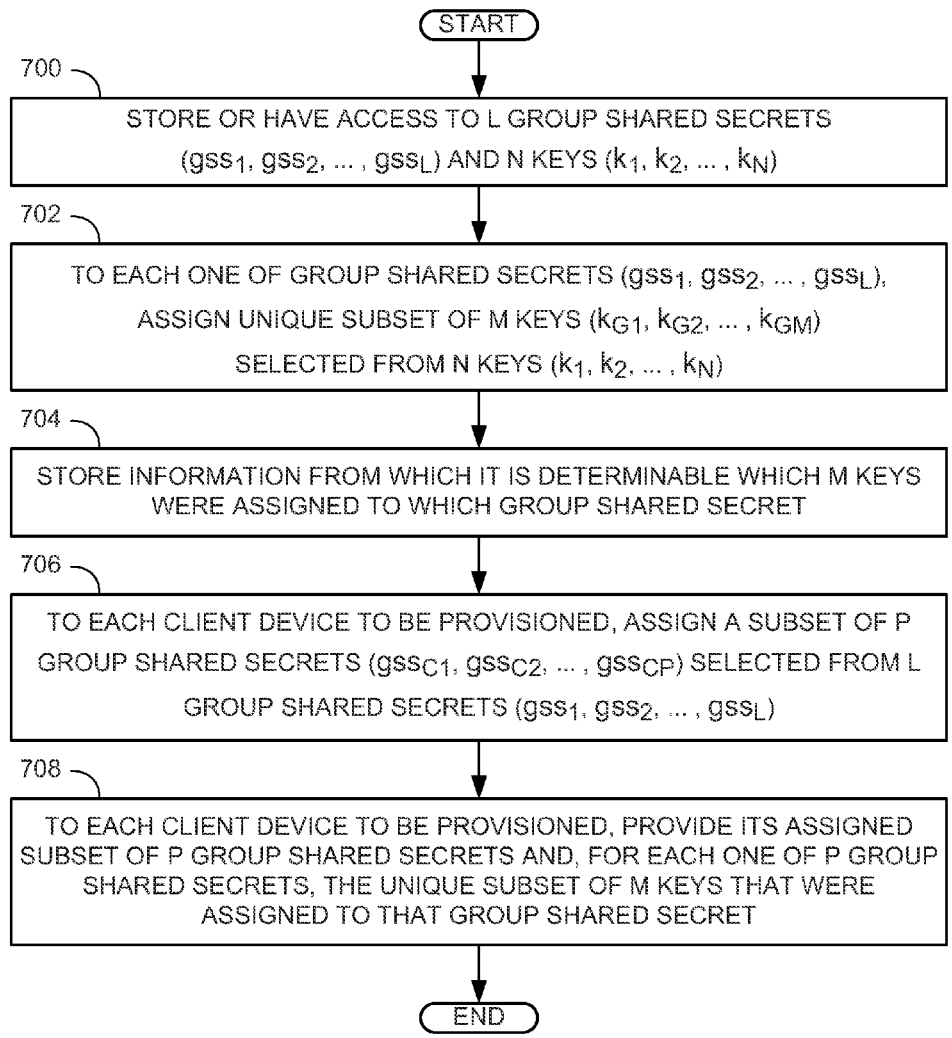
FIG. 7 is a flowchart illustrating a first example method to be performed by a provisioning server for provisioning group shared secret identifying keys to client devices.

FIG. 7 is a flowchart illustrating a first example method to be performed by a provisioning server for provisioning group shared secrets to client devices.

The method begins at 700 by having the provisioning server store or have access to a plurality of L group shared secrets ($gss_1$, $gss_2$, ..., $gss_L$), also denoted as group shared secrets $\{gss_q\}$. The L group shared secrets may be identified by indices (1, 2, ..., L), where L may take on any positive integer value. Alternatively, each of the group shared secrets $\{gss_q\}$ may be identified by an arbitrary identifier or may effectively identify itself. The provisioning server also stores or has access to a plurality of N group shared secret identifying keys ($k_1$, $k_2$, ..., $k_N$). The N group shared secret identifying keys may be identified by indices (1, 2, ..., N). Alternatively, each of the group shared secret identifying keys ($k_1$, $k_2$, ..., $k_N$) may be identified by an arbitrary identifier or may effectively identify itself.

Each one of the group shared secrets $\{gss_q\}$ and the group shared secret identifying keys ($k_1$, $k_2$, ..., $k_N$) is a distinct value, such as an effectively random value, a quasi-random or a pseudo-random value, or a value that can be reliably generated on another occasion in a repeatable manner. In the latter case, it will be appreciated that the server may not explicitly store the group shared secrets $\{gss_q\}$ and/or the group shared secret identifying keys ($k_1$, $k_2$, ..., $k_N$), provided that the server maintains a record of the conditions under which the group shared secrets and/or the group shared secret identifying keys were generated. Each one of the group shared secrets $\{gss_q\}$ and the group shared secret identifying keys ($k_1$, $k_2$, ..., $k_N$) may be of a sufficient length and complexity that it cannot be easily predicted or guessed by an attacker At 702, the provisioning server assigns to each group shared secret $gss_q$ a unique subset of $M_q$ group shared secret identifying keys ($k_{G1}$, $k_{G2}$, ..., $k_{GMq}$) selected from the N group shared secret identifying keys ($k_1$, $k_2$, ..., $k_N$), where $M_q$ is a positive integer less than N. In the example illustrated in FIG. 6, the number $M_q$ of group shared secret identifying keys in the subset for all group shared secrets $\{gss_q\}$ is $M_q$=3. In other examples, some of the group shared secrets $\{gss_q\}$ may have more group shared secret identifying keys provisioned thereto than others of the group shared secrets $\{gss_q\}$. In the present example, all group shared secrets $\{gss_q\}$ are provisioned with a subset of $M_q$=M group shared secret identifying keys. The assignment of the subsets of group shared secret identifying keys to the group shared secrets $\{gss_q\}$ may be carried out in a random, pseudo-random or quasi-random fashion or may be carried out in an arbitrary fashion, and the server may maintain a record of which of the N group shared secret identifying keys ($k_1$, $k_2$, ..., $k_N$) were assigned to which group shared secret $gss_q$, for example, in the form of a mapping function or a lookup table. Alternatively, the assignment of the subsets of group shared secret identifying keys to the group shared secrets $\{gss_q\}$ may be carried out according to an algorithm. As noted previously, two or more group shared secrets may be assigned one or more of the same group shared secret identifying keys, provided that no two group shared secrets are assigned the exact same subset (km, $k_{G2}$, ..., $k_{GM}$) of the group shared secret identifying keys ($k_1$, $k_2$, ..., $k_N$). It is also possible that some of the group shared secret identifying keys ($k_1$, $k_2$, ..., $k_N$) may not be assigned to any group shared secret at all.

At 704, the provisioning server may store information from which it is determinable which M group shared secret identifying keys were assigned to which group shared secret. The information may comprise the relevant mapping function, lookup table, algorithm or inverse thereof, or any other information by which the server can determine which of the group shared secret identifying keys were assigned to which group shared secret.

At 706, the provisioning server assigns to each client device j to be provisioned a subset of $P_j$ group shared secrets ($gss_{C1}$, $gss_{C2}$, ..., $gss_{CPj}$) selected from the L group shared secrets ($gss_j$, $gss_2$, ..., $gss_L$), where $P_j$ is a positive integer less than L. In the example illustrated in FIG. 6, the number $P_j$ of group shared secrets in the subset for all client devices $\{j\}$ is $P_j$=2. In other examples, some of the client devices $\{j\}$ may have more group shared secrets provisioned thereto than others of the client devices $\{j\}$. In the present example, all client devices $\{j\}$ are provisioned with a subset of $P_j$=P group shared secret identifying keys. The assignment of the subsets of group shared secrets to the client devices $\{j\}$ may be carried out in a random, pseudo-random or quasi-random fashion or may be carried out in an arbitrary fashion. Alternatively, the assignment of the subsets of group shared secrets to the client devices $\{j\}$ may be carried out according to an algorithm. Two or more client devices may be assigned one or more of the same group shared secrets. It is also possible that some of the group shared secrets $\{gss_q\}$ may not yet be assigned to any client device at all.

It should be noted that if two client devices are provisioned with an identical subset of P of the L group shared secrets, and all of those P group shared secrets are compromised, both of the client devices will be compromised as a result. To avoid this, each client device may be provisioned with a unique subset of P group shared secrets. Thus, if a client device happens to select from its subset a group shared secret that is compromised, it may still proceed to attempt to identify another one of its P group shared secrets.

At 708, the provisioning server provides to each client device to be provisioned its respective assigned subset of P group shared secrets ($gss_{C1}$, $gss_{C2}$, ..., $gss_{CP}$). In addition, for each one of the P group shared secrets ($gss_{C1}$, $gss_{C2}$, ..., $gss_{CP}$), the provisioning server provides to the client device the unique subset of M group shared secret identifying keys ($k_{G1}$, $k_{G2}$, ..., $k_{GM}$) assigned to that group shared secret. The subset of P group shared secrets ($gss_{C1}$, $gss_{C2}$, ..., $gss_{CP}$) assigned to each client device, and the unique subset of M group shared secret identifying keys ($k_{G1}$, $k_{G2}$, ..., $k_{GM}$) assigned to each group shared secret, may be embedded in a client device at the time of manufacture, or provisioned at a later date, for example, via a storage module such as a SIM, or via a transmission over a secure channel.

Figure 8:
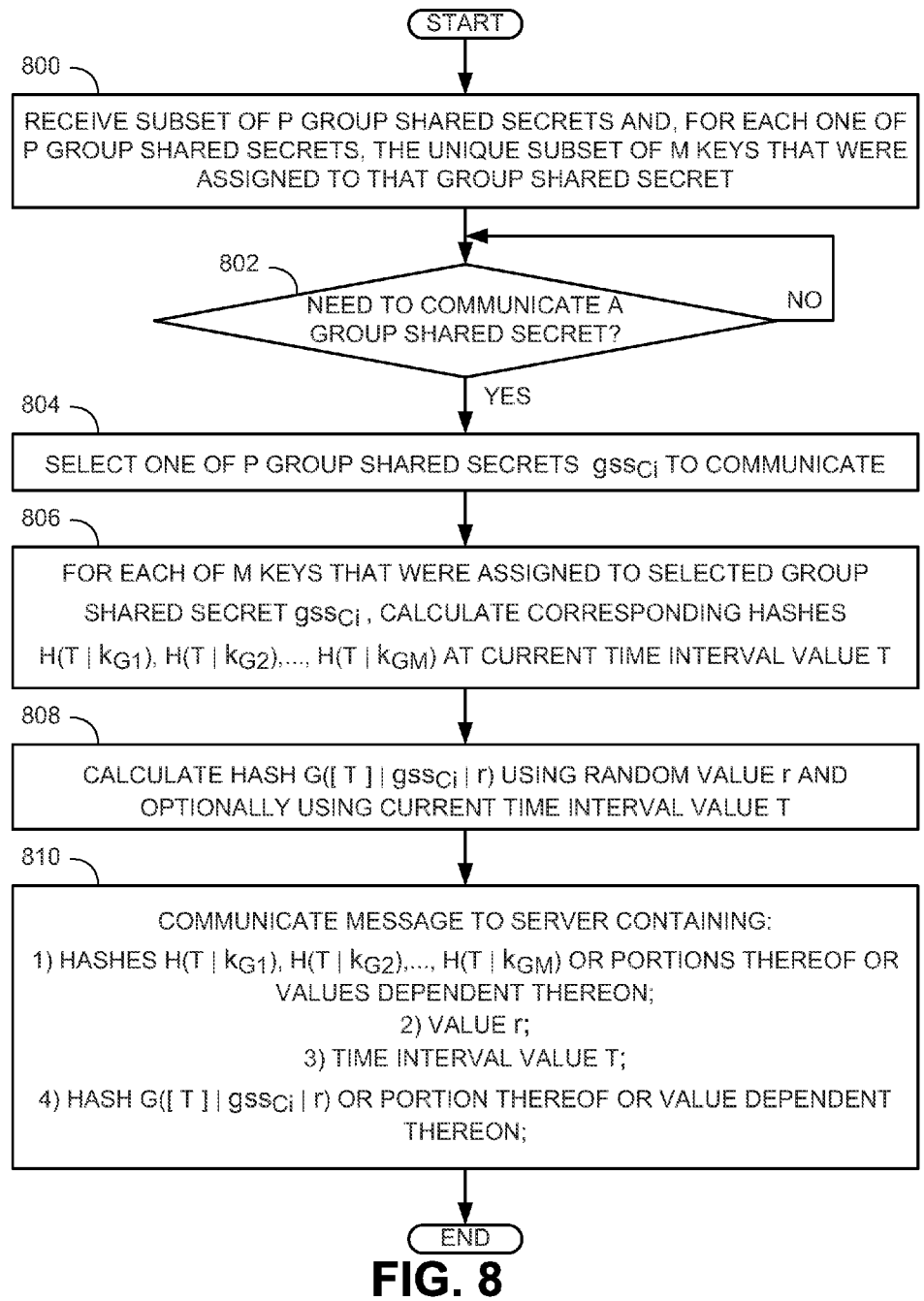
FIG. 8 is a flowchart illustrating a first example method to be performed by a provisioned client device for communicating one of its provisioned group shared secrets to a receiving server.

FIG. 8 is a flowchart illustrating a first example method to be performed by a provisioned client device for communicating one of its provisioned group shared secrets to a receiving server.

At 800, the client device receives from a provisioning server a subset of P group shared secrets ($gss_{C1}$, $gss_{C2}$, ..., $gss_{CP}$) and, for each one of the P group shared secrets, the client device receives a unique subset of M group shared secret identifying keys ($k_{G1}$, $k_{G2}$, ..., $k_{GM}$). As described above, the subset of P group shared secrets ($gss_{C1}$, $gss_{C2}$, ..., $gss_{CP}$), and the unique subset of M group shared secret identifying keys ($k_{G1}$, $k_{G2}$, ..., $k_{GM}$) assigned to each group shared secret, may be embedded in the client device at the time of manufacture, or received at a later date.

At some point after being provisioned with its subset of group shared secrets ($gss_{C1}$, $gss_{C2}$, ..., $gss_{CP}$) and the unique subsets of group shared secret identifying keys ($k_{G1}$, $k_{G2}$, ..., $k_{GM}$) corresponding to each group shared secret, the client device may determine at 802 that it has a need to communicate a group shared secret to a server. For example, it may seek to pre-authenticate itself to a web server.

Once the client device determines at 802 that it has a need to communicate a group shared secret to the server, the client device may proceed at 804 to select one of its P group shared secrets ($gss_{C1}$, $gss_{C2}$, ..., $gss_{CP}$) to communicate to the server. The selected group shared secret is denoted $gss_{Ci}$.

At 806, the client device may proceed to calculate, for each of the M group shared secret identifying keys assigned to the selected group shared secret $gss_{Ci}$, a hash by applying a hash algorithm H to a combination of at least the current time interval value T and the group shared secret identifying key, thereby obtaining M hashes: $H(T|k_{G1})$, $H(T|k_{G2})$, ..., $H(T|k_{GM})$. Although not explicitly shown, the client device may receive one or more of the current time interval value T, an indication of the hash algorithm H, and an indication of the nature of the combination via a broadcast from the provisioning server or a receiving server.

At 808, the client device calculates another hash by application a hash algorithm G to a combination of the current time interval value T (optionally), the selected group shared secret $gss_{Ci}$, and a value r, thereby obtaining a hash $G([T]|gss_{Ci}|r)$, where the value r is used to detect replay attacks as described previously.

At 810, the client device communicates a message to the server comprising each one of the M hashes $H(T|k_{G1})$, $H(T|k_{G2})$, ..., $H(T|k_{GM})$ calculated at 806, the value r, the current time interval value T, and the hash $G([T]|gss_{Ci}|r)$ calculated at 808. Alternatively to including each of the M hashes $H(T|k_{G1})$, $H(T|k_{G2})$, ..., $H(T|k_{GM})$ in its entirety in the message, the client device may include only portions of the M hashes or values dependent thereon. Similarly, the client device may include a portion of the hash $G([T]|gss_{Ci}|r)$ or a value dependent thereon. The order of the values in the message may be agreed on by the server and the provisioned client devices.

The methods described herein are based on the assumption that each group shared secret is assigned the same number M of group shared secret identifying keys. However, it will be apparent to a person of ordinary skill in the art that different group shared secrets may be assigned different numbers of group shared secret identifying keys, provided that no group shared secret is assigned a subset of another group shared secret's group shared secret identifying keys. In one example, a client device may indicate in the message communicated at 810 the number of group shared secret identifying keys to which the message pertains.

Figures 1, 9:
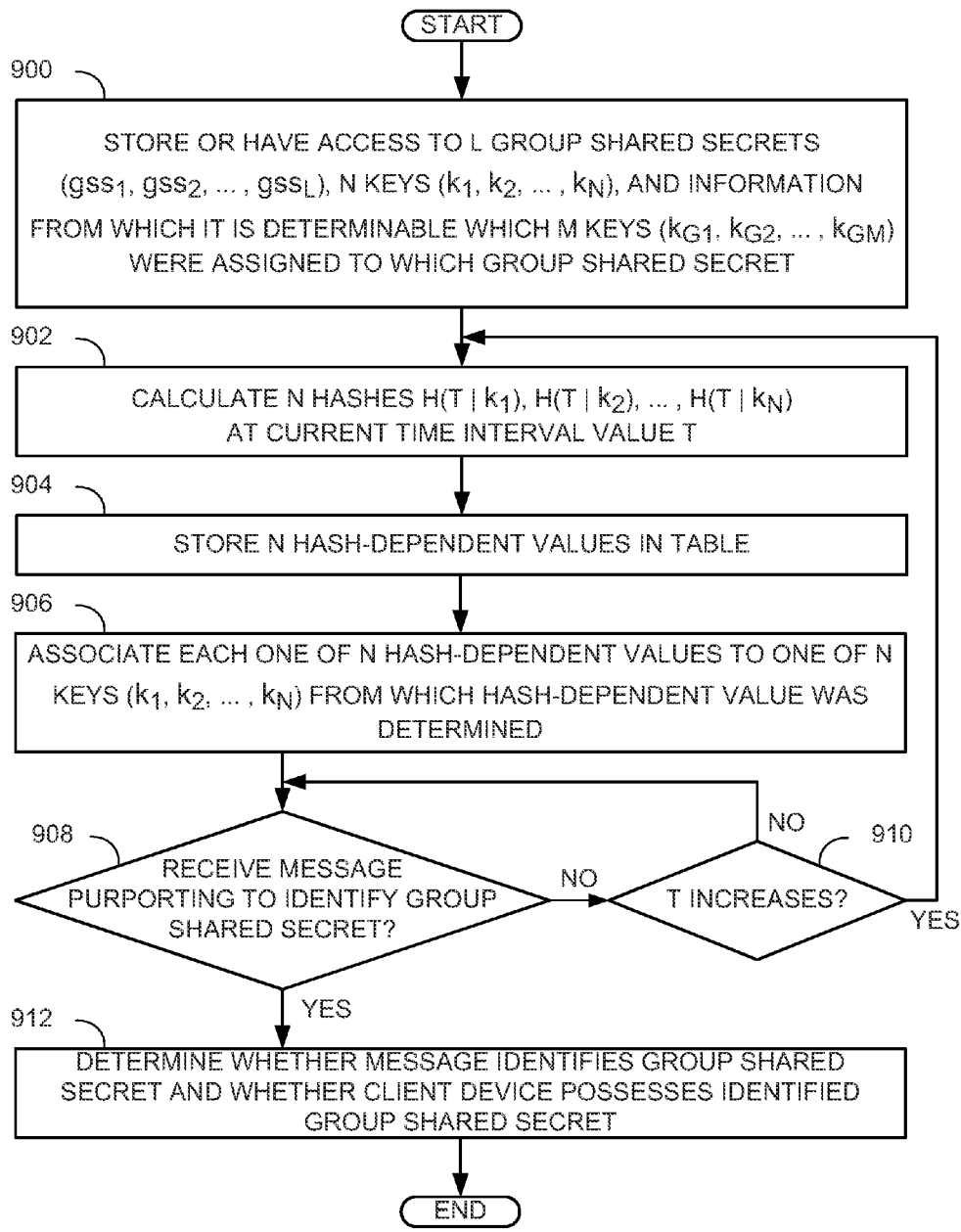
Figures 2, 9:
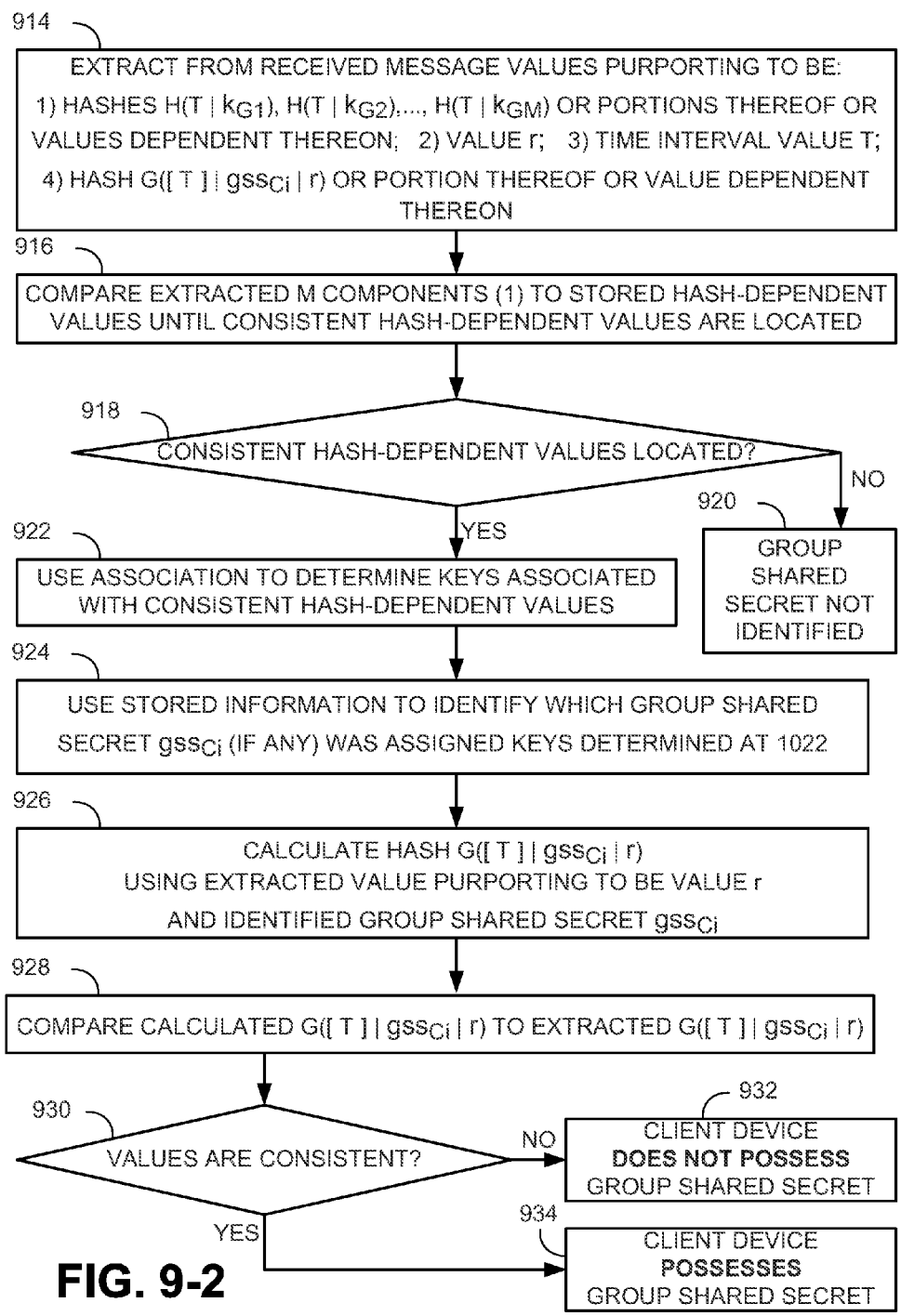

FIGS. 9-1 and 9-2 are flowcharts illustrating a first example method to be performed by a receiving server for determining whether a received message from a client device identifies a group shared secret and whether the client device possesses the identified group shared secret. The receiving server may be the same server as the provisioning server that is configured to perform the method illustrated in FIG. 7. Alternatively, the receiving server may be a separate server from the provisioning server, but may share information with the provisioning server, including, for example, the group shared secrets ($gss_1$, $gss_2$, ..., $gss_L$), the group shared secret identifying keys ($k_1$, $k_2$, ..., $k_N$) and the information from which it is determinable which $M_q$ group shared secret identifying keys were assigned to which group shared secret $gss_q$. In one example, the shared information is stored on one or more databases accessible by the provisioning server and the receiving server.

The method illustrated in FIG. 9-1 begins at 900 by having the server store or have access to the L of group shared secrets ($gss_1$, $gss_2$, ..., $gss_L$), as well as the N group shared secret identifying keys ($k_1$, $k_2$, ..., $k_N$). The server also stores or has access to the information from which it is determinable which $M_q$ group shared secret identifying keys ($k_{G1}$, $k_{G2}$, ..., $k_{GM}$) were assigned to which group shared secret $gss_q$. In this example, all group shared secrets $\{gss_q\}$ have been assigned a subset $M_q$=M group shared secret identifying keys.

At 902, the server calculates for each of the N group shared secret identifying keys a hash of a combination of at least the current time interval value T and the group shared secret identifying key, thereby obtaining N hashes: $H(T|k_1)$, $H(T|k_2)$, ..., $H(T|k_N)$. The nature of the combination and the hash algorithm H are the same as that used by the client device to calculate hashes at 808.

In another example, not shown in FIGS. 8 and 9-1, the client device and the server may include the index of the group shared secret identifying key in each of the hash calculations performed at 806 and 902, respectively. Thus, instead of calculating M hashes $H(T|k_{G1})$, $H(T|k_{G2})$, ..., $H(T|k_{GM})$, the client device may calculate M hashes $H(T|G1|k_{G1})$, $H(T|G2|k_{G2})$, ..., $H(T|GM|k_{GM})$. Similarly, instead of calculating N hashes $H(T|k_1)$, $H(T|k_2)$, ..., $H(T|k_N)$, the server may calculate N hashes $H(T|1|k_1)$, $H(T|2|k_2)$, ..., $H(T|N|k_N)$.

At 904, the server may store each of the N calculated hashes or portions thereof or values dependent thereon as hash-dependent values in a table or some other suitable data structure. Although not shown, the server may store one or more additional tables of hash-dependent values determined from previous time interval values T or future time interval values T or both. Alternatively, the server may maintain a single table that includes hash-dependent values determined from the present time interval value T and from previous time interval values T or future time interval values T or both.

At 906, for each table of hash-dependent values, the server associates each one of the N hash-dependent values in the table with the respective one of the N group shared secret identifying keys from which the hash-dependent value was determined (or with the respective index of the one of the N group shared secret identifying keys ($k_1, k_2, \ldots, k_N$) from which the hash-dependent value was determined).

At 908, the server checks whether it has received a message purporting to identify a group shared secret. If the server does not receive any such message, and if the server determines at 910 that the time interval value T has increased, the server proceeds to repeat the calculation of the N hashes $H(T|k_1)$, $H(T|k_2)$, ..., $H(T|k_N)$ at 902 using the new time interval value T. The server may then store new hash-dependent values at 904, and generate at 906 the association of each one of the new hash-dependent values with the respective one of the N group shared secret identifying keys from which the new hash-dependent value was determined (or with the respective index of the one of the N group shared secret identifying keys from which the hash-dependent value was determined). As noted above, since the server may store additional hash-dependent values determined from previous time interval values T or future time interval values T or both, the new hash-dependent values may or may not overwrite previously stored hash-dependent values. Several tables of hash-dependent values and associations may be maintained at any one time.

Once the server determines at 908 that it has received a message purporting to identify a group shared secret, the server may proceed to determine at 912 whether the message identifies a group shared secret and whether the client device from which the message was received possesses the identified group shared secret.

The determination made at 912 is described in more detail by the actions illustrated in FIG. 9-2.

At 914, the server extracts from the received message values purporting to be: the hashes $H(T|k_{G1})$, $H(T|k_{G2})$, ..., $H(T|k_{GM})$ or portions thereof or values dependent thereon, as well as the value r, the current time interval value T, and the hash $G([T]|gss_{Ci}|r)$ or a portion thereof or value dependent thereon. Extraction of the components may occur separately for each individual component. Alternatively, in the case that the components have been combined, for example, using a Bloom filter, extraction of the components may be understood as referring to the extraction of the combination.

At 916, the server compares each one of the M extracted hashes $H(T|k_{G1})$, $H(T|k_{G2})$, ..., $H(T|k_{GM})$ or relevant portions thereof or values dependent thereon to each value in the table of hash-dependent values stored at 904, or optionally to hash-dependent values stored in one or more additional tables. This may be done until the server locates hash-dependent values that are consistent with each of the M extracted values in the received message.

At 918, the server checks whether there are stored hash-dependent values that are consistent with each of the M extracted hashes $H(T|k_{G1})$, $H(T|k_{G2})$, ..., $H(T|k_{GM})$ or relevant portions thereof or values dependent thereon. If the server determines at 918 that one or more of the M extracted hashes or relevant portions thereof or values dependent thereon are not consistent with any stored hash-dependent value, the server can determine with certainty at 920 that the client device is not identifying a group shared secret.

If the server determines at 918 that each of the M extracted hashes $H(T|k_{G1})$, $H(T|k_{G2})$, ..., $H(T|k_{GM})$ or portions thereof or values dependent thereon is consistent with a stored hash-dependent value, the server may proceed to use the association at 922 to determine the group shared secret identifying key (or the index of the group shared secret identifying key) that is associated with each consistent hash-dependent value. At 924, the server may use the information stored at 900 (i.e., the information from which it is determinable which M group shared secret identifying keys were assigned to which group shared secret) to determine which group shared secret $gss_{Ci}$, if any, was assigned the group shared secret identifying keys determined at 922. Although not explicitly shown, if the server determines at 924 that there is no group shared secret that was assigned the group shared secret identifying keys determined at 922, the server may determine that the client device is not identifying a group shared secret and the method may end.

In order to verify that the client device from which the message is received actually possesses the identified group shared secret $gss_{Ci}$, the server may calculate at 926 an additional hash by applying the hash algorithm G to a combination of at least the current time interval value T (optionally), the identified group shared secret $gss_{Ci}$ identified at 924, and the value r that it extracted from the received message at 914. From this hash calculation, the server may obtain a calculated hash $G([T]|gss_{Ci}|r)$. The nature of the combination and definition of the hash algorithm G are the same as that used by the client device to obtain the hash at 808. At 928, the server may compare the calculated hash to the hash $G([T]|gss_{Ci}|r)$ that it extracted from the received message at 914. Alternatively, the server may only compare corresponding portions of the calculated hash and the received hash, or values dependent thereon. The server checks at 930 whether the hashes are consistent. If the hashes are consistent, the server may determine at 934 that the client device possesses the group shared secret $gss_{Ci}$ that it has identified. If the server determines at 930 that the hashes are not consistent, the server may determine at 932 that the client device does not possess the group shared secret $gss_{Ci}$ that it has identified.

The proposed technique permits a client device to communicate its choice of group shared secret in a way that cannot be understood by eavesdroppers. While an eavesdropping device may overhear the hashes $H(T|k_{G1})$, $H(T|k_{G2})$, ..., $H(T|k_{GM})$ or portions thereof or values dependent thereon communicated by a particular client device, the eavesdropping device cannot determine the group shared secret identifying keys from which the hash-dependent values were obtained, and therefore cannot infer the identity of the group shared secret. Furthermore, since the hash-dependent values communicated by each client device change with each new time interval value T, it is not possible for a client device to be tracked by the eavesdropping device from one time interval value T to the next.

Rather than identifying each group shared secret by a plurality of group shared secret identifying keys, it may be possible to simplify the technique by identifying each group shared secret by a single group shared secret identifying key. The technique may be further simplified if each group shared secret identifying key and the group shared secret that it identifies are in fact one and the same. This may be better understood with reference to FIGS. 10-13.

Figure 10:
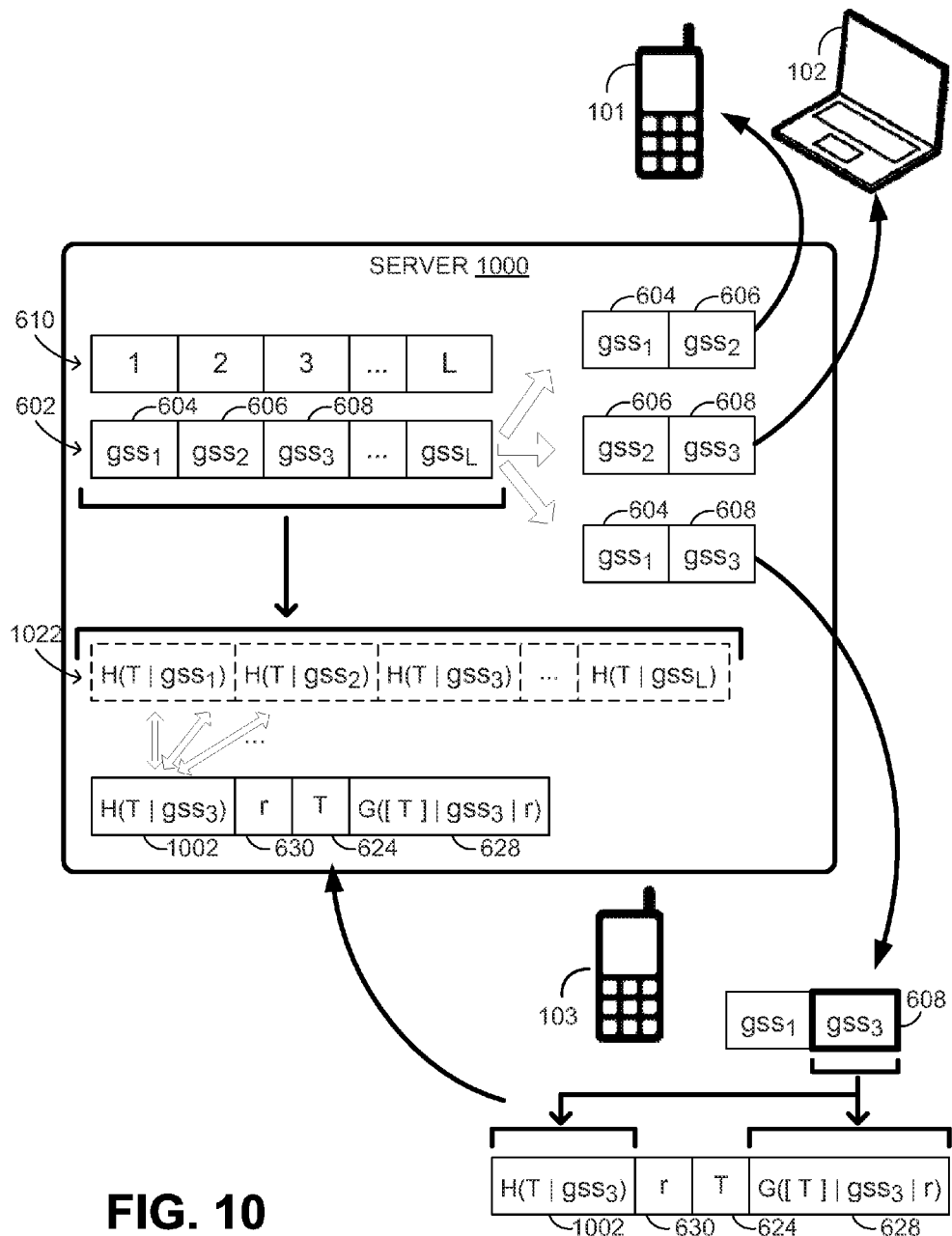
FIG. 10 is a schematic diagram illustrating a second example technique for the provisioning of group shared secrets by a server to a plurality of client devices, and the communicating of one client device's provisioned group shared secret to the server.

FIG. 10 is a schematic diagram illustrating a second example technique for the provisioning of group shared secrets by a server 1000 to a plurality of client devices 101, 102 and 103, and the communicating of the identity of the client device 103's provisioned group shared secret to the server 1000.

Similarly to the server 600 illustrated in FIG. 6, the server 1000 may store or have access to L group shared secrets 702, including group shared secrets $gss_1$ 604, $gss_2$ 606 and $gss_3$ 608, and L corresponding indices 610. Using this simplified technique, the server 1000 does not need to store a separate set of group shared secret identifying keys since the group shared secrets effectively identify themselves.

In the example illustrated in FIG. 10, the server 1000 assigns and provisions to each of the client devices 101, 102 and 103 a subset of two of the group shared secrets 702. In particular, as described with respect to FIG. 6, the server 600 provisions group shared secrets $gss_1$ 604 and $gss_2$ 606 to the client device 101, a group shared secrets $gss_2$ 606 and $gss_3$ 608 to the client device 102, and group shared secrets $gss_1$ 604 and $gss_3$ 608 to the client device 103.

As described with respect to FIG. 6, for each new time interval value T, the server 1000 may calculate for each of the group shared secrets 702 a hash of a combination of at least the current time interval value T and the group shared secret. In the example of FIG. 10, the server 1000 uses the hash algorithm H to compute hashes: $H(T|gss_1)$, $H(T|gss_2)$, $H(T|gss_3)$, ..., $H(T|gss_L)$, which the server 1000 may store in a table 1022 or some other suitable data structure (not shown). Alternatively, the server 1000 may store only portions of the hashes, or some other values dependent thereon. The server 1000 may maintain one or more additional tables of hash-dependent values (not shown) determined from previous time interval values T or future time interval values T or both. Alternatively, the server 1000 may maintain a single table that includes hash-dependent values determined from the present time interval value T and from previous time interval values T or future time interval values T or both. For each table of hash-dependent values, the server 1000 may associate each one of the hash-dependent values with the respective one of the group shared secrets 702 from which the hash-dependent value was determine (or with the respective one of the indices 610).

The client device 103 may seek to communicate a group shared secret to the server 1000. In the example of FIG. 10, the client device 103 selects the group shared secret $gss_3$ 608 to communicate to the server 1000. Thus, the client device 103 may calculate a hash by applying the hash algorithm H to a combination of at least the current time interval value T 624 and the group shared secret $gss_3$ 608. The nature of the combination and the definition of the hash algorithm H are the same as that used by the server 1000 to calculate the hashes $H(T|gss_1)$, $H(T|gss_2)$, $H(T|gss_3)$, ..., $H(T|gss_L)$ as described previously. From this hash calculation, the client device 103 may obtain a hash $H(T|gss_3)$ 1002. In contrast to the technique illustrated in FIG. 6, instead of using the hashes $H(T|k_2)$, $H(T|k_4)$, and $H(T|k_5)$ 626 to communicate the identity of the group shared secret $gss_3$ 608 to the server, the client device 103 may use the single hash value $H(T|gss_3)$ 1002 to communicate the identity of the group shared secret $gss_3$ 608.

As described with respect to FIG. 6, the client device may also seek to prove to the server that it possesses the group shared secret that it has identified. As before, this may be done by having the client device 103 calculate the additional hash $G([T]|gss_3|r)$ 628.

The client device 103 communicates to the server 1000 a message comprising the hash 1002, the value r 630, the current time interval value T 624, and the hash 628. The hash 1002 is included so that the client device 103 can communicate the identity of the group shared secret $gss_3$ 608 that it purports to possess. The hash 628 and the value r 630 are included so that the client device 103 may prove to the server 1000 that it possesses the group shared secret $gss_3$ 608. The current time interval value T 624 may be included so that the server 1000 is privy to which value of the time interval value T was used to calculate the hash 1002, and optionally the hash 628, and so that the server 1000 may confirm that client device 103 possesses the correct time interval value T.

To determine the identity of the group shared secret that the client device 103 purports to possess, the server 1000 proceeds to compare the hash 1002 to the hashes in the table 1022 stored on the server 1000. In the case that the server 1000 stores only portions of hashes or some other values dependent thereon in the table 1022, the server 1000 may use a corresponding portion of the hash 1002 or a value dependent thereon for the comparison. Once the server 1000 locates a stored hash-dependent value that is consistent with the received hash 1002 or a portion thereof or value dependent thereon, the server 1000 may use the association to determine which of the group shared secrets 702 (or the indices 610) is associated with the consistent hash-dependent value. In this case, the server 1000 may use the association to determine that the hash-dependent value that is consistent with the received hash 1002 or portion thereof or value dependent thereon is associated with the group shared secret $gss_3$ 608 (or with the index 3). By following the example technique illustrated in FIG. 10, the client device 103 is effectively communicating an identity of its choice of group shared secret to the server 1000, and is doing so in a way that cannot be understood or tracked by an eavesdropper from one time interval value T to the next.

At this point, the client device 103 has only communicated to the server 1000 the identity of the group shared secret that it purports to possess. It has not yet proven that it actually possesses the identified group shared secret. For example, an eavesdropping device overhearing the hash 1002 could repeat it to the server 1000 during the same time interval value T 624, and would also be purporting to possess the group shared secret $gss_3$ 608. The eavesdropping device may not even be privy to which group shared secret is purporting to possess.

In order to verify that the client device 103 actually possesses the group shared secret $gss_3$ 608 that it has identified, the server 1000 may calculate an additional hash (not shown) by applying the hash algorithm G to a combination of at least the current time interval value T (optionally), the group shared secret $gss_3$ 608, and the value r 630 that it received from the client device 103. From this hash calculation, the server 1000 may obtain a calculated hash $G([T]|gss_3|r)$ (not shown). The server 1000 may then compare the calculated hash (not shown) to the hash 628 received from the client device 103. Alternatively, the server 1000 may only compare corresponding portions of the calculated hash and the hash 628, or values dependent thereon. If the hash-dependent values are consistent, the server 1000 may determine that the client device 103 possesses the group shared secret key $gss_3$ 608 that it has identified.

While the server 1000 is illustrated as a single device, it is contemplated that the server 1000 may comprise multiple devices. For example, the server 1000 may comprise one or more provisioning servers, each of which is configured to provision one or more of the group shared secrets 702 to one or more client devices. The server 1000 may also comprise one or more receiving servers, each of which is able to receive a message purporting to identify a group shared secret and prove the sender's possession of the identified group shared secret. The calculation of the hashes 1022 and the determination of the hash-dependent values to be stored for a particular time interval value T may be performed by the one or more provisioning servers or by the one or more receiving servers or by some combination thereof. For example, the one or more provisioning servers may share information with the one or more receiving servers, such as any of the group shared secrets 702. In one example, the shared information is stored on one or more databases accessible by the one or more provisioning servers and the one or more receiving servers. In another example, in the case of more than one receiving server, each receiving server may only be able to identify a subset of the group shared secrets. For example, the receiving server may not have access to all of the group shared secret identifying keys or to the information from which it is determinable which group shared secret identifying keys were provisioned to which group shared secret.

Figure 11:
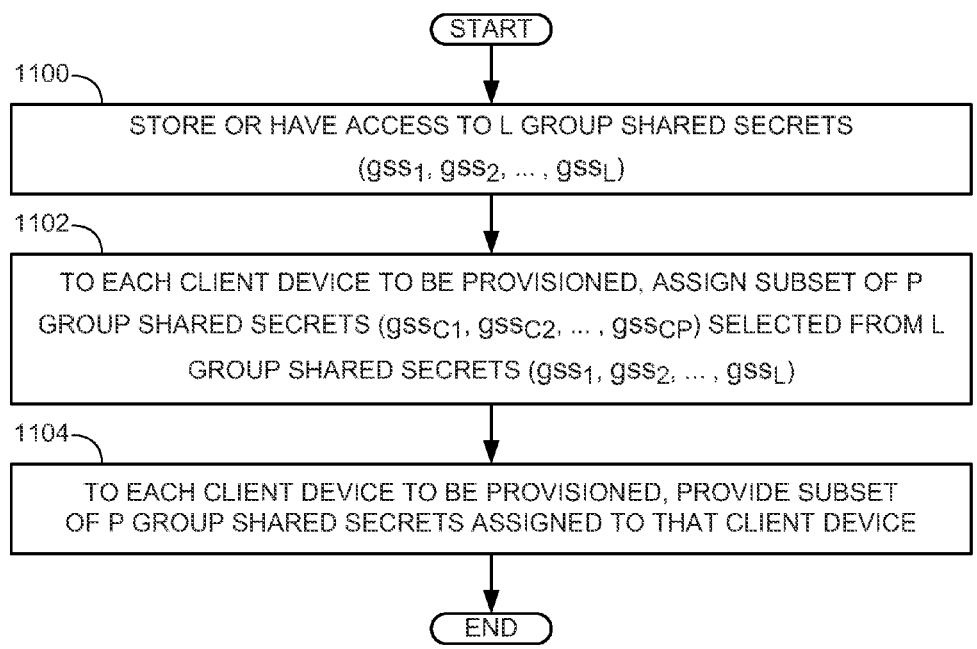
FIG. 11 is a flowchart illustrating a second example method to be performed by a provisioning server for provisioning group shared secret identifying keys to client devices.

FIG. 11 is a flowchart illustrating a second example method to be performed by a provisioning server for provisioning group shared secrets to client devices.

The method begins at 1100 by having the provisioning server store or have access to a plurality of L group shared secrets ($gss_1$, $gss_2$, ..., $gss_L$), also denoted as group shared secrets $\{gss_q\}$. The L group shared secrets may be identified by indices (1, 2, ..., L), where L may take on any positive integer value. Alternatively, each of the group shared secrets $\{gss_q\}$ may be identified by an arbitrary identifier or may effectively identify itself. Each one of the group shared secrets $\{gss_q\}$ is a distinct value, such as an effectively random value, a quasi-random or a pseudo-random value, or a value that can be reliably generated on another occasion in a repeatable manner. In the latter case, it will be appreciated that the server may not explicitly store the group shared secrets $\{gss_q\}$, provided that the server maintains a record of the conditions under which the group shared secrets were generated. Each one of the group shared secrets $\{gss_q\}$ may be of a sufficient length and complexity that it cannot be easily predicted or guessed by an attacker At 1102, the provisioning server assigns to each client device j to be provisioned a subset of $P_j$ group shared secrets ($gss_{C1}$, $gss_{C2}$, ..., $gss_{CPj}$) selected from the L group shared secrets ($gss_1$, $gss_2$, ..., $gss_L$), where $P_j$ is a positive integer less than L. In the example illustrated in FIG. 10, the number $P_j$ of group shared secrets in the subset for all client devices $\{j\}$ is $P_j$=2. In other examples, some of the client devices $\{j\}$ may have more group shared secrets provisioned thereto than others of the client devices $\{j\}$. In the present example, all client devices $\{j\}$ are provisioned with a subset of $P_j$=P group shared secret identifying keys. The assignment of the subsets of group shared secrets to the client devices $\{j\}$ may be carried out in a random, pseudo-random or quasi-random fashion or may be carried out in an arbitrary fashion. Alternatively, the assignment of the subsets of group shared secrets to the client devices $\{j\}$ may be carried out according to an algorithm. Two or more client devices may be assigned one or more of the same group shared secrets. It is also possible that some of the group shared secrets $\{gss_q\}$ may not yet be assigned to any client device at all.

At 1104, the provisioning server provides to each client device to be provisioned its respective assigned subset of P group shared secrets ($gss_{C1}$, $gss_{C2}$, ..., $gss_{CP}$). The subset of P group shared secrets ($gss_{C1}$, $gss_{C2}$, ..., $gss_{CP}$) assigned to each client device may be embedded in a client device at the time of manufacture, or provisioned at a later date, for example, via a storage module such as a SIM, or via a transmission over a secure channel.

Figure 12:
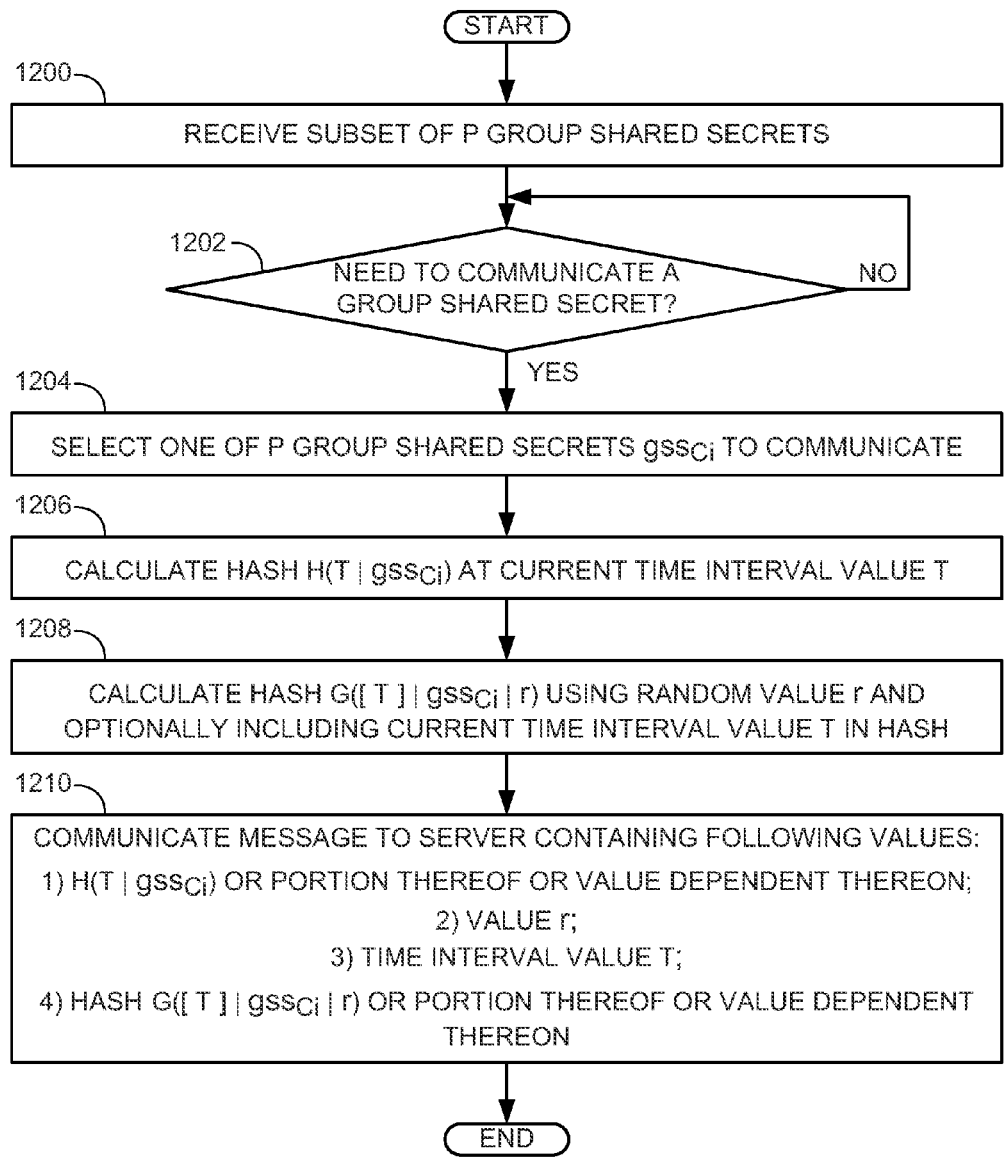
FIG. 12 is a flowchart illustrating a second example method to be performed by a provisioned client device for communicating one of its provisioned group shared secrets to a receiving server.

FIG. 12 is a flowchart illustrating a second example method to be performed by a provisioned client device for communicating one of its provisioned group shared secrets to a receiving server.

At 1200, the client device receives from a provisioning server a subset of P group shared secrets ($gss_{C1}$, $gss_{C2}$, ..., $gss_{CP}$). The P group shared secrets ($gss_{C1}$, $gss_{C2}$, ..., $gss_{CP}$) may be embedded in the client device at the time of manufacture, or received at a later date.

At some point after being provisioned with its subset of group shared secrets ($gss_{C1}$, $gss_{C2}$, ..., $gss_{CP}$), the client device may determine at 1202 that it has a need to communicate a group shared secret to a server.

Once the client device determines at 1202 that it has a need to communicate a group shared secret to the server, the client device may proceed at 1204 to select one of its P group shared secrets ($gss_{C1}$, $gss_{C2}$, ..., $gss_{CP}$) to communicate to the server. The selected group shared secret is denoted $gss_{Ci}$.

At 1206, the client device may proceed to calculate a hash by applying a hash algorithm H to a combination of at least the current time interval value T and the selected group shared secret $gss_{Ci}$, thereby obtaining a hash $H(T|gss_{Ci})$. Although not explicitly shown, the client device may receive one or more of the current time interval value T, an indication of the hash algorithm H, and an indication of the nature of the combination via a broadcast from the provisioning server or a receiving server.

At 1208, the client device calculates another hash by application a hash algorithm G to a combination of the current time interval value T (optionally), the selected group shared secret $gss_{Ci}$, and a value r, thereby obtaining a hash $G([T]|gss_{Ci}|r)$, where the value r is used to detect replay attacks as described previously.

At 1210, the client device communicates a message to the server comprising the hash $H(T|gss_{C1})$ calculated at 1206, the value r, the current time interval value T, and the hash $G([T]|gss_{Ci}|r)$ calculated at 1208. Alternatively to including the hash $H(T|gss_{C1})$ in its entirety in the message, the client device may include only a portion of the hash $H(T|gss_{C1})$ or a value dependent thereon. Similarly, the client device may include a portion of the hash $G([T]|gss_{Ci}|r)$ or a value dependent thereon. The order of the values in the message may be agreed on by the server and the provisioned client devices.

Figures 1, 13:
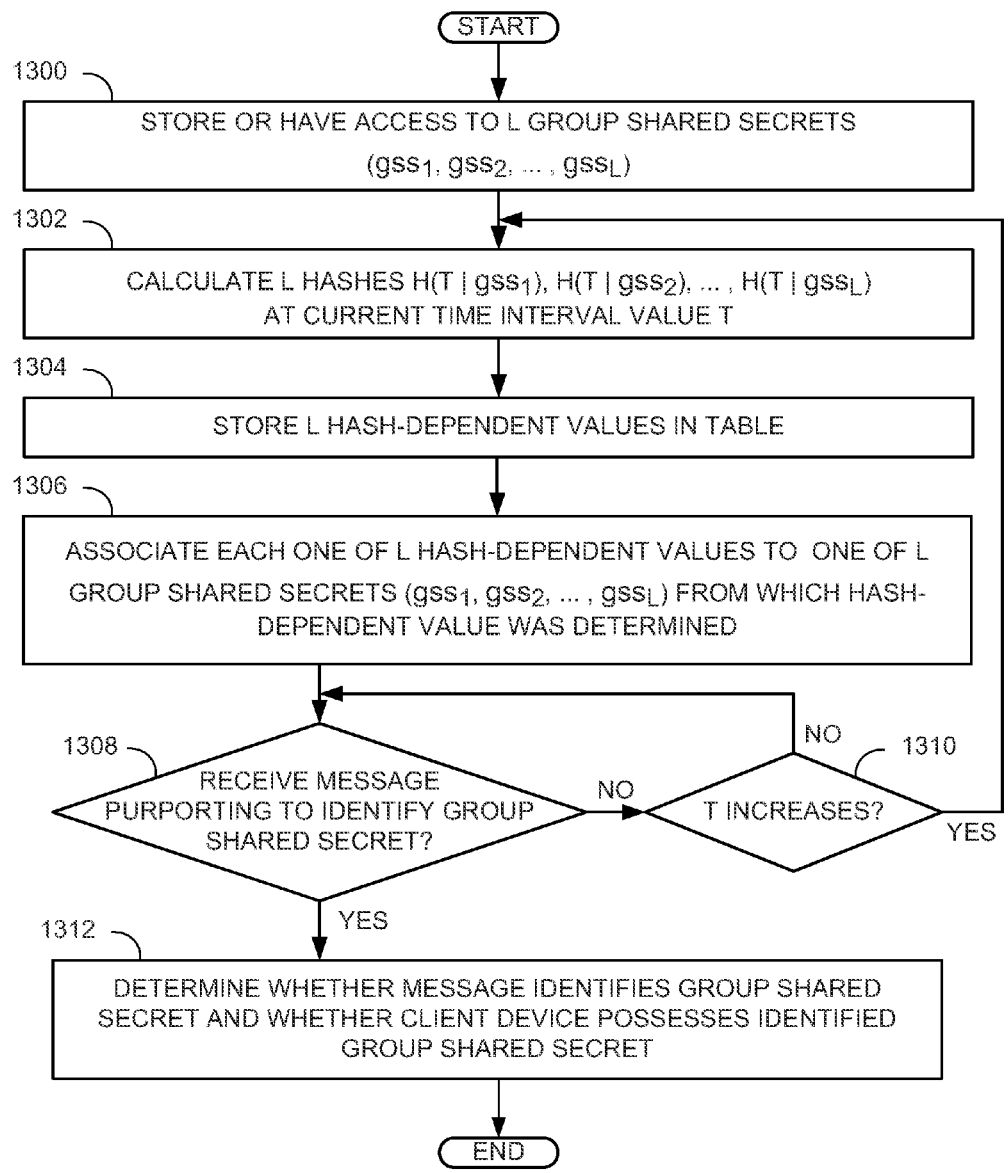
Figures 2, 13:
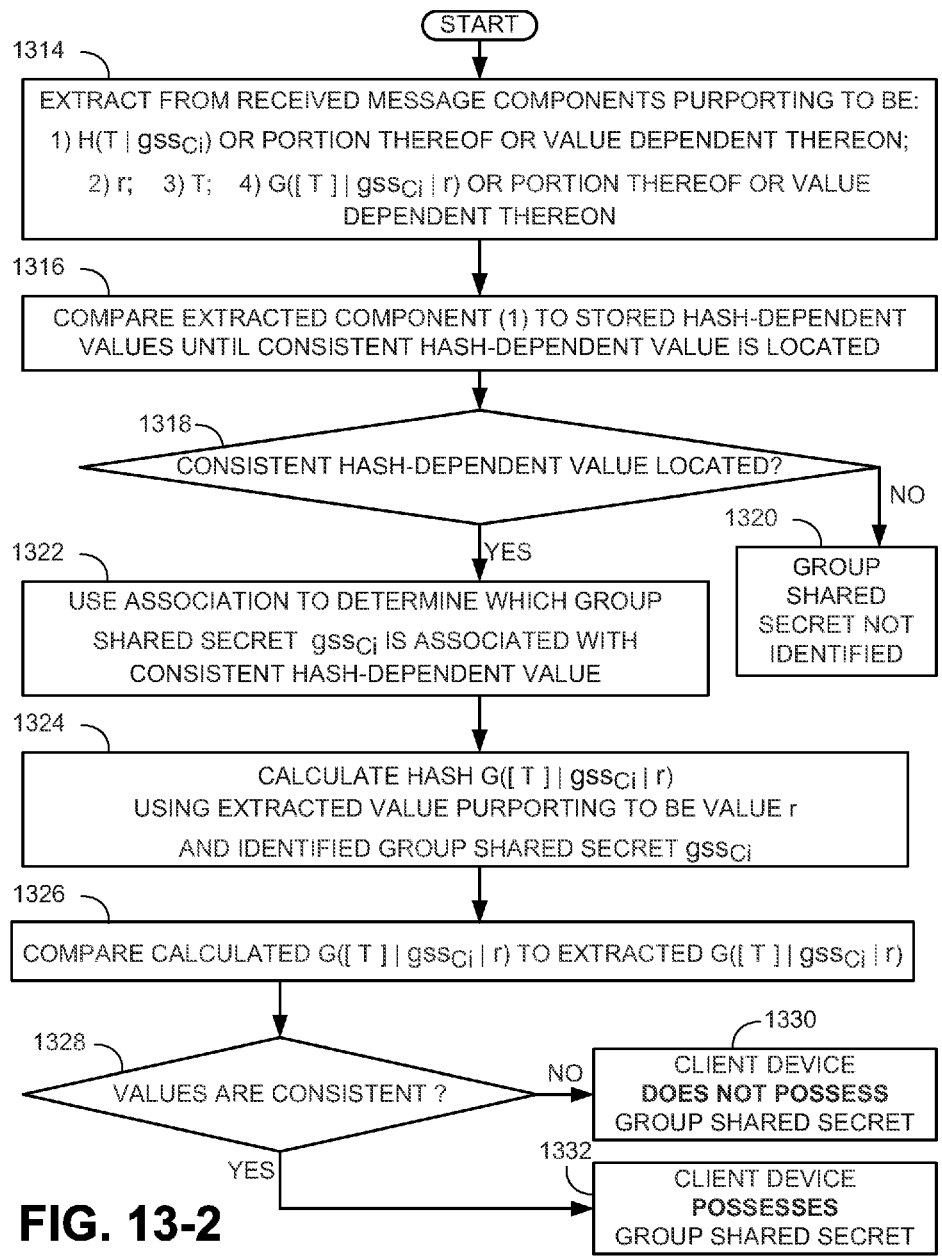

FIGS. 13-1 and 13-2 are flowcharts illustrating a second example method to be performed by a receiving server for determining whether a received message from a client device identifies a group shared secret and whether the client device possesses the identified group shared secret.

The receiving server may be the same server as the provisioning server that is configured to perform the method illustrated in FIG. 11. Alternatively, the receiving server may be a separate server from the provisioning server, but may share information with the provisioning server, including, for example, the group shared secrets ($gss_1, gss_2, \ldots, gss_L$). In one example, the shared information is stored on one or more databases accessible by both the provisioning server and the receiving server.

The method illustrated in FIG. 13-1 begins at 1300 by having the server store or have access to the L of group shared secrets ($gss_1, gss_2, \ldots, gss_L$).

At 1302, the server calculates for each of the L group shared secrets a hash of a combination of at least the current time interval value T and the group shared secret, thereby obtaining L hashes: $H(T|gss_1), H(T|gss_2), \ldots, H(T|gss_L)$. The nature of the combination and the hash algorithm H are the same as that used by the client device to calculate hash at 1206.

In another example, not shown in FIGS. 12 and 13-1, the client device and the server may include the index of the group shared secret in the hash calculations performed at 1206 and 1302, respectively. Thus, instead of calculating the hash $H(T|gss_{C1})$, the client device may calculate the hash $H(T|Ci|gss_{Ci})$. Similarly, instead of calculating L hashes $H(T|gss_1), H(T|gss_2), \ldots, H(T|gss_L)$, the server may calculate L hashes $H(T|1|gss_i), H(T|2|gss_2), \ldots, H(T|L|gss_L)$. As noted previously, including an index as salt in a hash calculation may make the hash value harder to attack.

At 1304, the server may store each of the L calculated hashes or portions thereof or values dependent thereon as hash-dependent values in a table or some other suitable data structure. Although not shown, the server may store one or more additional tables of hash-dependent values determined from previous time interval values T or future time interval values T or both. Alternatively, the server may maintain a single table that includes hash-dependent values determined from the present time interval value T and from previous time interval values T or future time interval values T or both.

At 1306, for each table of hash-dependent values, the server associates each one of the L hash-dependent values with the respective one of the L group shared secrets from which the hash-dependent value was determined (or with the respective index of the one of the L group shared secrets ($gss_1, gss_2, \ldots, gss_L$) from which the hash-dependent value was determined).

At 1308, the server checks whether it has received a message purporting to identify a group shared secret. If the server does not receive any such message, and if the server determines at 1310 that the time interval value T has increased, the server proceeds to repeat the calculation of the L hashes $H(T|gss_1), H(T|gss_2), \ldots, H(T|gss_L)$ at 1302 using the new time interval value T. The server may then store new hash-dependent values at 1304, and generate at 1306 the association that associates each one of the new hash-dependent values with the respective one of the L group shared secrets from which the new hash-dependent value was determined (or with the respective index of the one of the L group shared secrets from which the hash-dependent value was determined). As noted above, since the server may store additional hash-dependent values determined from previous time interval values T or future time interval values T or both, the new hash-dependent values may or may not overwrite previously stored hash-dependent values. Several tables of hash-dependent values and associations may be maintained at any one time.

Once the server determines at 1308 that it has received a message purporting to identify a group shared secret, the server may proceed to determine at 1312 whether the message identifies a group shared secret and whether the client device from which the message was received possesses the identified group shared secret.

The determination made at 1312 is described in more detail by the actions illustrated in FIG. 13-2.

At 1314, the server extracts from the received message values purporting to be: the hash $H(T|gss_{Ci})$ or a portion thereof or value dependent thereon, as well as the value r, the current time interval value T, and the hash $G([T]|gss_{Ci}|r)$ or a portion thereof or value dependent thereon. Extraction of the components may occur separately for each individual component. Alternatively, in the case that the components have been combined, for example, using a Bloom filter, extraction of the components may be understood as referring to the extraction of the combination.

At 1316, the server compares the extracted hash $H(T|gss_{C1})$ or relevant portion thereof or value dependent thereon, to each value in the table of hash-dependent values stored at 1304, or optionally to hash-dependent values stored in one or more additional tables. This may be done until the server locates a hash-dependent value that is consistent with the extracted value in the received message.

At 1318, the server checks whether there is any stored hash-dependent value that is consistent with the extracted value $H(T|gss_{Ci})$ or relevant portion thereof or value dependent thereon. If the server determines at 1318 that the extracted hash $H(T|gss_{Ci})$ or relevant portion thereof or value dependent thereon is not consistent with any stored hash-dependent value, the server can determine with certainty at 1320 that the client device is not identifying a group shared secret.

If the server determines at 1318 that the extracted hash $H(T|gss_{Ci})$ or a portion thereof or value dependent thereon is consistent with a stored hash-dependent value, the server may proceed to use the association at 1322 to determine the group shared secret $gss_{Ci}$ (or the index Ci of the group shared secret $gss_{Ci}$) that is associated with the consistent hash-dependent value.

In order to verify that the client device from which the message is received actually possesses the identified group shared secret $gss_{Ci}$, the server may calculate at 1324 an additional hash by applying the hash algorithm G to a combination of at least the current time interval value T (optionally), the group shared secret $gss_{Ci}$ identified at 1322, and the value r that it extracted from the received message at 1314. From this hash calculation, the server may obtain a calculated hash value $G([T]|gss_{Ci}|r)$. The nature of the combination and definition of the hash algorithm G are the same as that used by the client device to obtain the hash 1208. At 1326, the server may compare the calculated hash to the hash $G([T]|gss_{Ci}|r)$ that it extracted from the received message at 1314. Alternatively, the server may only compare corresponding portions of the calculated hash and the received hash, or values dependent thereon. The server checks at 1328 whether the hashes are consistent. If the hashes are consistent, the server may determine at 1332 that the client device possesses the group shared secret $gss_{Ci}$ that it has identified. If the server determines at 1328 that the hashes are not consistent, the server may determine at 1330 that the client device does not possess the group shared secret $gss_{Ci}$ that it has identified.

As described with respect to the technique and methods illustrated in FIGS. 6-9, the technique and methods illustrated in FIGS. 10-13 allow a client device to communicate its choice of group shared secret in a way that cannot be understood by eavesdroppers. For example, while an eavesdropping device may overhear the hash $H(T|gss_{Ci})$ communicated by a particular client device, the eavesdropping device cannot determine the identity of the group shared secret from which the hash was obtained. Furthermore, since the hash communicated by each client device changes with each new time interval value T, it is not possible for a client device to be tracked by the eavesdropper from one time interval value T to the next.

Figure 14:
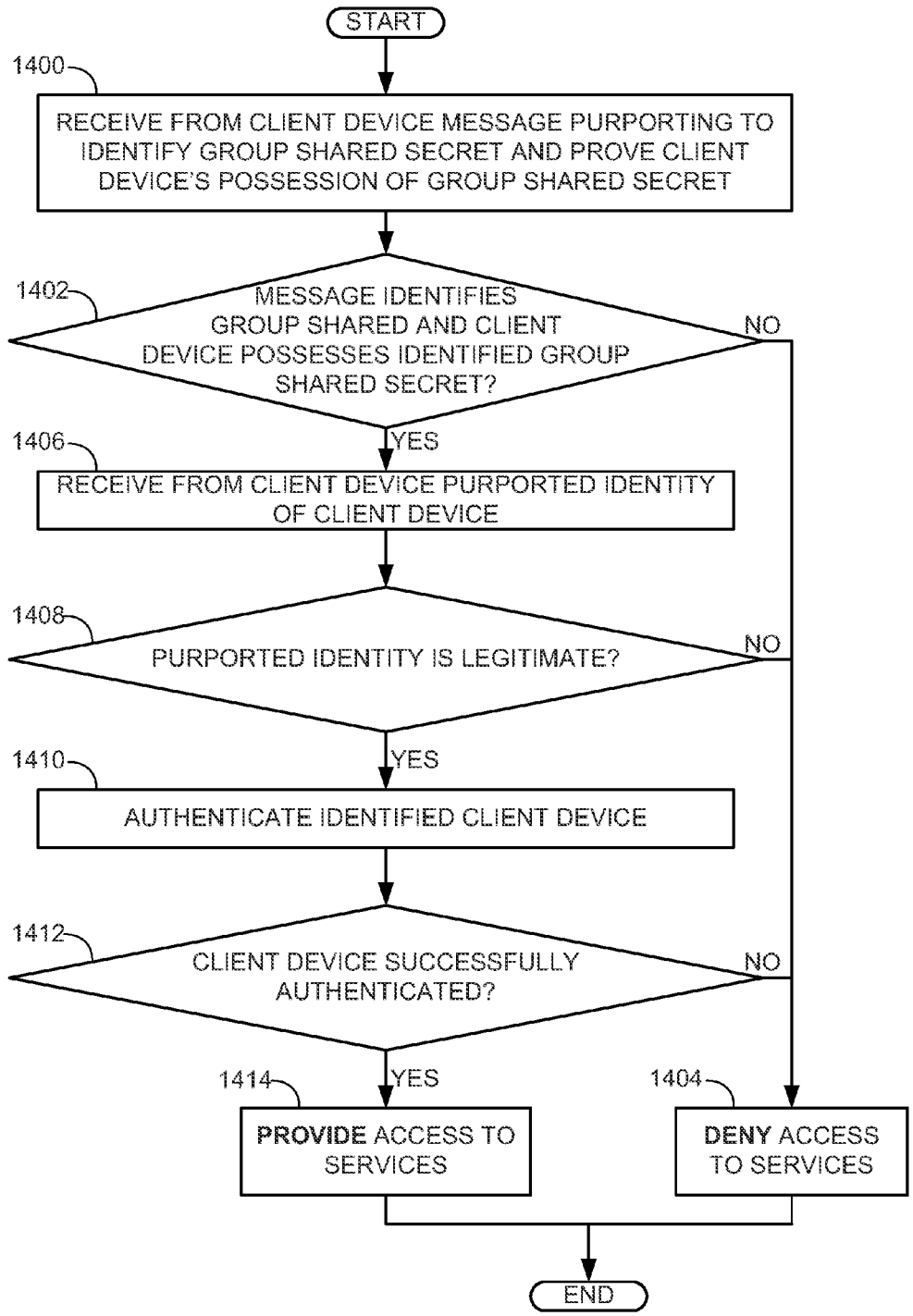
FIG. 14 is a flowchart illustrating an example method to be performed by a server for identification and authentication of a client device.

FIG. 14 is a flowchart illustrating an example method to be performed by a server for identification and authentication of a client device.

At 1400, the server receives from a client device a message purporting to identify a group shared secret and purporting to prove the client device's possession of the group shared secret that the message purports to identity.

At 1402, the server determines whether the message identifies a group shared secret and whether the client device from which the message was received possesses the identified group shared secret. This determination may be made according to the method illustrated in FIGS. 9-1 and 9-2, the method illustrated in FIGS. 13-1 and 13-2, or any suitable variations thereof.

If the server determines at 1402 that the message does not identify a group shared secret or that the client device does not possess the group shared secret that the message identifies, the server may deny access to one or more services at 1404 and the method may end.

If the server determines at 1402 that the message does identify a group shared secret and that the client device possesses the identified group shared secret, the server may proceed to 1406.

At 1406, the server receives from the client device a purported identity of the client device. Then the server proceeds to determine at 1408 whether the purported identity of the client device is legitimate.
This determination may be made according to the method illustrated in FIGS. 5-1 and 5-2 or any suitable variation thereof.

The purported identity may be received in the same message received from the client device at 1400, or in a different message. For example, the client device may communicate a message containing the M hashes $H(T|k_{C1})$, $H(T|k_{C2})$, . . . , $H(T|k_{CM})$ calculated at 504 or portions thereof or values dependent thereon, the M hashes $H(T|k_{G1})$, $H(T|k_{G2})$, . . . , $H(T|k_{GM})$ calculated at 806 or portions thereof or values dependent thereon, the value r, the current time interval value T, and the hash $G([T]|gss_{Ci}|r)$ calculated at 808 or a portion thereof or value dependent thereon. Alternatively, in place of the M hashes $H(T|k_{G1})$, $H(T|k_{G2})$, . . . , $H(T|k_{GM})$, the client device may include in the message the hash $H(T|gss_{Ci})$ calculated at 1206 or a portion thereof or value dependent thereon.

If the server determines at 1408 that the purported identity of the client device is not legitimate, the server may deny access to one or more services at 1404 and the method may end. If the server determines at 1408 that the purported identity of the client device is legitimate, the server may proceed to authenticate the client device at 1410. There are numerous methods that may be used for authentication of the client device.

In one example, the client device may possess a unique key $k_{CLIENT}$ that is known to the server. The client device may perform a hash of the unique key $k_{CLIENT}$ and the current time interval value T and communicate the hash to the server. The server may then verify that the received hash is consistent with a corresponding hash of the server's copy of the unique key $k_{CLIENT}$. It should be noted, however, that this method of authentication would be vulnerable to replay attacks during the period that the time interval value T remains unchanged.

In another example, the client device may use public key cryptography to establish a secure link with the server. The client device may communicate a session key to the server using the server's public key signed by a private key of the client device.

In yet another example, the server may use symmetric cryptography to authenticate a client device. Once the server determines the purported identity of a client device, the server may locate a unique key $k_{CLIENT}$. The client may communicate a session key encrypted with the unique key $k_{CLIENT}$, and the server may use the copy of the unique key $k_{CLIENT}$ that it has located in order to decrypt the session key. The session key may be used to establish a secure tunnel.

In yet another example, the client device may communicate to the server a session key encrypted with the server's public key, such that only the server is able to decrypt the session key.

Further details of possible authentication methods are beyond the scope of the present discussion.

It may be desirable to include one or more parameters necessary for authentication in a previous message communicated by the client device to the server. For example, an encrypted version of the unique key $k_{CLIENT}$ may be included in the message that purports to include an identity of a group shared secret or an identity of a client device or both.

If the server determines at 1412 that the client device has not been successfully authenticated, the server may deny access to one or more services at 1404 and the method may end.

If the server determines at 1412 that the client device has been successfully authenticated, the server may provide to the client device access to one or more services at 1414.

Figure 15:
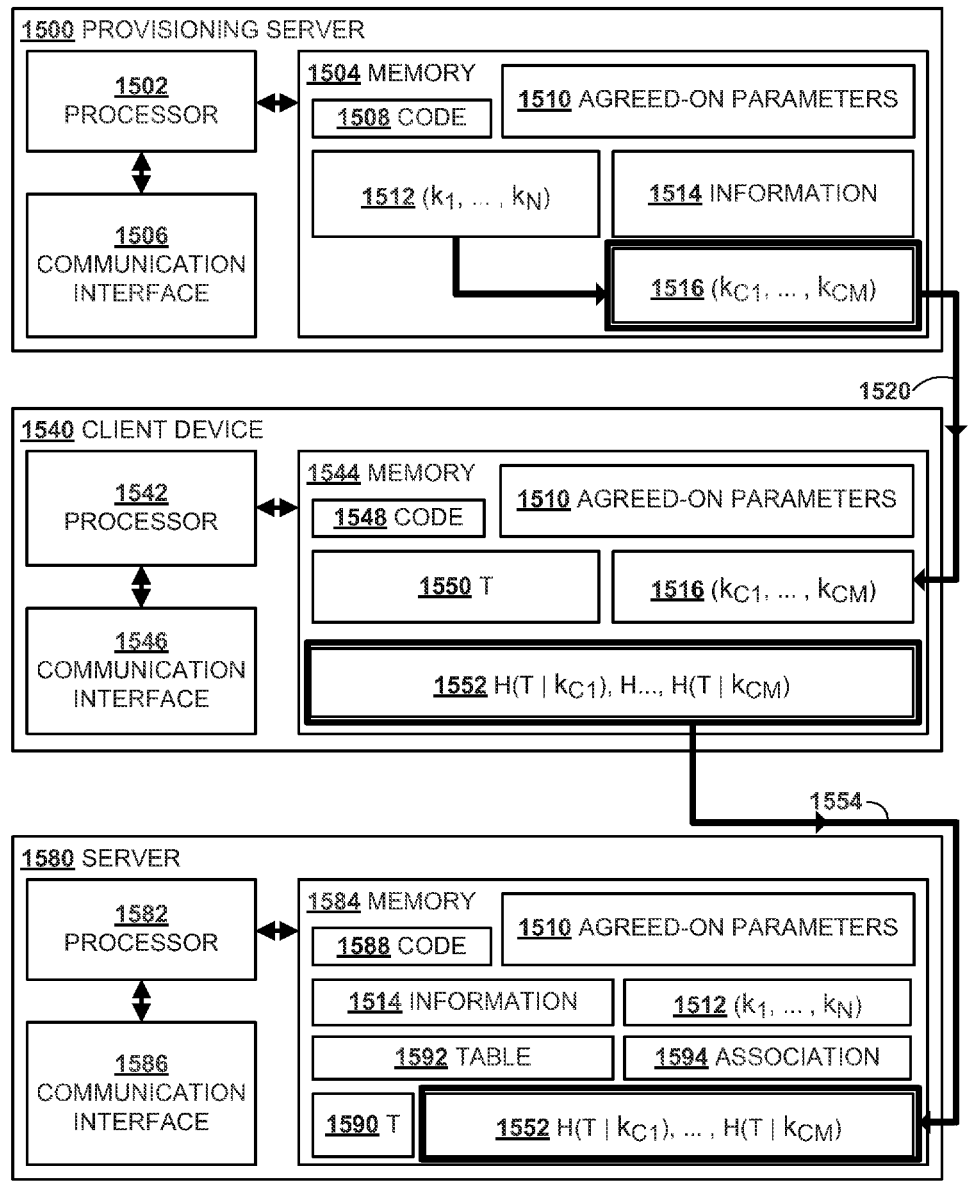
FIG. 15 is a block diagram of an example provisioning server, an example client device, and an example server configured to perform the technique illustrated in FIG. 2.

FIG. 15 is a block diagram of an example provisioning server 1500, an example client device 1540, and an example server 1580 configured to perform the example technique illustrated in FIG. 2.

The provisioning server 1500 is an example of the server 200 when acting in a provisioning capacity. The provisioning server 1500 comprises a processor 1502 which is coupled to a memory 1504 and to a communication interface 1506 through which it is able to communicate with one or more client devices, such as the client device 1540. The provisioning server 1500 may contain other elements which, for clarity, are not shown in FIG. 15.

The client device 1540 is an example of any one of the client devices 100. The client device 1540 comprises a processor 1542 which is coupled to a memory 1544 and to a communication interface 1546. The client device 1540 may contain other elements which, for clarity, are not shown in FIG. 15.

The server 1580 is an example of the server 200 when acting in a receiving capacity. The server 1580 comprises a processor 1582 which is coupled to a memory 1584 and to a communication interface 1586. The server 1580 may contain other elements which, for clarity, are not shown in FIG. 15.

The communication interfaces 1506, 1546, and 1586 may be wired communication interfaces or wireless communication interfaces. For example, the communication interfaces 1506, 1546, and 1586 may comprise any of Universal Serial Bus (USB) interfaces, Ethernet interfaces, Integrated Services Digital Network (ISDN) interfaces, Digital Subscriber Line (DSL) interfaces, Local Area Network (LAN) interfaces, High-Definition Multimedia (HDMI) interfaces, Digital Visual Interfaces (DVIs), or Institute of Electrical and Electronics Engineers (IEEE) 1394 interfaces such as i.LINK™, Lynx$^{SM}$ or Firewire®. Alternatively, the communication interfaces 1606, 1546, and 1586 may be Wireless Local Area Network (WLAN) interfaces, short-range wireless communication interfaces such as Wireless Personal Area Network (WPAN) interfaces, Wireless Wide Area Network (WWAN) interfaces, or Wireless Metropolitan Area Network (WMAN) interfaces.

Each of the memories 1504, 1544, and 1584 is able to store agreed-on parameters 1510. Any of the agreed-on parameters 1510 may be agreed on by two or more of the provisioning server 1500, the client device 1540 and the server 1580, depending on the particular parameter. For example, such parameters may include any hash algorithms to be used to for calculating hashes, such as the hash algorithms H and F, parameters indicative of the nature of any combination to which a hash algorithm is to be applied, parameters indicative of any additional operations to be performed on calculated hashes to obtain hash-dependent values, and parameters indicative of which portion of any hash or hash-dependent value is to be stored, communicated and/or compared. Although not explicitly shown, each of the memories 1504, 1544, and 1584 may comprise multiple memories or storage media. For example, cryptographic data may be stored in a different memory or storage medium than code.

The memory 1504 of the provisioning server 1500 is able to store code 1508 that, when executed by processor 1502, results in the example method illustrated in FIG. 3. Alternatively, the code 1508 may be stored in a different memory (not shown) than the memory 1504. In another example, some portion of the example method illustrated in FIG. 3 may be performed by application-specific integrated circuits (ASICs) or other dedicated hardware, without involving execution of the code 1508 by the processor 1502. The memory 1504 may also store applications (not shown) installed in the provisioning server 1500 to be executed by the processor 1502.

In addition to the agreed-on parameters 1510, the memory 1504 is also able to store a plurality of N client-identifying keys $(k_1, \ldots, k_N)$ 1512. Alternatively, the memory 1504 may store a record (not shown) of the conditions under which the client-identifying keys $(k_1, \ldots, k_N)$ 1512 were generated. Although not explicitly shown, the memory 1504 may optionally store the N indices $(1, \ldots, N)$ by which the client-identifying keys $(k_1, \ldots, k_N)$ 1512 are identified.

The provisioning server 1500, being responsible for assigning to each client device to be provisioned a unique subset of the N client-identifying keys 1512, may also store in the memory 1504 information 1514 from which it is determinable which of the N client-identifying keys 1512 were assigned to which client device. Alternatively, the information 1514 may be stored on one or more databases (not shown) that are accessible by the provisioning server 1500.

As denoted by arrow 1520, a subset of M client-identifying keys $(k_{C1}, \ldots, k_{CM})$ 1516 that were assigned by the provisioning server 1500 to the client device 1540 are able to be communicated, optionally with the corresponding indices $(C1, \ldots, CM)$ (not shown), by the provisioning server 1500 to the client device 1540, where they may be stored in the memory 1544. While not explicitly shown, the client-identifying keys $(k_{C1}, \ldots, k_{CM})$ 1516 may be communicated by the provisioning server 1500 via the communication interface 1506 and may be received by the client device 1540 via the communication interface 1546, and optionally via one or more intermediate devices.

The memory 1544 of the client device 1540 is able to store code 1548 that, when executed by processor 1542, results in the example method illustrated in FIG. 4. Alternatively, the code 1548 may be stored in a different memory (not shown) than the memory 1544. In another example, some portion of the example method illustrated in FIG. 4 may be performed by ASICs or other dedicated hardware, without involving execution of the code 1548 by the processor 1542. The memory 1544 may also store applications (not shown) installed in the client device 1540 to be executed by the processor 1542. Examples of such applications include data communication applications, voice communication applications, messaging applications, games, calculators, and the like.

The memory 1544 is able to store a current time interval value T 1550, which may be used to calculate a hash of each of the client-identifying keys $(k_{C1}, \ldots, k_{CM})$ 1516 received from the server, thereby obtaining M hashes $H(T|k_{C1}), \ldots, H(T|k_{CM})$ 1552. The memory 1544 may store each hash in its entirety, as shown in FIG. 15, or alternatively may store only a portion of each hash or a value dependent thereon.

As denoted by arrow 1554, a message comprising the hashes $H(T|k_{C1}), \ldots, H(T|k_{CM})$ 1552 or portions thereof or values dependent thereon is able to be communicated by the client device 1540 to the server 1580. The server 1580 may extract the hashes 1552 or portions thereof or values dependent thereon from the message and store them in the memory 1584. While not explicitly shown, the message comprising the hashes 1552 may be sent from the client device 1540 via the communication interface 1546 and may be received by the server 1580 via the communication interface 1586, and optionally via one or more intermediate devices.

The memory 1584 of the server 1580 is able to store the N client-identifying keys $(k_1, \ldots, k_N)$ 1512, and optionally the corresponding N indices $(1, \ldots, N)$ (not shown). The memory 1584 is also able to store the information 1514 from which it is determinable which of the N client-identifying keys were assigned to which client device. The information may comprise a relevant mapping function, a lookup table, an algorithm or inverse thereof, or any other information by which the server 1580 can determine which of the client-identifying keys 1512 were provisioned to which client device. Alternatively, any of the client-identifying keys $(k_1, \ldots, k_N)$ 1512 and the information 1514 may be stored on the one or more databases (not shown), which are accessible to the server 1580.

The memory 1584 is able to store code 1588 that, when executed by the processor 1582, results in the example method illustrated in FIGS. 5-1 and 5-2. Alternatively, the code 1588 may be stored in a different memory (not shown) than the memory 1584. In another example, some portions of the example methods illustrated in FIGS. 5-1 and 5-2 may be performed by ASICs or other dedicated hardware, without involving execution of the code 1588 by the processor 1582. The memory 1584 may also store applications (not shown) installed in the server 1580 to be executed by the processor 1582.

The memory 1584 is able to store a current time interval value T 1590. The memory 1584 may optionally store one or more previous time interval values T or future time interval values T or both (not shown). The memory 1584 is able to store a table 1592 comprising hash-dependent values obtained from hash calculations performed on the client-identifying keys 1512 using the current time interval value T, as described previously. The memory 1584 is also able to store an association 1594 of each one of the hash-dependent values in the table 1592 with the one of the client-identifying keys 1512 from which it was calculated. The memory 1584 may optionally store one or more additional tables (not shown) of hash-dependent values and associations (not shown) determined from one or more previous time interval values T or future time interval values T or both.

Figure 16:
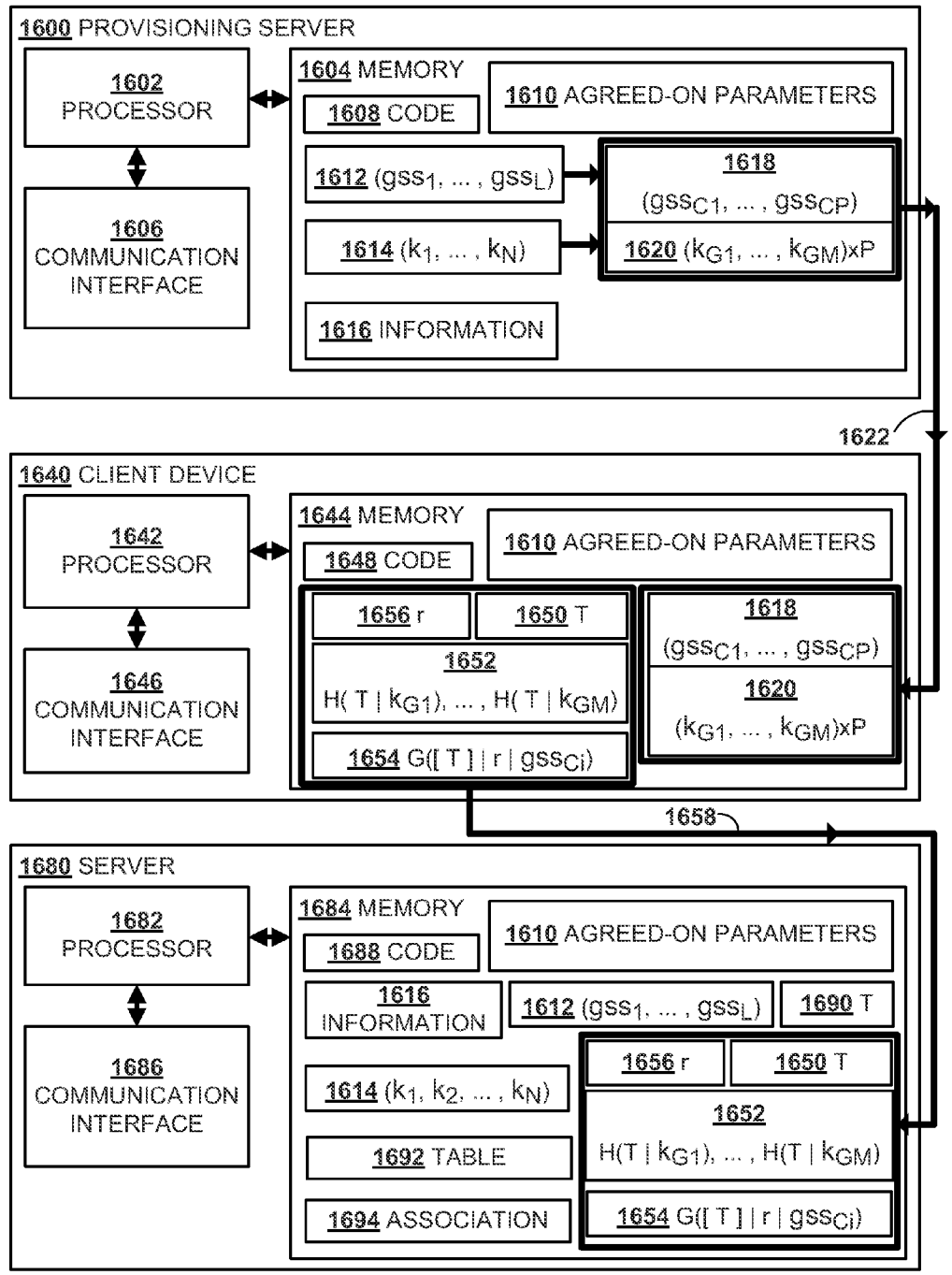
FIG. 16 is a block diagram of an example provisioning server, an example client device, and an example server configured to perform the technique illustrated in FIG. 6.

FIG. 16 is a block diagram of an example provisioning server 1600, an example client device 1640, and an example server 1680 configured to perform the example technique illustrated in FIG. 6.

The provisioning server 1600 is an example of the server 600 when acting in a provisioning capacity. The provisioning server 1600 comprises a processor 1602 which is coupled to a memory 1604 and to a communication interface 1606 through which it is able to communicate with one or more client devices, such as the client device 1640. The provisioning server 1600 may contain other elements which, for clarity, are not shown in FIG. 16.

The client device 1640 is an example of any one of the client devices 100. The client device 1640 comprises a processor 1642 which is coupled to a memory 1644 and to a communication interface 1646. The client device 1640 may contain other elements which, for clarity, are not shown in FIG. 16.

The server 1680 is an example of the server 600 when acting in a receiving capacity. The server 1680 comprises a processor 1682 which is coupled to a memory 1684 and to a communication interface 1686. The server 1680 may contain other elements which, for clarity, are not shown in FIG. 16.

The communication interfaces 1606, 1646, and 1686 may be wired communication interfaces or wireless communication interfaces. For example, the communication interfaces 1606, 1646, and 1686 may comprise any of USB interfaces, Ethernet interfaces, ISDN interfaces, DSL interfaces, LAN interfaces, HDMI interfaces, DVIs, or IEEE 1394 interfaces such as i.LINK™, Lynx$^{SM}$ or Firewire®. Alternatively, the communication interfaces 1606, 1646, and 1686 may be WLAN interfaces, short-range wireless communication interfaces such as WPAN interfaces, WWAN interfaces, or WMAN interfaces.

Each of the memories 1604, 1644, and 1684 is able to store agreed-on parameters 1610. Any of the agreed-on parameters 1610 may be agreed on by two or more of the provisioning server 1600, the client device 1640 and the server 1680, depending on the particular parameter. For example, such parameters may include any hash algorithms to be used for calculating hashes, such as the hash algorithms H, G and F, parameters indicative of the nature of any combination to which a hash algorithm is to be applied, parameters indicative of any additional operations to be performed on calculated hashes to obtain hash-dependent values, and parameters indicative of which portion of any hash or hash-dependent value is to be stored, communicated and/or compared. Although not explicitly shown, each of the memories 1604, 1644, and 1684 may comprise multiple memories or storage media. For example, cryptographic data may be stored in a different memory or storage medium than code.

The memory 1604 of the provisioning server 1600 is able to store code 1608 that, when executed by processor 1602, results in the example method illustrated in FIG. 7. Alternatively, the code 1608 may be stored in a different memory (not shown) than the memory 1604. In another example, some portion of the example method illustrated in FIG. 7 may be performed by ASICs or other dedicated hardware, without involving execution of the code 1608 by the processor 1602. The memory 1604 may also store applications (not shown) installed in the provisioning server 1600 to be executed by the processor 1602.

In addition to the agreed-on parameters 1610, the memory 1604 is also able to store a plurality of L group shared secrets ($gss_1, \ldots, gss_L$) 1612, as well as a plurality of N group shared secret identifying keys ($k_1, \ldots, k_N$) 1616. Alternatively, the memory 1604 may store records (not shown) of the conditions under which the group shared secrets ($gss_1, \ldots, gss_L$) 1612 and/or the group shared secret identifying keys ($k_1, \ldots, k_N$) 1614 were generated. Although not explicitly shown, the memory 1604 may optionally store the L indices (1, ..., L) by which the group shared secrets 1612 are identified and/or the N indices (1, ..., N) by which the group shared secret identifying keys ($k_1, \ldots, k_N$) 1614 are identified.

The provisioning server 1600, being responsible for assigning to each group shared secret a unique subset of the N group shared secret identifying keys, also stores in the memory 1604 information 1616 from which it is determinable which of the N group shared secret identifying keys were assigned to which of the group shared secrets 1612.

Alternatively (not shown), any of the group shared secrets ($gss_1, \ldots, gss_L$) 1612, the group shared secret identifying keys ($k_1, \ldots, k_N$) 1614, and the information 1616 may be stored on one or more databases (not shown) that are accessible by the provisioning server 1600.

As denoted by arrow 1622, a subset of P group shared secrets ($gss_{C1}, \ldots, gss_{CP}$) 1618 that were assigned by the provisioning server 1600 to the client device 1640 are able to be communicated, optionally with the corresponding indices (C1, ..., CP) (not shown), by the provisioning server 1600 to the client device 1640. For each of the P group shared secrets 1618, the provisioning server 1600 is also able to communicate the group shared secret identifying keys ($k_{G1}, \ldots, k_{GM}$) that were assigned to that group shared secret. This is denoted in FIG. 16 as the group shared secret identifying keys ($k_{G1}, \ldots, k_{GM}$)×P 1620. While not explicitly shown, the group shared secrets ($gss_C1, \ldots, gss_{CP}$) 1618 and the group shared secret identifying keys ($k_{G1}, \ldots, k_{GM}$)×P 1620 may be communicated by the provisioning server 1600 via the communication interface 1606 and may be received by the client device 1640 via the communication interface 1646, and optionally via one or more intermediate devices. The client device 1640 may store these received values in the memory 1644.

The memory 1644 of the client device 1640 is able to store code 1648 that, when executed by processor 1642, results in the example method illustrated in FIG. 8. Alternatively, the code 1648 may be stored in a different memory (not shown) than the memory 1644. In another example, some portion of the example method illustrated in FIG. 8 may be performed by ASICs or other dedicated hardware, without involving execution of the code 1648 by the processor 1642. The memory 1644 may also store applications (not shown) installed in the client device 1640 to be executed by the processor 1642.

The memory 1644 is able to store a current time interval value T 1650, which it may use to calculate a hash of each of the group shared secret identifying keys ($k_{G1}, \ldots, k_{GM}$) 1652 that correspond to a group shared secret $gss_{Ci}$ that it has selected from the received group shared secrets ($gss_{C1}, \ldots, gss_{CP}$) 1618 to communicate to the server 1680. From these hash calculations, the client device 1640 is able to obtain M hashes $H(T|k_{G1}), \ldots, H(T|k_{GM})$ 1652. The client device 1640 may store each hash in its entirety, as shown in FIG. 16, or alternatively may store only a portion of each hash or a value dependent thereon.

The memory 1644 is also able to store a value r 1656. The current time interval value T 1650 (optionally), the value r 1656 and the selected group shared secret $gss_{Ci}$ are used to obtain the hash $G([T]|r|gss_{Ci})$ 1654. The memory 1644 may store the hash in its entirety, as shown in FIG. 16, or alternatively may store only a portion of the hash or a value dependent thereon.

As denoted by arrow 1658, a message comprising the hashes 1652 or portions thereof or values dependent thereon, as well as the hash 1654 or portion thereof or value dependent thereon, and the value r 1656 and optionally the time interval value T 1650 is able to be communicated by the client device 1640 to the server 1680. The server 1680 may extract the hashes 1652 or portions thereof or values dependent thereon, the hash 1654 or portion thereof or value dependent thereon, the value r 1656 and optionally the time interval value T 1650 from the message and store them in the memory 1684. While not explicitly shown, the message may be sent from the client device 1640 via the communication interface 1646 and may be received by the server 1680 via the communication interface 1686, and optionally via one or more intermediate devices.

The memory 1684 of the server 1680 is able to store the L group shared secrets $(gss_1, \ldots, gss_L)$ 1612 as well as the N group shared secret identifying keys $(k_1, \ldots, k_N)$ 1616, and optionally the indices $(1, \ldots, L)$ and/or the indices $(1, \ldots, N)$. The memory 1684 is also able to store the information 1620 from which it is determinable which of the N group shared secret identifying keys were assigned to which of the group shared secrets 1612. The information may comprise a relevant mapping function, a lookup table, an algorithm or inverse thereof, or any other information by which the server 1680 can determine which of the group shared secret identifying keys 1612 were assigned to which group shared secret. Alternatively, any of the group shared secrets $(gss_1, \ldots, gss_L)$ 1612, the group shared secret identifying keys $(k_1, \ldots, k_N)$ 1614, and the information 1620 may be stored on the one or more databases (not shown), which are accessible to the server 1680.

The memory 1684 is able to store code 1688 that, when executed by the processor 1682, results in the example method illustrated in FIGS. 9-1 and 9-2. Alternatively, the code 1688 may be stored in a different memory (not shown) than the memory 1684. In another example, some portions of the example methods illustrated in FIGS. 9-1 and 9-2 may be performed by ASICs or other dedicated hardware, without involving execution of the code 1688 by the processor 1682. The memory 1684 may also store applications (not shown) installed in the server 1680 to be executed by the processor 1682.

The memory 1684 is able to store a current time interval value T 1690. The memory 1684 may optionally store one or more previous time interval values T or future time interval values T or both (not shown). The memory 1684 is able to store a table 1692 comprising hash-dependent values obtained from hash calculations performed on the group shared secret identifying keys 1616 using the current time interval value T, as described previously. The memory 1684 is also able to store an association 1694 of each one of the hash-dependent values in the table 1692 with the one of the group shared secret identifying keys 1614 from which it was calculated. The memory 1684 may optionally store one or more additional tables (not shown) of hash-dependent values and associations (not shown) determined from one or more previous time interval values T or future time interval values T or both.

Figure 17:
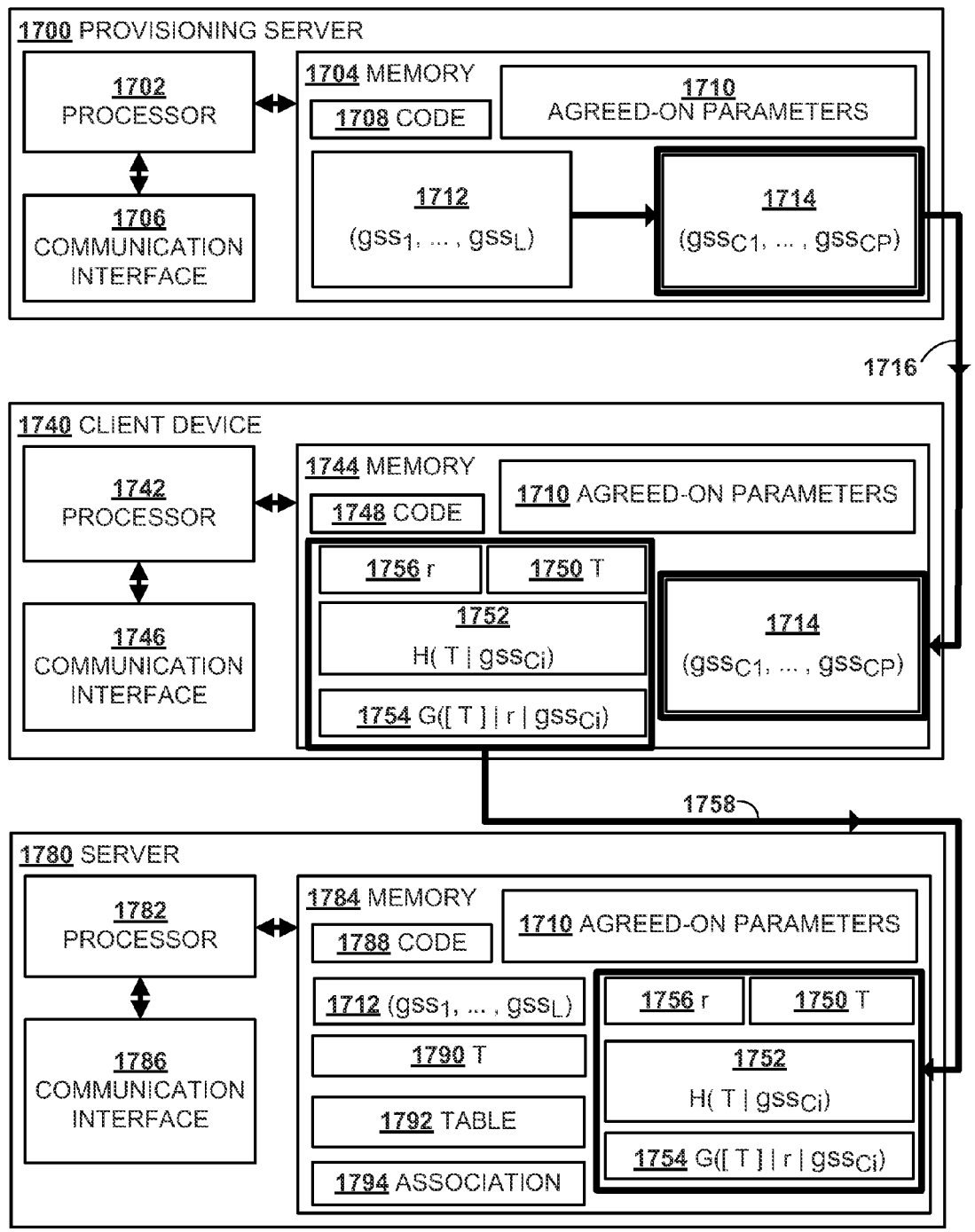
FIG. 17 is a block diagram of an example provisioning server, an example client device, and an example server configured to perform the technique illustrated in FIG. 10.

FIG. 17 is a block diagram of an example provisioning server 1700, an example client device 1740, and an example server 1780 configured to perform the example technique illustrated in FIG. 10.

The provisioning server 1700 is an example of the server 1000 when acting in a provisioning capacity. The provisioning server 1700 comprises a processor 1702 which is coupled to a memory 1704 and to a communication interface 1706 through which it is able to communicate with one or more client devices, such as the client device 1740. The provisioning server 1700 may contain other elements which, for clarity, are not shown in FIG. 17.

The client device 1740 is an example of any one of the client devices 100. The client device 1740 comprises a processor 1742 which is coupled to a memory 1744 and to a communication interface 1746. The client device 1740 may contain other elements which, for clarity, are not shown in FIG. 17.

The server 1780 is an example of the server 1000 when acting in a receiving capacity. The server 1780 comprises a processor 1782 which is coupled to a memory 1784 and to a communication interface 1786. The server 1780 may contain other elements which, for clarity, are not shown in FIG. 17.

The communication interfaces 1706, 1746, and 1786 may be wired communication interfaces or wireless communication interfaces. For example, the communication interfaces 1706, 1746, and 1786 may comprise any of USB interfaces, Ethernet interfaces, ISDN interfaces, DSL interfaces, LAN interfaces, HDMI interfaces, DVIs, or IEEE 1394 interfaces such as i.LINK™, Lynx$^{SM}$ or Firewire®. Alternatively, the communication interfaces 1706, 1746, and 1786 may be WLAN interfaces, short-range wireless communication interfaces such as WPAN interfaces, WWAN interfaces, or WMAN interfaces.

Each of the memories 1704, 1744, and 1784 is able to store agreed-on parameters 1710. Any of the agreed-on parameters 1710 may be agreed on by two or more of the provisioning server 1700, the client device 1740 and the server 1780, depending on the particular parameter. For example such parameters may include any hash algorithms to be used for calculating hashes, such as the hash algorithms H, G and F, parameters indicative of the nature of any combination to which a hash algorithm is to be applied, parameters indicative of any additional operations to be performed on calculated hashes to obtain hash-dependent values, and parameters indicative of which portion of any hash or hash-dependent value is to be stored, communicated and/or compared. Although not explicitly shown, each of the memories 1704, 1744, and 1784 may comprise multiple memories or storage media. For example, cryptographic data may be stored in a different memory or storage medium than code.

The memory 1704 of the provisioning server 1700 is able to store code 1708 that, when executed by processor 1702, results in the example method illustrated in FIG. 11. Alternatively, the code 1708 may be stored in a different memory (not shown) than the memory 1704. In another example, some portion of the example method illustrated in FIG. 11 may be performed by ASICs or other dedicated hardware, without involving execution of the code 1708 by the processor 1702. The memory 1704 may also store applications (not shown) installed in the provisioning server 1700 to be executed by the processor 1702.

In addition to the agreed-on parameters 1710, the memory 1704 is also able to store a plurality of L group shared secrets $(gss_1, \ldots, gss_L)$ 1712. Alternatively (not shown), any of the group shared secrets $(gss_1, \ldots, gss_L)$ 1712 may be stored on one or more databases (not shown) that are accessible by the provisioning server 1700.

Alternatively, the memory 1704 may store records (not shown) of the conditions under which the group shared secrets $(gss_1, \ldots, gss_L)$ 1712 were generated. Although not explicitly shown, the memory 1704 may optionally store the L indices $(1, \ldots, L)$ by which the group shared secrets 1712 are identified.

As denoted by arrow 1716, a subset of P group shared secrets $(gss_{C1}, \ldots, gss_{CP})$ 1714 that were assigned by the provisioning server 1700 to the client device 1740 are able to communicated, optionally with the corresponding indices $(C1, \ldots, CP)$ (not shown), by the provisioning server 1700 to the client device 1740. While not explicitly shown, the group shared secrets $(gss_{C1}, \ldots, gss_{CP})$ 1714 may be communicated by the provisioning server 1700 via the communication interface 1706 and may be received by the client device 1740 via the communication interface 1746, and optionally via one or more intermediate devices. The client device may store these received values in the memory 1744.

The memory 1744 of the client device 1740 is able to store code 1748 that, when executed by processor 1742, results in the example method illustrated in FIG. 12. Alternatively, the code 1748 may be stored in a different memory (not shown) than the memory 1744. In another example, some portion of the example method illustrated in FIG. 12 may be performed by ASICs or other dedicated hardware, without involving execution of the code 1748 by the processor 1742. The memory 1744 may also store applications (not shown) installed in the client device 1740 to be executed by the processor 1742. Examples of such applications include data communication applications, voice communication applications, messaging applications, games, calculators, and the like.

The memory 1744 is able to store a current time interval value T 1750, which it may use to calculate a hash of a group shared secret $gss_{Ci}$ that it has selected from the received group shared secrets $(gss_{C1}, \ldots, gss_{CP})$ 1714. From this calculation, the client device 1740 is able to obtain a hash $H(T|gss_{Ci})$ 1752. The client device 1740 may store the hash in its entirety, as shown in FIG. 17, or alternatively may store only a portion of the hash or a value dependent thereon.

The memory 1744 is also able to store a value r 1756. The current time interval value T 1750 (optionally), the value r 1756 and the selected group shared secret $gss_{Ci}$ are used to obtain the hash value $H([T]|r|gss_{Ci})$ 1754. The memory 1744 may store the hash in its entirety, as shown in FIG. 17, or alternatively may store only a portion of the hash or a value dependent thereon.

As denoted by arrow 1758, a message comprising the hash 1752 or a portion thereof or value dependent thereon, as well as the hash 1754 or portion thereof or value dependent thereon, and the value r 1756 and optionally the time interval value T 1750 is able to be communicated by the client device 1740 to the server 1780. The server 1780 may extract the hash 1752 or portion thereof or value dependent thereon, the hash 1754 or portion thereof or value dependent thereon, the value r 1756 and optionally the time interval value T 1750 from the message and store them in the memory 1784. While not explicitly shown, the message may be sent from the client device 1740 via the communication interface 1746 and may be received by the server 1780 via the communication interface 1786, and optionally via one or more intermediate devices.

The memory 1784 of the server 1780 is able to store the L group shared secrets $(gss_1, \ldots, gss_L)$ 1712, and optionally the indices $(1, \ldots, L)$.

The memory 1784 is able to store code 1788 that, when executed by the processor 1782, results in the example method illustrated in FIGS. 13-1 and 13-2. Alternatively, the code 1788 may be stored in a different memory (not shown) than the memory 1784. In another example, some portions of the example methods illustrated in FIGS. 13-1 and 13-2 may be performed by ASICs or other dedicated hardware, without involving execution of the code 1788 by the processor 1782. The memory 1784 may also store applications (not shown) installed in the server 1780 to be executed by the processor 1782.

The memory 1784 is able to store a current time interval value T 1790. The memory 1784 may optionally store one or more previous time interval values T or future time interval values T or both (not shown). The memory 1784 is able to store a table 1792 comprising hash-dependent values obtained from hash calculations performed on the group shared secrets 1714 using the current time interval value T, as described previously. The memory 1784 is also able to store an association 1794 of each one of the hash-dependent values in the table 1792 with the one of the group shared secret 1712 from which it was calculated. The memory 1784 may optionally store one or more additional tables (not shown) of hash-dependent values and associations (not shown) determined from one or more previous time interval values T or future time interval values T or both.

What is claimed is:

1. A method to be performed by a server, the method comprising:
   storing information from which it is determinable which unique subset of $M_q$ of N group shared secret identifying keys was assigned to each of L group shared secrets $\{gss_q\}$, where L, N, and $M_q$ are positive integers and $M_q$ is less than N;
   when there is a change in a modulating value:
      calculating for each of the N group shared secret identifying keys a hash of a combination comprising the group shared secret identifying key and the modulating value;
      determining a hash-dependent value for each hash; and
      associating each hash-dependent value with the group shared secret identifying key from which the corresponding hash was calculated or with an index of the group shared secret identifying key from which the corresponding hash was calculated;
   receiving a message purporting to identify one of the L group shared secrets $\{gss_q\}$; and
   determining whether the message identifies one of the L group shared secrets $\{gss_q\}$.

2. The method as claimed in claim 1, wherein determining whether the message identifies one of the group shared secrets $\{gss_q\}$ comprises:
   extracting from the message $M_q$ components, each of the $M_q$ components purporting to be a hash-dependent value determined from a hash of a combination comprising one of the group shared secret identifying keys and a current instance of the modulating value;
   determining for each of the $M_q$ components whether the component is consistent with any of the hash-dependent values;

where each of the $M_q$ components is consistent with one of the hash-dependent values, using the association to determine the group shared secret identifying key that is associated with the consistent hash-dependent value;

using the stored information to determine whether the group shared secret identifying keys associated with the consistent hash-dependent values correspond to any of the unique subsets of group shared secret identifying keys that were assigned to the L group shared secrets $\{gss_q\}$; and where the group shared secret identifying keys correspond to one of the unique subsets of client-identifying keys that was assigned to a particular one of the group shared secrets $\{gss_q\}$, determining that the message identifies the particular one of the group shared secrets $\{gss_q\}$.

3. The method as claimed in claim 2, wherein determining whether the component is consistent with any of the hash-dependent values comprises determining whether a portion of the component is consistent with a corresponding portion of any of the hash-dependent values.

4. The method as claimed in claim 1, further comprising:
determining whether the message was received from a client device that possesses the particular one of the group shared secrets $\{gss_q\}$.

5. The method as claimed in claim 4, wherein determining whether the message was received from a client device that possesses the particular one of the group shared secrets $\{gss_q\}$ comprises:
extracting from the message a value purporting to be a value r and a value purporting to be a hash of a combination comprising the particular one of the group shared secrets $\{gss_q\}$ and the value r, wherein r is a positive integer;
calculating a hash of a combination comprising the particular one of the group shared secrets $\{gss_q\}$ and the extracted value purporting to be the value r;
comparing the calculated hash of the combination to the extracted value purporting to be the hash of the combination; and
where the values are consistent with one another, determining that the message was received from a client device that possesses the particular one of the group shared secrets $\{gss_q\}$.

6. A method to be performed by a server, the method comprising:
when there is a change in a modulating value:
calculating for each of L group shared secrets $\{gss_q\}$ a hash of a combination comprising the group shared secret $gss_q$ and the modulating value, wherein L is a positive integer;
determining a hash-dependent value for each hash; and
associating each hash-dependent value with the group shared secret from which the corresponding hash was calculated or with an index of the group shared secret from which the corresponding hash was calculated;
receiving a message purporting to identify a particular one of the L group shared secrets $\{gss_q\}$; and
determining whether the message identifies the particular one of the group shared secrets $\{gss_q\}$.

7. The method as claimed in claim 6, wherein determining whether the message identifies the particular one of the group shared secrets $\{gss_q\}$ comprises:
extracting from the message a value purporting to be a hash-dependent value determined from a hash of a combination comprising the particular one of the group shared secrets $\{gss_q\}$ and a current instance of the modulating value;
determining whether the extracted value is consistent with any of the hash-dependent values;
where the extracted value is consistent with one of the hash-dependent values, using the association to determine the group shared secret that is associated with the consistent hash-dependent value.

8. A server comprising:
a communication interface through which the server is able to receive a message purporting to identify a particular group shared secret from L group shared secrets $\{gss_q\}$; and
a memory storing information from which it is determinable which unique subset of $M_q$ of N group shared secret identifying keys was assigned to each of the L group shared secrets $\{gss_q\}$, wherein the server, when there is a change in a modulating value, is operative:
to calculate for each of the N group shared secret identifying keys a hash of a combination comprising the group shared secret identifying key and the modulating value;
to determine a hash-dependent value for each hash; and
to associate each hash-dependent value with the group shared secret identifying key from which the corresponding hash was calculated or an index of the group shared secret identifying key from which the corresponding hash was calculated;
wherein the server is further operative to determine whether the message identifies one of the L group shared secrets $\{gss_q\}$, and
wherein L, N, and $M_q$ are positive integers and $M_q$ is less than N.

9. The server as claimed in claim 8, wherein determining whether the message identifies the particular one of the group shared secrets $\{gss_q\}$ comprises:
extracting from the message $M_q$ components, each of the $M_q$ components purporting to be a hash-dependent value determined from a hash of a combination comprising one of the group shared secret identifying keys and a current instance of the modulating value;
determining for each of the $M_q$ components whether the component is consistent with any of the hash-dependent values;
where each of the $M_q$ components is consistent with one of the hash-dependent values, using the association to determine the group shared secret identifying key that is associated with the consistent hash-dependent value;
using the information to determine whether the group shared secret identifying keys associated with the consistent hash-dependent values correspond to any of the unique subsets of group shared secret identifying keys that were assigned to the L group shared secrets $\{gss_q\}$; and
where the group shared secret identifying keys correspond to one of the unique subsets of client-identifying keys that was assigned to a particular one of the group shared secrets $\{gss_q\}$, determining that the message identifies the particular one of the group shared secrets $\{gss_q\}$.

10. The server as claimed in claim 9, wherein determining whether the component is consistent with any of the hash-dependent values comprises determining whether a portion of the component is consistent with a corresponding portion of any of the hash-dependent values.

11. The server as claimed in claim 8, wherein the server is further operative to determine whether the message was received from a client device that possesses the particular one of the group shared secrets $\{gss_q\}$.

12. The server as claimed in claim 11, wherein determining whether the message was received from a client device that possesses the particular one of the group shared secrets $\{gss_q\}$ comprises:
   extracting from the message a value purporting to be a value r and a value purporting to be a hash of a combination comprising the one of the particular group shared secrets $\{gss_q\}$ and the value r, wherein r is a positive integer;
   calculating a hash of a combination comprising the particular one of the group shared secrets $\{gss_q\}$ and the extracted value purporting to be the value r;
   comparing the calculated hash of the combination to the extracted value purporting to be the hash of the combination; and
   where the values are consistent with one another, determining that the message was received from a client device that possesses the particular one of the group shared secrets $\{gss_q\}$.

13. A server comprising:
   a communication interface through which the server is able to receive a message purporting to identify a particular one of L group shared secrets $\{gss_q\}$, wherein L is a positive integer;
   wherein the server, when there is a change in a modulating value, is operative:
      to calculate for each of the L group shared secrets $\{gss_q\}$ a hash of a combination comprising the group shared secret $gss_q$ and the modulating value;
      to determine a hash-dependent value for each hash; and
      to associate each hash-dependent value with the group shared secret from which the corresponding hash was calculated or with an index of the group shared secret from which the corresponding hash was calculated;
   wherein the server is further operative to determine whether the message identifies the particular one of the L group shared secrets $\{gss_q\}$.

14. The server as claimed in claim 13, wherein determining whether the message identifies the particular one of the group shared secrets $\{gss_q\}$ comprises:
   extracting from the message a value purporting to be a hash-dependent value determined from a hash of a combination comprising the particular one of the group shared secrets and a current instance of the modulating value;
   determining whether the extracted value is consistent with any of the hash-dependent values;
   where the extracted value is consistent with one of the hash-dependent values, using the association to determine the group shared secret that is associated with the consistent hash-dependent value.

15. A non-transitory computer-readable medium storing information from which it is determinable which unique subset of $M_q$ of N group shared secret identifying keys was assigned to each of L group shared secrets $\{gss_q\}$, the computer-readable medium further storing code which, when executed by a processor of a server, causes the server, when there is a change in a modulating value:
   to calculate for each of the N group shared secret identifying keys a hash of a combination comprising the group shared secret identifying key and the modulating value;
   to determine a hash-dependent value for each hash; and
   to associate each hash-dependent value with the group shared secret identifying key from which the corresponding hash was calculated or with an index of the group shared secret identifying key from which the corresponding hash was calculated,
   wherein the code, when executed by the processor, further results in the server determining whether a message received through a communication interface of the server and purporting to identify a particular group shared secret from the L group shared secrets $\{gss_q\}$ identifies one of the L group shared secrets $\{gss_q\}$, and
   wherein L, N, and $M_q$ are positive integers and $M_q$ is less than N.

16. A non-transitory computer-readable medium storing code which, when executed by a processor of a server, causes the server, when there is a change in a modulating value:
   to calculate for each of L group shared secrets $\{gss_q\}$ a hash of a combination comprising the group shared secret $gss_q$ and the modulating value, wherein L is a positive integer;
   to determine a hash-dependent value for each hash; and
   to associate each hash-dependent value with the group shared secret from which the corresponding hash was calculated or with an index of the group shared secret from which the corresponding hash was calculated,
   wherein the code, when executed by the processor, further results in the server determining whether a message received through a communication interface of the server and purporting to identify a particular one of the L group shared secrets $\{gss_q\}$ identifies the particular one of the L group shared secrets $\{gss_q\}$.

* * * * *